(12) United States Patent
Hayasaka et al.

(10) Patent No.: US 11,899,276 B2
(45) Date of Patent: Feb. 13, 2024

(54) IMAGING APPARATUS, INFORMATION PROCESSING METHOD, PROGRAM, AND INTERCHANGEABLE LENS

(71) Applicant: Sony Group Corporation, Tokyo (JP)

(72) Inventors: Kengo Hayasaka, Kanagawa (JP); Katsuhisa Ito, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/774,668

(22) PCT Filed: Dec. 7, 2020

(86) PCT No.: PCT/JP2020/045369
§ 371 (c)(1),
(2) Date: May 5, 2022

(87) PCT Pub. No.: WO2021/124941
PCT Pub. Date: Jun. 24, 2021

(65) Prior Publication Data
US 2022/0413258 A1    Dec. 29, 2022

(30) Foreign Application Priority Data
Dec. 20, 2019 (JP) ................................. 2019-230033

(51) Int. Cl.
*G02B 7/16* (2021.01)
*H04N 23/67* (2023.01)
(Continued)

(52) U.S. Cl.
CPC ............... *G02B 7/16* (2013.01); *H04N 23/67* (2023.01); *H04N 13/282* (2018.05); *H04N 13/296* (2018.05)

(58) Field of Classification Search
CPC . G02B 7/16; G02B 7/34; H04N 23/67; H04N 13/282; H04N 13/296; H04N 23/12;
(Continued)

(56) References Cited

U.S. PATENT DOCUMENTS

2003/0185551 A1   10/2003  Chen
2014/0071305 A1*   3/2014  Hiasa .................... H04N 23/80
                                                  348/222.1
(Continued)

FOREIGN PATENT DOCUMENTS

JP    2012-199759 A    10/2012
JP    2015-060048 A     3/2015
WO    2019/065260 A1    4/2019

OTHER PUBLICATIONS

International Search Report (PCT/ISA/210), International Application No. PCT/JP2020/045369, dated Feb. 9, 2021.
(Continued)

*Primary Examiner* — Gevell V Selby
(74) *Attorney, Agent, or Firm* — Michael Best & Friedrich LLP

(57) ABSTRACT

The present disclosure relates to an imaging apparatus, an information processing method, a program, and an interchangeable lens that enable depth-of-field adjustment. The imaging apparatus includes a depth-of-field adjustment function that adjusts the depth of field of at least one monocular optical system among a plurality of monocular optical systems having optical paths independent of one another. For example, the depth-of-field adjustment function includes a mechanism that adjusts the depths of field of the monocular optical systems, and an optical system control unit that adjusts the depths of field of the monocular optical systems by driving the monocular optical systems on the basis of control information. The present disclosure can be applied to an imaging apparatus, an electronic apparatus, an
(Continued)

interchangeable lens or a camera system that provides a plurality of monocular lenses, an information processing method, a program, or the like, for example.

17 Claims, 31 Drawing Sheets

(51) Int. Cl.
*H04N 13/296* (2018.01)
*H04N 13/282* (2018.01)

(58) Field of Classification Search
CPC ........ H04N 23/00; H04N 23/60; G03B 15/00; G03B 17/00; G03B 17/12; G03B 19/07
See application file for complete search history.

(56) References Cited

U.S. PATENT DOCUMENTS

| | | | |
|---|---|---|---|
| 2015/0092023 A1* | 4/2015 | Asakura | H04N 23/69 348/49 |
| 2018/0109722 A1* | 4/2018 | Laroia | H04N 23/45 |
| 2019/0104242 A1* | 4/2019 | Wippermann | H04N 13/239 |

OTHER PUBLICATIONS

B. Wilburn et al, "High Performance Imaging Using Large Camera Arrays", ACM Trans. Graph. 24(3), 765-776, 2005.

\* cited by examiner

IMAGING APPARATUS, INFORMATION PROCESSING METHOD, PROGRAM, AND INTERCHANGEABLE LENS

TECHNICAL FIELD

The present disclosure relates to imaging apparatuses, information processing methods, programs, and interchangeable lenses, and more particularly, to an imaging apparatus, an information processing method, a program, and an interchangeable lens that are capable of depth-of-field adjustment.

BACKGROUND ART

Various studies have been made on image processing technologies for performing refocusing and light condensing from a plurality of parallax images, like optical lenses. For example, a refocusing process using a camera array of 100 cameras has been conceived (see Non-Patent Document 1, for example).

CITATION LIST

Non-Patent Document

Non-Patent Document 1: Bennett Wilburn, Neel Joshi, Vaibhav Vaish, Eino-Ville Talvala, Emilio Antunez, Adam Barth, Andrew Adams, Mark Horowitz, Marc Levoy, "High Performance Imaging Using Large Camera Arrays", ACM Trans. Graph. 24(3), 765-776, 2005

SUMMARY OF THE INVENTION

Problems to be Solved by the Invention

However, in the case of the method disclosed in Non-Patent Document 1, the depths of field of the respective cameras cannot be adjusted.

The present disclosure is made in view of such circumstances, and aims to enable depth-of-field adjustment.

Solutions to Problems

An imaging apparatus accord in to one aspect of the present technology is an imaging apparatus that includes a depth-of-field adjustment function that adjusts the depth of field of at least one monocular optical system among a plurality of monocular optical systems having optical paths independent of one another.

An information processing method according to one aspect of the present technology is an information processing method that includes adjusting the depth of field of at least one monocular optical system among a plurality of monocular optical systems having optical paths independent of one another.

A program according to one aspect of the present technology is a program for causing a computer to function as a depth-of-field adjustment function that adjusts the depth of field of at least one monocular optical system among a plurality of monocular optical systems having optical paths independent of one another.

An interchangeable lens according to one aspect of the present technology is an interchangeable lens that includes: a plurality of monocular optical systems having optical paths independent of one another; and a depth-of-field adjustment function that adjusts the depth of field of at least one monocular optical system among the plurality of monocular optical systems.

In the imaging apparatus, the information processing method, the program, and the interchangeable lens according to one aspect of the present technology, the depth of field of at least one monocular optical system among a plurality of monocular optical systems is adjusted, the monocular optical systems having optical paths independent of one another.

MODES FOR CARRYING OUT THE INVENTION

The following is a description of modes for carrying out the present disclosure (these modes will be hereinafter referred to as embodiments). Note that explanation will be made in the following order.

1. First Embodiment (Camera)
2. Second Embodiment (Camera System)
3. Third Embodiment (Other Example Configurations)
4. Notes

1. First Embodiment

<Exterior of a Camera>

Figure 1:
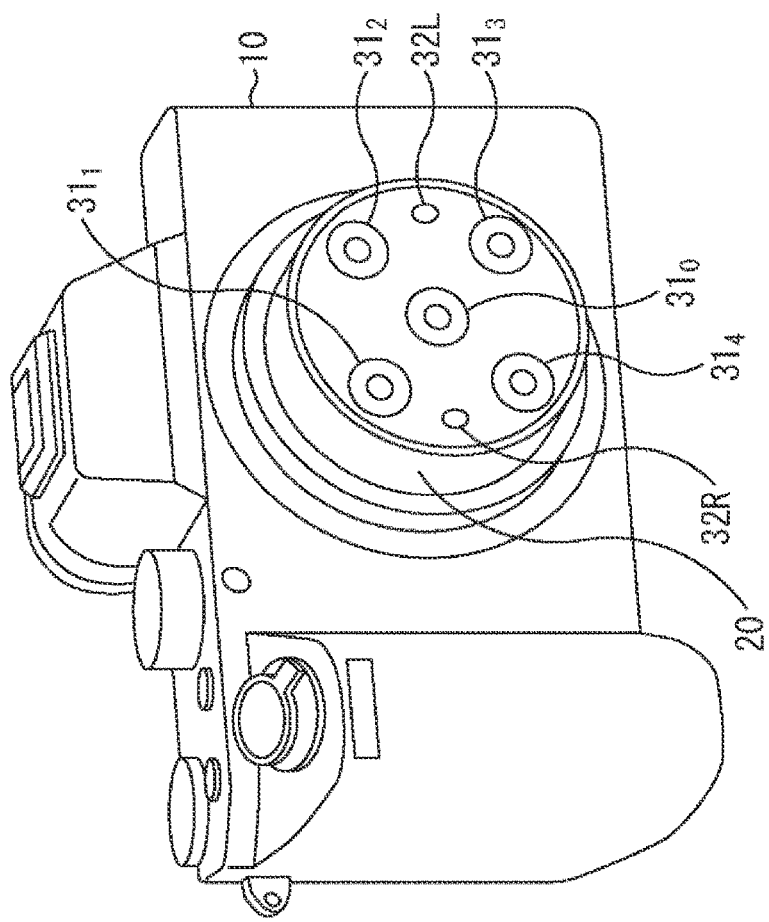
FIG. 1 is a perspective view showing an example configuration of an embodiment of a camera to which the present technology is applied.

FIG. 1 is a perspective view of an example configuration of an embodiment of a camera to which the present technology is applied.

A camera 10 includes an image sensor, receives light beams collected by lenses, and performs photoelectric conversion, to capture an image of an object. Hereinafter, an image obtained through such imaging will be also referred to as a captured image.

The camera 10 has a lens barrel 20 on the front side (the side at which light enters) of the image sensor, and the lens barrel 20 includes five monocular optical systems $31_0$, $31_1$, $31_2$, $31_3$, and $31_4$ as a plurality of monocular optical systems. Hereinafter, the monocular optical systems $31_0$ to $31_4$ will be referred to as monocular optical systems 31 (or monocular optical systems $31_i$) in a case where there is no need to distinguish the monocular optical systems 31 from one another.

The plurality of monocular optical systems 31 is designed so that the optical paths of light passing through the respective systems are independent of one another. That is, light having passed through each of the monocular optical systems 31 of the lens barrel 20 is emitted onto a different position on the light receiving surface (for example, the effective pixel region) of the image sensor, without entering the other monocular optical systems 31. At least the optical axes of the respective monocular optical systems 31 are located at different positions on the light receiving surface of the image sensor, and at least part of the light passing through the respective monocular optical systems 31 is emitted onto different positions on the light receiving surface of the image sensor.

Accordingly, in the captured image generated by the image sensor (the entire image output by the image sensor), the images of the object formed through the respective monocular optical systems 31 are formed at different positions. In other words, from the captured image, captured images (also referred to as viewpoint images) with the respective monocular optical systems 31 being the viewpoints are obtained. That is, the camera 10 can obtain a plurality of viewpoint images by imaging an object. The plurality of viewpoint images can be used for processes such as generation of depth information and refocusing using the depth information, for example.

Note that, in the description below, an example in which the camera 10 includes the five monocular optical systems 31 will be described, but the number of the monocular optical systems 31 may be any number that is two or greater.

The five monocular optical systems 31 are arranged so that, with the monocular optical system $31_0$ being the center (gravity center), the other four monocular optical systems $31_1$ to $31_4$ form the vertices of a rectangle in a two-dimensional plane that is orthogonal to the optical axis of the lens barrel 20 (or is parallel to the light receiving surface (imaging surface) of the image sensor). The arrangement shown in FIG. 1 is of course an example, and the respective monocular optical systems 31 can be in any positional relationship, as long as the optical paths are independent of one another.

Further, as for the camera 10, the surface on the side from which light from the object enters is the front surface.

<Example Electrical Configuration of the Camera>

Figure 2:
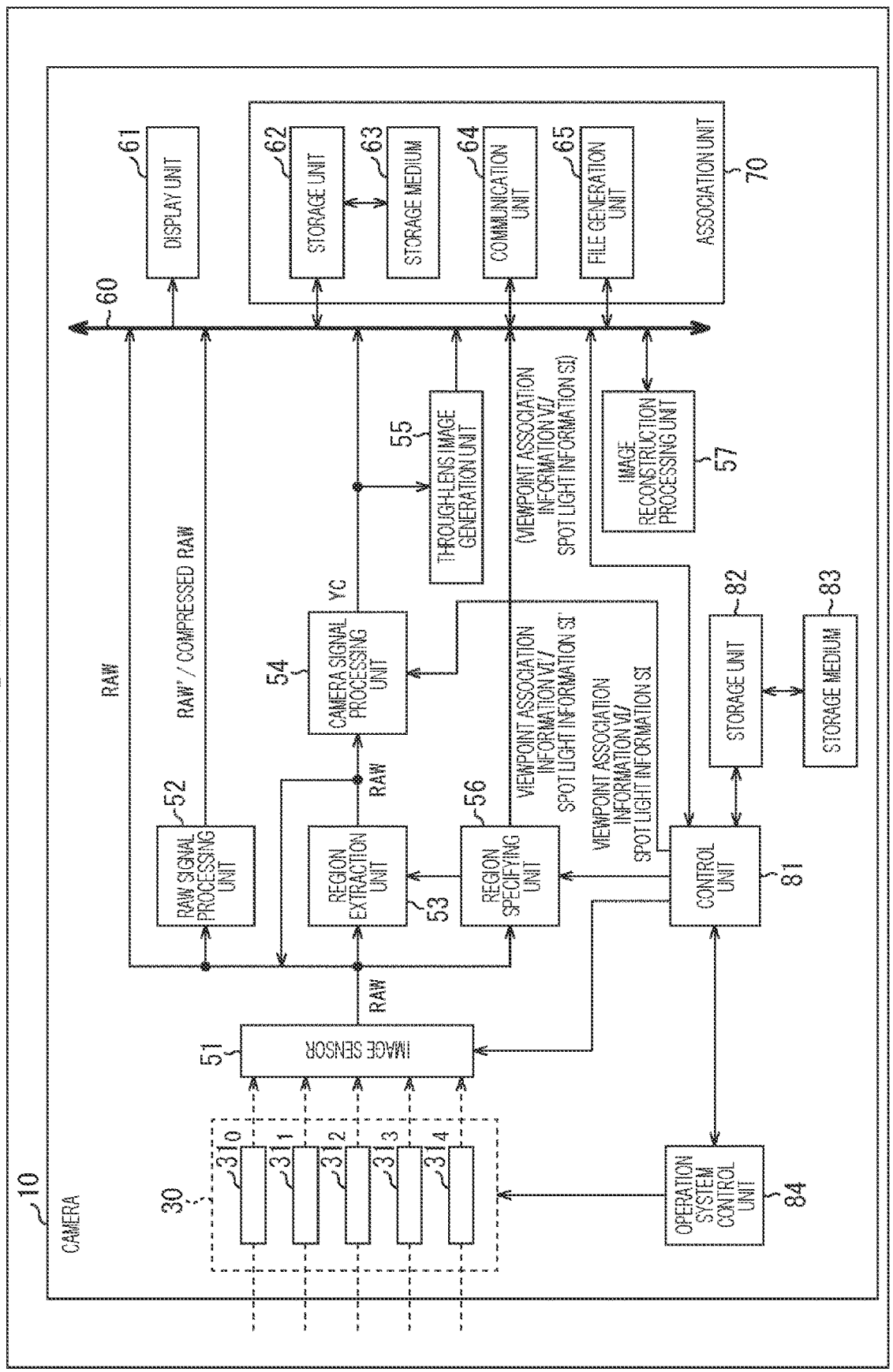
FIG. 2 is a block diagram showing an example electrical configuration of the camera.

FIG. 2 is a block diagram showing an example electrical configuration of the camera 10 shown in FIG. 1. The camera 10 includes a multiple optical system 30, an image sensor 51, a RAM signal processing unit 52, a region extraction unit 53, a camera signal processing unit 54, a through-lens image generation unit 55, a region specifying unit 56, an image reconstruction processing unit 57, a bus 60, a display unit 61, a storage unit 62, a communication unit 64, a file generation unit 65, a control unit 81, a storage unit 82, and an optical system control unit 84.

<Multiple Optical System>

The multiple optical system 30 includes the above-described monocular optical systems 31 (the monocular optical systems $31_0$ to $31_4$, for example). Each of the monocular optical systems 31 of the multiple optical system 30 condenses light beams from the object onto the image sensor 51 of the camera 10. The specifications of the respective monocular optical systems 31 are the same.

Figure 3:
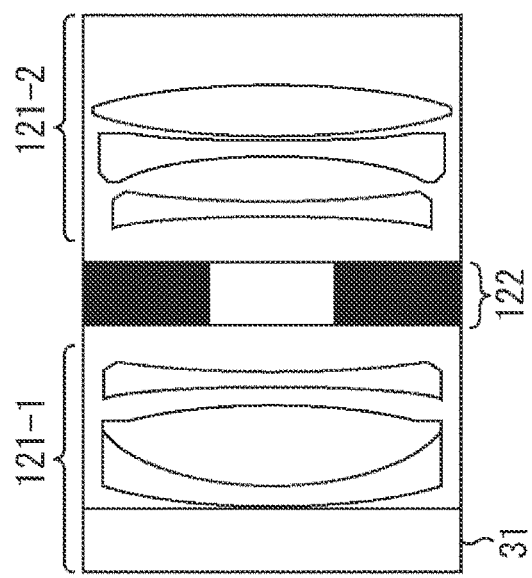
FIG. 3 is a cross-sectional diagram showing an example configuration of a monocular optical system.

FIG. 3 is a cross-sectional diagram showing an example configuration of a monocular optical system 31. For example, a monocular optical system 31 includes a lens group 121-1, a lens group 121-2, and an aperture 122, as shown in FIG. 3. The lens group 121-1 and the lens group 121-2 will be referred to as the lens groups 121 in a case where there is no need to distinguish them from each other. A lens group 121 includes a plurality of lenses arranged in the optical axis direction of the lens barrel 20. In the lens group 121, some or all of the lenses in the plurality of lenses are at positions variable in the optical axis direction of the lens barrel 20, and have variable focal lengths. That is, it is possible to control the focal lengths by controlling the positions of the lenses constituting the lens group 121. Note that the zoom magnifications may also be variable. That is, the zoom magnification may also be controlled through control on the positions of the lenses of the lens group 121.

The aperture 122 is a mechanism that adjusts the amount of light (the aperture (f-number)) entering the image sensor 51 via the lens group 121 by controlling the opening degree of the screen. As shown in FIG. 3, the aperture 122 is formed in the lens group 121, or between pluralities of lenses arranged in the optical axis direction (between the lens group 121-1 and the lens group 121-2 in the example case shown in FIG. 3). That is, light that has entered the monocular optical system 31 is output from the monocular optical system 31 (and enters the image sensor 51) via the lens groups 121 and the aperture 122.

<Image Sensor>

The image sensor 51 is a complementary metal oxide semiconductor (CMOS) image sensor, for example, and captures of the object, to generate a captured image. The light receiving surface of the image sensor 51 irradiated with light beams condensed by the respective monocular optical systems $31_0$ to 314. In a captured image, the image corresponding to the region to which the irradiation light beam with which the image sensor 51 is irradiated via one monocular optical system 31 is input is also referred to as a monocular image. That is, the image sensor 51 receives these light beams (irradiation light beams) and performs photoelectric conversion, to generate a captured image including monocular images viewed from the respective monocular optical systems 31. Note that a monocular image has portions that are not effective as an image in its periphery. Also, a captured image including all monocular images (which is an entire captured image generated by the image sensor 51, or an image formed by deleting, from the captured image, some or all of the regions outside all the monocular images included in the captured image) is also referred to as a whole image.

Note that the image sensor 51 may be a unicolor (so-called monochromatic) image sensor, or may be a color image sensor in which color filters in the Bayer array are arranged in a pixel group, for example. That is, a captured image output by the image sensor 51 may be a monochrome image or a multicolor image in the description below, the image sensor 51 is a color image sensor, and generates and outputs a captured image in the RAW format.

Note that, in this embodiment, the RAW format means an image in a state where the positional relationship in the layout of the color filters of the image sensor 51 is maintained, and may include an image obtained by performing signal processing such as an image size conversion process, a noise reduction process, or a defect correction process for the image sensor 51, and compression encoding on an image output from the image sensor 51. Furthermore, captured images r the RAW format do not include any monochromatic image.

The image sensor 51 can output a captured image (whole image) in the RAW format generated by photoelectrically converting irradiation light beams. For example, the image sensor 51 can supply the captured image (whole image) in the RAW format to at least one of the following components: the bus 60, the RAW signal processing unit 52, the region extraction unit 53, and the region specifying unit 56.

For example, the image sensor 51 can supply the captured image (whole image) in the RAN format to the storage unit 62 via the bus 60, and store the captured image into a storage medium 63. Also, the image sensor 51 can supply the captured image (whole image) in the RAW format to the communication unit 64 via the bus 60, and cause the communication unit 64 to transmit the captured image to the outside of the camera 10. Further, the image sensor 51 can supply the captured image (whole image) in the RAW format to the file generation unit 65 via the bus 60, and cause the file generation unit 65 to turn the captured image into a file. Furthermore, the image sensor 51 can supply the captured image (whole image) in the RAW format to the image reconstruction processing unit 57 via the bus 60, and cause the image reconstruction processing unit 57 to perform an image reconstruction process.

Note that the image sensor 51 may be a single-plate image sensor, or may be a set of image sensors (also referred to as a multi-plate image sensor) including a plurality of image sensors, such as a three-plate image sensor, for example.

Figure 4:
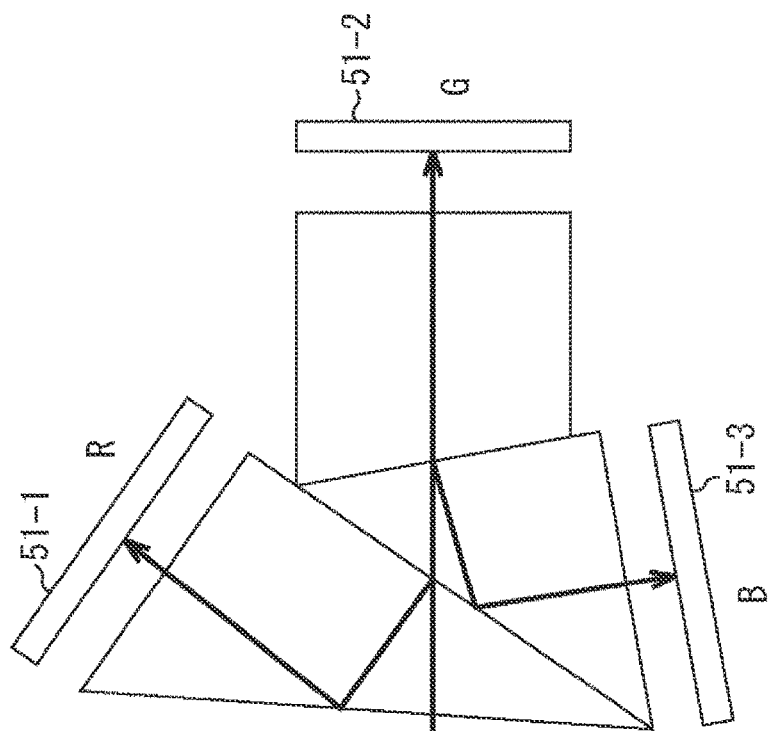
FIG. 4 is a diagram showing an example of a three-plate image sensor.

For example, a three-plate image sensor may be an image sensor including three image sensors (image sensors 51-1 to 51-3) for the respective colors of RGE (Red, Green, and Blue), as shown in FIG. 4. In this case, light beams from the object are separated for the respective wavelength ranges through an optical system (an optical path separation unit) such as a prism, and then enters each image sensor. The image sensors 51-1 to 51-3 each photoelectrically convert the incident light. That is, the image sensors 51-1 to 51-3 photoelectrically convert light in different wavelength ranges at substantially the same timing. Accordingly, in the case of a multi-plate image sensor, the respective image sensors obtain images captured at substantially the same angle of view at substantially the same time (that is, images having substantially the same pattern but in different wavelength ranges). Thus, the positions and the sizes of the viewpoint image regions (described later) in the captured images obtained by the respective image sensors are substantially the same. In this case, a combination of an R image, a G image, and a B image can be regarded as a captured image in the RAW format.

Note that, in the case of a multi-plate image sensor, the respective image sensors are not necessarily those for the respective colors of RGB, but all of the image sensors may be monochromatic image sensors, or may include color filters in the Bayer array or the like. Note that, in a case where all the color filters are color filters in the Bayer array, or the like, if all the arrays are the same and the positional relationships among the pixels are uniform, noise reduction can be performed, for example. If the positional relationships among the respective image sensors for RGB are made to vary, it is also possible to enhance image quality, taking advantage of the effect of so-called spatial pixel shifting, for example.

In the case of such a multi-plate imaging apparatus, a plurality of monocular images and a plurality of viewpoint images are also included in a captured image output from each image sensor, or one image sensor.

<RAW Signal Processing Unit>

The RAW signal processing unit 52 performs processes related to signal processing on an image in the RAN format. For example, the PAW signal processing unit 52 can acquire a captured image (whole image) in the RAW format supplied from the image sensor 51. Also, the RAW signal processing unit 52 can perform predetermined signal processing on the acquired captured image. The specifics of the signal preprocessing may be any appropriate processing. For example, the signal processing may be defect correction, noise reduction, compression (encoding), or the like or may be some other signal processing. The RAN signal processing unit 52 can of course also perform a plurality of kinds of signal processing on the captured image. Note that the various kinds of signal processing on an image in the RAW format are performed only on an image that has been subjected to the signal processing and maintains the positional relationship in the layout of the color filters of the image sensor 51 as described above (or an image maintaining the R image, the G image, and the B image, in the case of a multi-plate imaging apparatus).

The RAW signal processing unit 52 can supply the captured image (RAW') in the RAW format subjected to the signal processing or the compressed (encoded) captured image (compressed PAW) to the storage unit 62 via the bus 60, and store the captured image into the storage medium 63. Also, the RAW signal processing unit 52 can supply the captured image (RAW') in the RAW format subjected to the signal processing or the compressed (encoded) captured image (compressed RAW) to the communication unit 64 via the bus 60, and causes the communication unit 64 to transmit the captured image. Further, the PAW signal processing unit 52 can supply the captured image (RAW') in the RAW format subjected to the signal processing or the compressed (encoded) captured image (compressed RAW) to the file generation unit 65 via the bus 60, and causes the file generation unit 65 to turn the captured image into a file. Also, the RAW signal processing unit 52 can supply the captured image (RAW') in the RAW format subjected to the signal processing' or the compressed (encoded) captured image (compressed RAM) to the image reconstruction processing unit 57 via the bus 60, and causes the image reconstruction processing unit 57 to perform an image reconstruction process. Note that, in a case where there is no need to distinguish the RAW, the RAW', and the compressed RAW (all of which are shown in FIG. 2) from one another, they are referred to as RAW images.

<Region Extraction Unit>

The region extraction unit 53 performs processes related to extraction of a region (clipping of a partial image) from a captured image in the RAW format. For example, the region extraction unit 53 can acquire a captured image (whole image) in the RAW format supplied from the image sensor 51. Also, the region extraction unit 53 can acquire information (also referred to as extraction region information) indicating the region to be extracted from the captured image, the information being supplied from the region specifying unit 56. The region extraction unit 53 can then extract a partial region (cut out a partial image) from the captured image, on the basis of the extraction region information.

For example, the region extraction unit 53 can cut out images from the captured image (whole image), the images being viewed from the respective monocular optical systems 31. That is, the region extraction unit 53 can cut out effective portions, as the images viewed from the respective monocular optical systems 31, from the regions of the respective monocular images included in the captured image. The images of the cutout effective portions (part of the monocular images) are also referred to as viewpoint images. Further, the cutout regions (the regions corresponding to the viewpoint images) in the captured image are referred to as viewpoint image regions. For example, the region extraction unit 53 can acquire, as the extraction region information, viewpoint association information that is supplied from the region specifying unit 56 and is used for specifying the viewpoint image regions, and extract each viewpoint image region indicated in the viewpoint association information from the captured image (or cut out each viewpoint image). The region extraction unit 53 can her: supply the cutout respective viewpoint images (in the RAW format) to the camera signal processing unit 54.

The region extraction unit 53 can also combine the respective viewpoint images cut out from the captured image (whole image), to generate a composite image, for example. The composite image is obtained by combining the respective viewpoint images into one set of data or one image. For example, the region extraction unit 53 can generate one image (a composite image) in which the respective viewpoint images are arranged in a planar manner. The region extraction unit 53 can supply the generated composite image (in the RAW format) to the camera signal processing unit 54.

The region extraction unit 53 can also supply the whole image to the camera signal processing unit 54, for example. The region extraction unit 53 can extract a partial region including all the monocular images from the acquired captured image (or cut out a partial image including all the monocular images), for example, and supply the camera signal processing unit 54 with the cutout partial image (which is an image obtained by deleting part or all of the regions outside all of the monocular images included in the captured image) as the whole image in the RAW format. The location (range) of the region to be extracted in this case may be determined beforehand by the region extraction unit 53, or may be designated by the viewpoint association information supplied from the region specifying unit 56.

The region extraction unit 53 can also supply the acquired captured image (which is not a partial image including all the cutout monocular images, but the entire captured image) as the whole image in the RAW format to the camera signal processing unit 54.

Note that the region extraction unit 53 can supply the partial image (the whole image, viewpoint images, or a composite image) in the RAW format cut out from the captured image as described above to the storage unit 62, the communication unit 64, the file generation unit 65, the image reconstruction processing unit 57, or the like via the bus 60, as in the case of the image sensor 51.

The region extraction unit 53 can also supply the partial image (the whole image, viewpoint images, or a composite image) in the RAW format to the RAW signal processing unit 52, and cause the RAW signal processing unit 52 to perform predetermined signal processing or compression (encoding). In this case, the RAW signal processing unit 52 can also supply the captured image (RAW') in the RAW format subjected to the signal processing or the compressed (encoded) captured image (compressed RAW) to the storage unit 62, the communication unit 64, the file generation unit 65, the image reconstruction processing unit 57, or the like via the bus 60.

That is, at least one among the captured image (or the whole image), a viewpoint image, and a composite image may be a RAW image.

<Camera Signal Processing Unit>

The camera signal processing unit 54 performs processes related to camera signal processing on an image. For example, the camera signal processing unit 54 can acquire an image (a whole image, a viewpoint image, or a composite image) supplied from the region extraction unit 53. The camera signal processing unit 54 can also perform camera signal processing (a camera process) on the acquired image. For example, the camera signal processing unit 54 can perform, on the current image, a color separation process (a demosaicing process in a case where mosaic color filters in the Bayer array or the like are used) for separating the respective, colors of RGB to generate an R image, a C image, and a B image each having the same number of pixels as the current image, a YC conversion process for converting the color space of the image subjected to the color separation from RGB to YC (luminance/color difference), and the like. The camera signal processing unit 54 can also perform processing, such as defect correction, noise reduction, automatic white balance (AWE), or gamma correction, on the current image. Further, the camera signal processing unit 54 can also compress (encode) the current image. The camera signal processing unit 54 can of course perform a plurality of camera signal processing operations on the current image, or can perform camera signal processing other than the above-described examples.

Note that the description below is based on the assumption that the camera signal processing unit 54 acquires an image in the RAW format, performs a color separation process or YC conversion on the image, and outputs an image (YC) in the YC format. This image may be a whole image, each viewpoint image, or a composite image. Further, the image (YC) in the YC format may be encoded, or may not be encoded. That is, the data that is output from the camera signal processing unit 54 may be either encoded data or unencoded image data.

That is, at least one image among a captured image (or a whole image), a viewpoint image, and a composite image may be an image in the YC format (also referred to as a YC image).

Further, an image that is output by the camera signal processing unit 54 is not subjected to a complete development process, and may not be subjected as an image (YC) in the YC format to some or all of processes related to irreversible image quality adjustment (color adjustment) such as gamma correction or a color matrix. In this case, the image (YC) in the YC format can be returned to an image in the RAW format substantially without any degradation in the stage that follows, during reproduction, or the like.

For example, the camera signal processing unit 54 can supply the image (YC) in the YC format subjected to the camera signal processing, to the display unit 61 via the bus 60, and causes the display unit 61 to display the image. Also, the camera signal processing unit 54 can supply the image (YC) in the YC format subjected to the camera signal processing, to the storage unit 62 via the bus 60, and causes the storage unit 62 to store the image into the storage medium 63. Further, the camera signal processing unit 54 can supply the image (YC) in the YC format subjected to the camera signal processing, to the communication unit 64 via the bus 60, and causes the communication unit 64 to transmit the image to the outside. Also, the camera signal processing unit 54 can supply the image (YC) in the YC format subjected to the camera signal processing, to the file generation unit 65 via the bus 60, and causes the file generation unit 65 to turn the image into a file. Further, the camera signal processing unit 54 can supply the image (YC) in the YC format subjected to the camera signal processing, to the image reconstruction processing unit 57 via the bus 60, and causes the image reconstruction processing unit 57 to perform an image reconstruction process.

Also, the camera signal processing unit 54 can supply the image (YC) in the YC format to the through-lens image generation unit 55, for example.

Note that, in a case where an image in the RAW format (a whole image, a viewpoint image, or a partial image) is stored in the storage medium 63, the camera signal processing unit 54 may be able to read the image in the RAW format from the storage medium 63 and perform signal processing on the image. In this case, the camera signal processing unit 54 can also supply an image (YC) in the YC format subjected to the camera signal processing, to the display unit 61, the storage unit 62, the communication unit 64, the file generation unit 65, the image reconstruction processing unit 57, or the like via the bus 60.

Also, the camera signal processing unit 54 may perform camera signal processing on a captured image (a whole image) in the RAW format output from the image sensor 51, and the region extraction unit 53 may extract a partial region from the captured image (whole image) after the camera signal processing.

<Through-Lens Image Generation Unit>

The through-lens image generation unit 55 per forms processes related to generation of a through-lens image. A through-lens image is an image that is displayed for the user to check an image being captured during imaging or during preparation for imaging (during a non-recording operation). A through-lens image is also referred to as a live view image or an electronic to electronic (EE) image. Note that, during still image capturing, an image before imaging is displayed. However, during moving image capturing, a through-lens image corresponding to the image being captured (recorded) as well as the image being prepared for imaging is also displayed.

For example, the through-lens image generation unit 55 can acquire an image (a whole image, a viewpoint image, or a composite image) supplied from the camera signal processing unit 54. Also, the through-lens image generation unit 55 can generate a through-lens image to be an image for display, by performing image size (resolution) conversion to convert the image size into a size compatible with the resolution of the display unit 61, for example, using the acquired image. The through-lens image generation unit 55 can supply the generated through-lens image to the display unit 61 via the bus 60, and cause the display unit 61 to display the through-lens image.

<Region Specifying Unit>

The region specifying unit 56 performs processes related to specifying (setting) of regions to be extracted from a captured image by the region extraction unit 53. For example, the region specifying unit 56 specifies viewpoint association information (VI), and supplies a viewpoint image region to the region extraction unit 53.

The viewpoint association information (VI) includes viewpoint region information indicating the viewpoint image region in a captured image, for example. The viewpoint region information may represent the viewpoint image region in any appropriate manner. For example, the viewpoint image region may be represented by the coordinates (also referred to as the center coordinates of the viewpoint image region) indicating the position corresponding to the optical axis of the monocular optical system 31 in the captured image, and the resolution (the number of pixels) of the viewpoint image (viewpoint image region). That is, the viewpoint region information may include the center coordinates of the viewpoint image region in the captured image and the resolution of the viewpoint image region. In this case, the location of the viewpoint image region in the whole image can be specified from the center coordinates of the viewpoint image region and the resolution (the number of pixels) of the viewpoint image region.

Note that the viewpoint region information is set for each viewpoint image region. That is, in a case where the captured image includes a plurality of viewpoint images, the viewpoint association information (VI) may include, for each viewpoint image (each viewpoint image region), viewpoint identification information (an identification number, for example) for identifying the viewpoint image (region) and viewpoint region information.

The viewpoint association information (VI) may also include other relevant information. For example, the viewpoint association information (VI) may include viewpoint time information indicating the time at which the captured image from which the viewpoint image is extracted was captured. Also, the viewpoint association information (IV) may include viewpoint-image-including region information indicating the viewpoint-image-including region that is the region cut out from a monocular image and include the viewpoint image region. Further, the viewpoint association information (VI) may include spot light information (SI) that is information regarding an image of spot light formed in a region that is neither a viewpoint image region nor the region of a monocular image in the captured image.

The region specifying unit 56 supplies such viewpoint association information (VI) as information indicating the specified viewpoint image region to the region extraction unit 53, so that the region extraction unit 53 can extract the viewpoint image region specified by the region specifying unit 56 (or cut out the viewpoint image), on the basis of the viewpoint association information (VI).

The region specifying unit 56 can also supply the viewpoint association information (VI) to the bus 60. For example, the region specifying unit 56 can supply The viewpoint association information (VI) to the storage unit 62 via the bus 60, and store the viewpoint association information (VI) into the storage medium 63. Also, the region specifying unit 56 can supply the viewpoint association information (VI) to the communication unit 64 via the bus 60, and cause the communication unit 64 to transmit the viewpoint association information (VI). Further, the region specifying unit 56 can supply the viewpoint association information (VI) to the file generation unit 65 via the bus 60, and cause the file generation unit 65 to turn viewpoint association information (VI) into a file. Furthermore, the region specifying unit 56 can supply the viewpoint association information (VI) to the image reconstruction processing unit 57 via the bus 60, and cause the image reconstruction processing unit 57 to use the viewpoint association information (VI)) in the image reconstruction process.

For example, the region specifying unit 56 may acquire such viewpoint association information (VI) from the control unit 81, and supply the acquired viewpoint association information (VI) to the region extraction unit 53 and the bus 60. In this case, the control unit 81 reads the viewpoint association information (VI) stored in a storage medium 83 via the storage unit 82, and supplies the viewpoint association information (VI) to the region specifying unit 56. The region specifying unit 56 supplies the viewpoint association information (VI) to the region extraction unit 53 and the bus 60. Note that the viewpoint association information (VI) may include spot light information (SI).

The viewpoint association information (VI) supplied to the storage unit 62, the communication unit 64, or the file generation unit 65 via the bus 60 in this manner is associated with an image (the whole image, a viewpoint image, or a composite image) therein. For example, the storage unit 62 can associate the supplied viewpoint association information (VI) with an image (the whole image, a viewpoint image, or a composite image), and store the information associated with the image into the storage medium 63. Also, the communication unit 64 can associate the supplied viewpoint association information (VI) with an image (the whole image, a viewpoint image, or a composite image), and transmit the information associated with the image to the outside. Further, the file generation unit 65 can associate the supplied viewpoint association information (VI) with an image (the whole image, a viewpoint image, or a composite image), and generate a file containing the information associated with the image.

The region specifying unit 56 may also acquire a captured image in the RAW format supplied from the image sensor 51, generate viewpoint association information (VI') on the basis of the captured image, and supply the generated viewpoint association information (VI') to the region extraction unit 53 and the bus 60. In this case, the region specifying unit 56 specifies each viewpoint image region from the captured image, and generates the viewpoint association information (VI') indicating the viewpoint image region (the viewpoint image region is indicated by the center coordinates of the viewpoint image region in the captured image, the resolution of the viewpoint image region, and the like, for example). The region specifying unit 56 then supplies the generated viewpoint, association information. (VI') to the region extraction unit 53 and the bus 60. Note that the viewpoint association information (VI') may include spot light information (SI') that has been generated by the region specifying unit 56 on the basis of the captured image.

Further, the region specifying unit 56 may acquire the viewpoint association information (VI) from the control unit 81, acquire the captured image in the RAW format supplied from the image sensor 51, generate the spot light information (SI') on the basis of the captured image, add the spot light, information (SI') to the viewpoint association information (VI), and supply the resultant information to the region extraction unit 53 and the bus 60. In this case, the control unit 81 reads the viewpoint association information (VI) stored in a storage medium 83 via the storage unit 82, and supplies the viewpoint association information (VI) to the region specifying unit 56. The region specifying unit 56 generates the viewpoint association information (VI') by adding the spot light information (SI') to the viewpoint association information (VI). The region specifying unit 56 supplies the viewpoint association information (VI') to the region extraction unit 53 and the bus 60.

The region specifying unit 56 may also acquire the viewpoint association information (VI) from the control unit 81, acquire the captured image in the RAW format supplied from the image sensor 51, generate the spot light information (SI') on the basis of the captured image, correct the viewpoint association information (VI) using the spot light information. (SI'), and supply the corrected viewpoint association information (VI') to the region extraction unit 53 and the bus 60. In this case, the control unit 81 reads the viewpoint association information (VI) stored in a storage medium 83 via the storage unit 82, and supplies the viewpoint association information (VI) to the region specifying unit 56. The region specifying unit 56 corrects the viewpoint association information (VI) using the spot light information (SI'), to generate the viewpoint association information CVI'). The region specifying unit 56 supplies the viewpoint association information (VI') to the region extraction unit 53 and the bus 60.

<Image Reconstruction Processing Unit>

The image reconstruction processing unit 57 performs processes related to image reconstruction. For example, the image reconstruction processing unit 57 can acquire an image (a whole image, a viewpoint image, or a composite image) in the YC format from the camera signal processing unit 54 or the storage unit 62 via the bus 60. The image reconstruction processing unit 57 can also acquire the viewpoint association information from the region specifying unit 56 or the storage unit 62 via the bus 60.

Further, using the acquired image and the viewpoint association information associated with the acquired image, the image reconstruction processing unit 57 can generate depth information and perform image processing such as refocusing for generating (reconstructing) an image focused on the desired object, for example. In a case where viewpoint images are to be processed, for example, the image reconstruction processing unit 57 uses each viewpoint image to perform processes such as depth information generation and refocusing. Further, in a case where a captured image or a composite image is to be processed, the image reconstruction processing unit 57 extracts each viewpoint image from the captured image or the composite image, and performs processes such as depth information generation and refocusing using the extracted viewpoint images.

The image reconstruction processing unit 57 can supply the generated depth information and the refocused image as the processing results to the storage unit 62 via the bus 60, and store the processing results into the storage medium 63. The image reconstruction processing unit 57 can also supply the generated depth information and the refocused image as the processing results to the communication unit 64 via the bus 60, and cause the communication unit 64 to transmit the processing results to the outside. Further, the image reconstruction processing unit 57 can supply the generated depth information and the refocused image as the processing results to the file generation unit 65 via the bus 60, and cause the file generation unit 65 to turn the processing results into a file.

<Bus>

To the bus 60, the following components are connected: the image sensor 51, the RAN signal processing unit 52, the region extraction unit 53, the camera signal processing unit 54, the through lens image generation unit 55, the region specifying unit 56, the image reconstruction processing unit 57, the display unit 61, the storage unit 62, the communication unit 64, and the file generation unit 65. The bus 60 functions as a transmission medium (transmission channel) of various kinds of data to be exchanged between these blocks. Note that the bus 60 may be formed with a cable, or may be formed with wireless communication.

<Display Unit>

The display unit 61 is formed with a liquid crystal panel, an organic electro-luminescence (EL) panel, or the like, for example, and is provided integrally with or separately from the housing of the camera 10. For example, the display unit 61 may be provided on the back surface of the housing of the camera 10 (on the surface opposite to the surface on which the multiple optical system 30 is provided).

The display unit 61 performs processes related to image display. For example, the display unit 61 can acquire a through-lens image in the YC format supplied from the through-lens image generation unit 55, convert the format into the RGB format, and display the resultant image in the RGB format. In addition to that, the display unit 61 can also display information such as a menu and settings of the camera 10, for example.

The display unit 61 can also acquire and display, an image in the YC format (a captured image, viewpoint images, or a composite image) supplied from the storage unit 62. The display unit 61 can also acquire and display a thumbnail image in the YC format supplied from the storage unit 62. Further, the display unit 61 can acquire and display an image in the YC format (a captured image, viewpoint images, or a composite image) supplied from the camera signal processing unit 54.

<Storage Unit>

The storage unit 62 controls the storage in the storage medium 63, which is formed with a semiconductor memory or the like, for example. This storage medium 63 may be a removable storage medium, or may be a storage medium included in the camera 10. For example, the storage unit 62 can store, into the storage medium 63, an image (a captured image, viewpoint images, or a composite image) supplied via the bus 60, in response to an operation performed by the control unit 61, a user, or the like.

For example, the storage unit 62 can acquire an image in the RAW format (a whole image, a viewpoint image, or a composite image) supplied from the image sensor 51 or the region extraction unit 53, and store the image into the storage medium 63. The storage unit 62 can also acquire a signal-processed image in the RAW format (a whole image, a viewpoint image, or a composite image) supplied from the RAW signal processing unit 52, or a compressed (encoded) image in the RAW format (a whole image, a viewpoint image, or a composite image) supplied from the RAW signal processing unit 52, and store the image into the storage medium 63. Further, the storage unit 62 can acquire an image in the YC format (a whole image, a viewpoint image, or a composite image) supplied from the camera signal processing unit 54, and store the image into the storage medium 63.

At that time, the storage unit 62 can acquire the viewpoint association information supplied from the region specifying unit 56, and associate the viewpoint association information with the above-mentioned image (a whole image, a viewpoint image, or a composite image). That is, the storage unit 62 can associate the image (a whole image, a viewpoint image, or a composite image) and the viewpoint association information with each other, and store the image associated with the viewpoint association information into the storage medium 63. That is, the storage unit 62 functions as an association unit that associates at least one image among a whole image, a viewpoint image, and a composite image with the viewpoint association information.

For example, the storage unit 62 can also acquire the depth information and the refocused image supplied from the image reconstruction processing unit 57, and store them into the storage medium 63. Further, the storage unit 62 can acquire the file supplied from the file generation unit 65, and store the file into the storage medium 63. This file contains an image (a whole image, a viewpoint image, or a composite image) and viewpoint association information, for example. That is, in this file, the image (a whole image, a viewpoint image, or a composite image) and the viewpoint association information are associated with each other.

For example, the storage unit 62 can also read data, a file, or the like stored in the storage medium 63 in response to an operation performed by the control unit 81, a user, or the like, and supply the read data, file, or the like to the camera signal processing unit 54, the display unit 61, the communication unit 64, the file generation unit 65, the image reconstruction processing unit 57, or the like via the bus 60. For example, the storage unit 62 can read an image in the YC format (a whole image, a viewpoint image, or a composite image) from the storage medium 63, supply the image to the display unit 61, and cause the display unit 61 to display the image. The storage unit 62 can also read an image in the RAN format (a whole image, a viewpoint image, or a composite image) from the storage medium 63, supply the image to the camera signal processing unit 54, and cause the camera signal processing unit 54 to perform camera signal processing.

Further, the storage unit 62 can read data or a file of an image (a whole image, a viewpoint image, or a composite image) and viewpoint association information that are associated with each other and are stored in the storage medium 63, and supply the data or the file to another processing unit. For example, the storage unit 62 can read, from the storage medium 63, an image (a whole image, a viewpoint image, or a composite image) and viewpoint association information associated with each other, supply the image and the viewpoint association information to the image reconstruction processing unit 57, and cause the image reconstruction processing unit 57 to perform processes such as depth information generation and refocusing. Also, the storage unit 62 can read, from the storage medium 63, an image (a whole image, a viewpoint image, or a composite image) and viewpoint association information associated with each other, supply the image and the viewpoint association information to the communication unit 64, and cause the communication unit 64 to transmit the image and the viewpoint association information. Further, the storage unit 62 can read, from the storage medium 63, an image (a whole image, a viewpoint image, or a composite image) and viewpoint association information associated with each other, supply the image and the viewpoint association information to the file generation unit 65, and cause the file generation unit 65 to turn the image and the viewpoint association information into a file.

Note that the storage medium 63 may be a read only memory (ROM), or may be a rewritable memory such as a random access memory (RAM) or a flash memory. In the case of a rewritable memory, the storage medium 63 can store any information.

<Communication Unit>

The communication unit 64 communicates with a server on the Internet, a PC on a cable or wireless LAN, some other external device, or the like by an appropriate communication method. For example, the communication unit 64 can transmit data and a file of an image (a captured image, viewpoint images, or a composite image), viewpoint association information, and the like to the other side of communication (an external device) by a streaming method, an upload method, or the like through the communication, in response to control performed by the control unit 81, an operation performed by the user, or the like.

For example, the communication unit 64 can acquire and transmit an image in the RNN format (a captured image, viewpoint images, or a composite image) supplied from the image sensor 51 or the region extraction unit 53. The communication unit 64 can also acquire and transmit a signal-processed image in the RAW format (a captured image, viewpoint images, or a composite image) supplied from the RAW signal processing unit 52, or a compressed (encoded) image in the RAW format (a captured image, a viewpoint image, or a composite image) supplied from the RAW signal processing unit 52. Further, the communication unit 64 can acquire and transmit an image in the YC format (a captured image, viewpoint images, or a composite image) supplied from the camera signal processing unit 54.

At that time, the communication unit 64 can acquire the viewpoint association information supplied from the region specifying unit 56, and associate the viewpoint association information with the above-mentioned image (a whole image, a viewpoint image, or a composite image). That is, the communication unit 64 can associate the image (a whole image, a viewpoint image, or a composite image) and the viewpoint association information with each other, and transmit the image associated with the viewpoint association information. In a case where an image is to be transmitted by a streaming method, for example, the communication unit 64 repeats the process of acquiring an image to be transmitted (a whole image, a viewpoint image, or a composite image) from the processing unit that supplies the image, associating the image with the viewpoint association information supplied from the region specifying unit 56, and transmitting the image. That is, the communication unit 64 functions as an association unit that associates at least one image among a whole image, a viewpoint image, and a composite image with the viewpoint association information.

For example, the communication unit 64 can also acquire and transmit depth information and a refocused image supplied from the image reconstruction processing unit 57. Further, the communication unit 64 can acquire and transmit a file supplied from the file generation unit 65. This file contains an image (a whole image, a viewpoint image, or a composite image) and viewpoint association information, for example. That is, in this file, the image (a whole image, a viewpoint image, or a composite image) and the viewpoint association information are associated with each other.

<File Generation Unit>

The file generation unit 65 performs processes related to file generation. For example, the file generation unit 65 can acquire an image in the RAW format (a whole image, a viewpoint image, or a composite image) supplied from the image sensor 51 or the region extraction unit 53. The file generation unit 65 can also acquire a signal-processed image in the RNW format (a whole image, a viewpoint image, or a composite image) supplied from the RAW signal processing unit 52, or a compressed (encoded) image in the RAW format (a whole image, a viewpoint image, or a composite image) supplied from the RAW signal processing unit 52. Further, the file generation unit 65 can acquire and an image in the YC format (a whole image, a viewpoint image, or a composite image) supplied from the camera signal processing unit 54. Also, the file generation unit 65 can acquire viewpoint association information supplied from the region specifying unit 56, for example.

The file generation unit 65 can turn a plurality of acquired pieces of data into a file, and generate one file containing the plurality of pieces of data, to associate the plurality of pieces of data with one another. For example, the file generation unit 65 can generate one file from the above mentioned image (a whole image, a viewpoint image, or a composite image) and the viewpoint association information, to associate the image and the viewpoint association information with each other. That is, the File generation unit 65 functions as an association unit that associates at least one image among a whole image, a viewpoint image, and a composite image with the viewpoint association information.

For example, the file generation unit 65 can also acquire depth information and a refocused image supplied from the image reconstruction processing unit 57, and turn them into a file. Further, the file generation unit 65 can generate one file from an image (a whole image, a viewpoint image, or a composite image) and viewpoint association information that are supplied from the storage unit 62 and are associated with each other.

Note that the file generation unit 65 can generate a thumbnail image of an image (a viewpoint image, for example) to be turned into a file, and put the thumbnail image into a generated file. That is, by generating a file, the file generation unit 65 can associate this thumbnail image with the image (a whole image, a viewpoint image, or a composite image) and viewpoint association information.

The file generation unit 65 can supply the generated file (the image and the viewpoint association information associated with each other) to the storage unit 62 via the bus 60, for example, and store the file into the storage medium 63. The file generation unit 65 can also supply the generated file (the image and the viewpoint association information associated with each other) to the communication unit 64 via the bus 60, for example, and cause the communication unit 64 to transmit the file.

<Association Unit>

The storage unit 62, the communication unit 64, and the file generation unit 65 are also referred to as an association unit 70. The association unit 70 associates an image (a whole image, a viewpoint image, or a composite image) with viewpoint association information. For example, the storage unit 62 can associate at least one image among a whole image, a viewpoint image, and a composite image with viewpoint association information, and store the image associated with the viewpoint association information into the storage medium 63. Also, the communication unit 64 can associate at least one image among a whole image, a viewpoint image, and a composite image with viewpoint association information, and transmit the image associated with the viewpoint association information. Further, the file generation unit 65 can generate one file from at least one image among a whole image, a viewpoint image, and a composite image, and viewpoint association information, to associate the image and the viewpoint association information with each other.

<Control Unit>

The control unit 81 performs control processes related to the camera 10. That is, the control unit 81 can control each component of the camera 10, and cause the camera 10 to perform processes. For example, the control unit 81 can control the multiple optical system 30 (each of the monocular optical systems 31) via the optical system control unit 84, and cause the multiple optical system 30 to perform the optical system settings related to imaging, such as settings of an aperture and a focus position. The control unit 81 can also control the image sensor 51 to cause the image sensor 51 to perform imaging (photoelectric conversion) and generate a captured image.

Further, the control unit 81 can supply viewpoint association information (VI) to the region specifying unit 56, and cause the region specifying unit 56 to specify the region to be extracted from the captured image. Note that the viewpoint association information (VI) may include spot light information (SI). Also, the control unit 81 may read the viewpoint association information (VI) stored in the storage medium 83 via the storage unit 82, and supply the viewpoint association information (VI) to the region specifying unit 56.

The control unit 81 can also acquire an image via the bus 60, and control the aperture via the optical system control unit 84, on the basis of the luminance of the image. Further, the control unit 81 can control the focus via the optical system control unit 84, on the basis of the sharpness of the image. Also, the control unit 81 can control the camera signal processing unit 54 on the basis of the RGB ratio of the image, to control the white balance gain.

<Storage Unit>

The storage unit 82 controls the storage in the storage medium 83, which is formed with a semiconductor memory or the like, for example. This storage medium 83 may be a removable storage medium, or may be a built-in memory. This storage medium 83 stores viewpoint association information (VI), for example. This viewpoint association information (VI) is information corresponding to (the respective monocular optical systems 31 of) the multiple optical system 30 and the image sensor 51. That is, the viewpoint association information (VI) is information regarding the viewpoint images having the respective monocular optical systems 31 of the multiple optical system 30 as the viewpoints, and is information to be used for specifying the viewpoint image regions. For example, the viewpoint association information (VI) may include spot light information (SI) For example, the storage unit 82 can read the viewpoint association information (VI) stored in the storage medium 83 in response to an operation or the like performed by the control unit 81 or the user, and supply the viewpoint association information (VI) to the control unit 81.

Note that the storage medium 83 may be a ROM, or may be a rewritable memory such as a RAM or a flash memory. In the case of a rewritable memory, the storage medium 83 can store desired information.

Alternatively, the storage unit 82 and the storage medium 83 may be substituted by the storage unit 62 and the storage medium 63. That is, information (the viewpoint association information (VI) or the like) to be stored into the storage medium 83 described above may be stored into the storage medium 63. In that case, the storage unit 82 and the storage medium 83 are not necessarily prepared.

<Optical System Control Unit>

The optical system control unit 84 controls (the respective monocular optical systems 31 of) the multiple optical system 30, under the control of the control unit 81. For example, the optical system control unit 84 can control the lens groups and the aperture of each of the monocular optical systems 31, to control the focal length and/or the f-number of each of the monocular optical systems 31. Note that, in a case where the camera 10 has an electric focus adjustment function, the optical system control unit 84 can control the focus (focal length) of (each of the monocular optical systems 31 of) the multiple optical system 30. Also, the optical system control unit 84 may be able to control the aperture (f-number) of each of the monocular optical systems 31.

Note that, instead of such an electric focus adjustment function, the camera 10 may include a mechanism (a physical component) that adjusts the focal length by manually operating a focus ring provided on the lens barrel. In that case, the optical system control unit 84 is not necessarily prepared.

<Association with the Viewpoint Association Information>

The camera 10 can extract, from a captured image, viewpoint images having the respective monocular optical systems 31 as the viewpoints. Since the plurality of viewpoint images extracted from one captured image is images having different viewpoints, it is possible to perform processes such as depth estimation through multiple matching and correction for reducing errors in the attachment of the multiple lenses, for example, using these viewpoint images. However, to perform these processes, information such as the relative positions of the respective viewpoint images is necessary.

Therefore, the camera 10 associates the viewpoint association information, which is the information to be used for specifying the regions of the plurality of viewpoint images in the captured image, with the whole image, the viewpoint image, or the composite image to be output.

Here, the term "to associate" means to enable use of other data (or a link to other data) while data is processed, for example. That is, the captured image and the viewpoint association information as data (file) may be in any appropriate form. For example, the captured image and the viewpoint association information may be integrated as one set of data, (one file), or may be separately collected as data (files). For example, the viewpoint association information associated with the captured image may be transmitted through a transmission channel different from that for the captured image. Alternatively, the viewpoint association information associated with the captured image may be recorded in a recording medium different from the captured image (or in a different recording area of the same recording medium), for example. The captured image and the viewpoint association information may of course be combined into one stream data, or may be integrated into one file. Note that the image with which the viewpoint association information is associated may be a still image or a moving image.

In the case of a moving image, region extraction, association with viewpoint association information, and the like can be performed for each frame image, as in the case of a still image.

Also, this "association" may apply to some of the data, instead of the entire data. For example, in a case where the captured image is a moving image formed with a plurality of frames, the viewpoint association information may be associated with any units in the captured image, such as a plurality of frames, one frame, or a portion in a frame.

Note that, in a case where the captured image and the viewpoint association information are individual pieces of data (files), it is possible to associate the captured image and the viewpoint association information with each other by assigning the same identification number to both the captured image and the viewpoint association information. Alternatively, in a case where the captured image and the viewpoint association information are combined into one file, the viewpoint association information may be added to the header or the like of the captured image, for example. Note that the image to be associated with the viewpoint association information may be the captured image (the whole image), a viewpoint image, or a composite image of viewpoint images.

<Outputting of a Whole Image>

Figure 5:
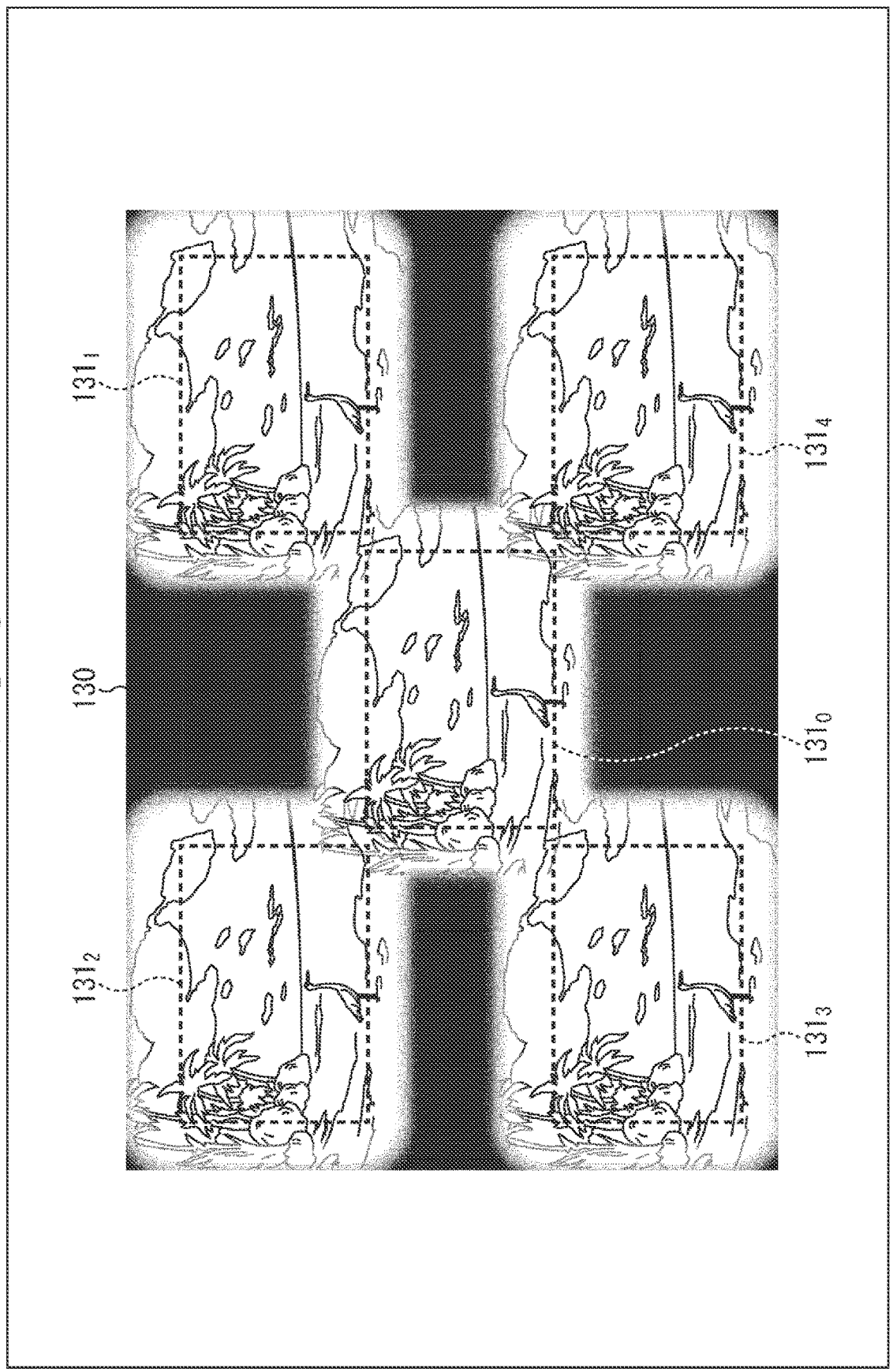
FIG. 5 is a diagram showing an example of a whole image.

A case where a whole image is to be output is now described. FIG. 5 shows an example of a whole image. As shown in FIG. 5, a whole image 130 includes monocular images corresponding to the respective monocular optical systems 31 (images obtained by photoelectrically converting light entering from the object through the respective monocular optical systems 31). For example, the image at the center of the whole image 130 is the monocular image corresponding to the monocular optical system $31_0$. Also, the upper right image in the whole image 130 is the monocular image corresponding to the monocular optical system $31_1$. Further, the upper left image in the whole image 130 is the monocular image corresponding to the monocular optical system $31_2$. Also, the lower left image in the whole image 130 is the monocular image corresponding to the monocular optical system $31_3$. Further, the lower right image in the whole image 130 is the monocular image corresponding to the monocular optical system $31_4$.

Note that this whole image 130 may be an entire captured image generated by the image sensor 51, or may be a partial image that is cut out from the captured image (but includes all the monocular images). Alternatively, this whole image 130 may be an image in the RAN format, or may be an image in the YC format.

The viewpoint region information specifies a portion (the effective portion) of each of the monocular images as the viewpoint image regions in the whole image 130. For example, in the case illustrated in FIG. 5, the regions surrounded by dashed-line frames in the whole image 130 is the viewpoint image regions. That is, a portion (the effective portion) of the monocular image corresponding to the monocular optical system $31_0$ is designated as a viewpoint image region $131_0$. Likewise, a portion (the effective portion) of the monocular image corresponding to the monocular optical system $31_1$ is designated as a viewpoint image region $131_1$. Also, a portion (the effective portion) of the monocular image corresponding to the monocular optical system $31_2$ is designated as a viewpoint image region $131_2$. Further, a portion (the effective portion) of the monocular image corresponding to the monocular optical system $31_3$ is designated as a viewpoint image region $131_3$. Also, a portion (the effective portion) of the monocular image corresponding to the monocular optical system $31_4$ is designated as a viewpoint image region $131_4$. Note that, in the description below, the viewpoint image regions $131_0$ to $131_4$ will be referred to as the viewpoint image regions 131 in a case where there is no need to distinguish the viewpoint image regions from one another.

In a case where such a whole image 130 is to be output, the association unit 70 acquires the whole image 130 from the image sensor 51, the RAW signal processing unit 52, or the camera signal processing unit 54, and associates the whole image 130 with the viewpoint association information that is supplied from the region specifying unit 56 and corresponds to the multiple optical system 30. The association unit 70 then outputs the whole image and the viewpoint association information associated with each other. In an example of the output, the storage unit 62 may store the whole image and the viewpoint association information associated with each other into the storage medium 63, for example. Also, the communication unit 64 may transmit the whole image and the viewpoint association information associated with each other. Further, the file generation unit 65 may turn the whole image and the viewpoint association information associated with each other into a file.

Note that the association between the whole image and the viewpoint association information may be performed by the region extraction unit 53. That is, the region extraction unit 53 may associate the whole image to be output with the viewpoint association information supplied from the region specifying unit 56, and supply the whole image and the viewpoint association information associated with each other to the bus 60, the RAW signal processing unit 52, or the camera signal processing unit 54.

The viewpoint association information in this case includes the viewpoint region information indicating the plurality of viewpoint image regions in the captured image. The viewpoint region information may represent the viewpoint image regions in any appropriate manner. For example, a viewpoint image region may be represented by the coordinates (the center coordinates of the viewpoint image region) indicating the position corresponding to the optical axis of the monocular optical system 31 in the captured image, and the resolution (the number of pixels) of the viewpoint image (viewpoint image region). That is, the viewpoint region information may include the center coordinates of the viewpoint image regions in the captured image and the resolutions of the viewpoint image regions. In this case, the locations of the viewpoint image regions in the whole image 130 can be specified from the center coordinates of the viewpoint image regions and the resolutions (the numbers of pixels) of the viewpoint image regions.

By associating the captured image with such viewpoint association information, it is possible to use this viewpoint association information in the viewpoint image extraction as the preprocessing for processes in later stages, such as depth estimation through multiple matching, and reduction of errors that might occur during the attachment (installation) of the multiple optical system 30. For example, after extracting each viewpoint image on the basis of the viewpoint region information included in the viewpoint association information, the image reconstruction processing unit 57 can perform the processes in later stages, such as depth estimation through multiple matching, a refocusing process, and a process for reducing errors that might occur during the attachment (installation) of the multiple optical system 30.

Note that, even if the whole image 130 is not associated with the viewpoint association information, the image reconstruction processing unit 57 may be able to specify the viewpoint image regions included in the whole image 130 through image processing, for example. However, it might be difficult to accurately specify the viewpoint image regions in the captured image, depending on imaging conditions or the like. Therefore, the whole image 130 is associated with the viewpoint association information as described above, so that the image reconstruction processing unit 57 can more easily and more accurately extract the viewpoint image regions from the whole image 130, on the basis of the viewpoint association information.

<Outputting of Viewpoint Images>

Figure 6:
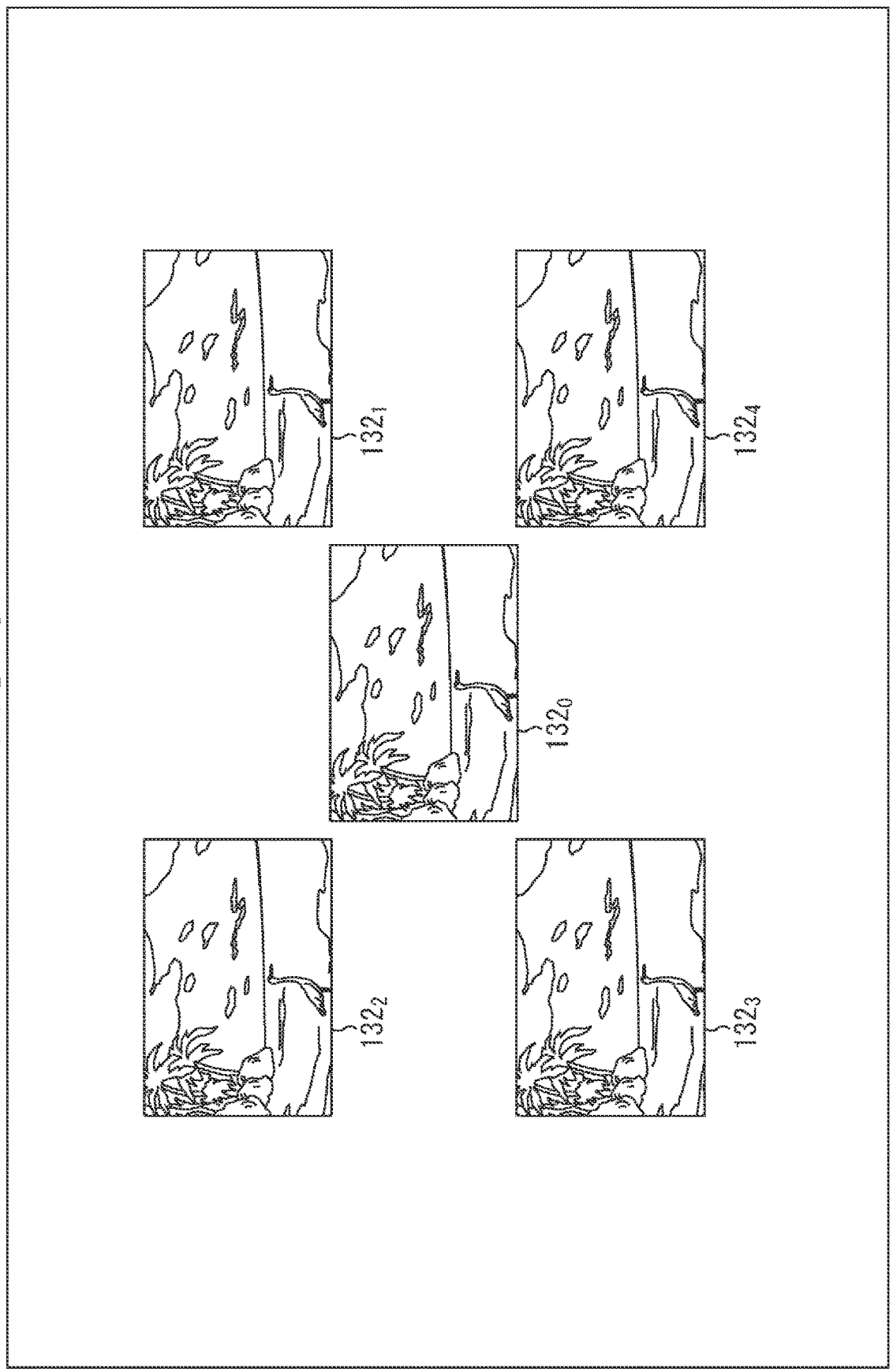
FIG. 6 is a diagram showing an example of monocular images.

Next, a case where viewpoint images are to be output is described. FIG. 6 is a diagram showing an example of cutout viewpoint images. In FIG. 6, a viewpoint image 132$_0$ is the image obtained by extracting the viewpoint image region 131$_0$ from the whole image 130 (FIG. 5). A viewpoint image 132$_1$ is the image obtained by extracting the viewpoint image region 131$_1$ from the whole image 130. A viewpoint image 132$_2$ is the image obtained by extracting the viewpoint image region 131$_2$ from the whole image 130. A viewpoint image 132$_3$ is the image obtained by extracting the viewpoint image region 131$_3$ from the whole image 130. A viewpoint image 132$_4$ is the image obtained by extracting the viewpoint image region 131$_4$ from the whole image 130. Note that, in the description below, the viewpoint images 132$_0$ to 132$_4$ will be referred to as the viewpoint images 132 in a case where there is no need to distinguish the viewpoint images from one another.

In a case where such viewpoint images are to be output, the region extraction unit 53 outputs each viewpoint image 132 cut out as in the example shown in FIG. 6 as an independent piece of data (or a file).

For example, the region extraction unit 53 cuts out the viewpoint images from the captured image (whole image) in accordance with the viewpoint association information supplied from the region specifying unit 56. The region extraction unit 53 assigns, to each cutout viewpoint image, viewpoint identification information (identification numbers, for example) for identifying each viewpoint. The region extraction unit 53 supplies the camera signal processing unit 54 with each viewpoint image to which the viewpoint identification information is assigned. The camera signal processing unit 54 performs camera signal processing on each viewpoint image in the RAW format, to generate each viewpoint image in the YC format. The camera signal processing unit 54 supplies the association unit 70 with each viewpoint image in the YC format. Further, the region specifying unit 56 supplies the association unit 70 with the viewpoint association information supplied to the region extraction unit 53.

The association unit 70 associates each viewpoint image with the viewpoint association information corresponding to the viewpoint image. The viewpoint association information may include the viewpoint identification information (the viewpoint identification number, for example) for identifying each viewpoint. On the basis of this viewpoint identification information, the association unit 70 associates each viewpoint image with the viewpoint association information corresponding to the viewpoint image. By referring to this viewpoint identification information, the association unit 70 can easily grasp which viewpoint association information corresponds to which viewpoint image. That is, using this viewpoint identification information, the association unit 70 can correctly associate each viewpoint image with the viewpoint association information more easily.

The association unit 70 then outputs each viewpoint image and the viewpoint association information associated with each other. For example, the storage unit 62 may store each viewpoint image and the viewpoint association information associated with each other into the storage medium 63. Also, the communication unit 64 may transmit each viewpoint image and the viewpoint association information associated with each other. Further, the file generation unit 65 may turn each viewpoint image and the viewpoint association information associated with each other into a file.

Note that the association between each viewpoint image and the viewpoint association information may be performed by the region extraction unit 53. That is, the region extraction unit 53 may associate each viewpoint image to be output with the viewpoint association information supplied from the region specifying unit 56, and supply each viewpoint image and the viewpoint association information associated with each other to the bus 60, the RAW signal processing unit 52, or the camera signal processing unit 54.

Further, the viewpoint association information may include viewpoint time information indicating the time at which the captured image from which the viewpoint images are extracted was captured, and the order in which the viewpoint images are extracted. In a case where viewpoint images extracted from a plurality of captured images coexist, or where the viewpoint images are moving images or continuous images, it might be difficult to identify which viewpoint image is extracted from which captured image. By associating the viewpoint images with the viewpoint time information indicating the times of generation and the order of the captured images, it is possible to more easily identify the captured images corresponding to the respective viewpoint images (the captured images from which the respective viewpoint mages are extracted). In other words, it is possible to more easily specify a plurality of viewpoint images extracted from the same captured image. Additionally, even in a case where recorded files are not comprehensively managed, it is possible to specify each viewpoint image at the same time.

Note that, monocular images may be cut out from a captured image, and be processed or recorded, as in the case of viewpoint images.

<Outputting of a Composite Image>

Figure 7:
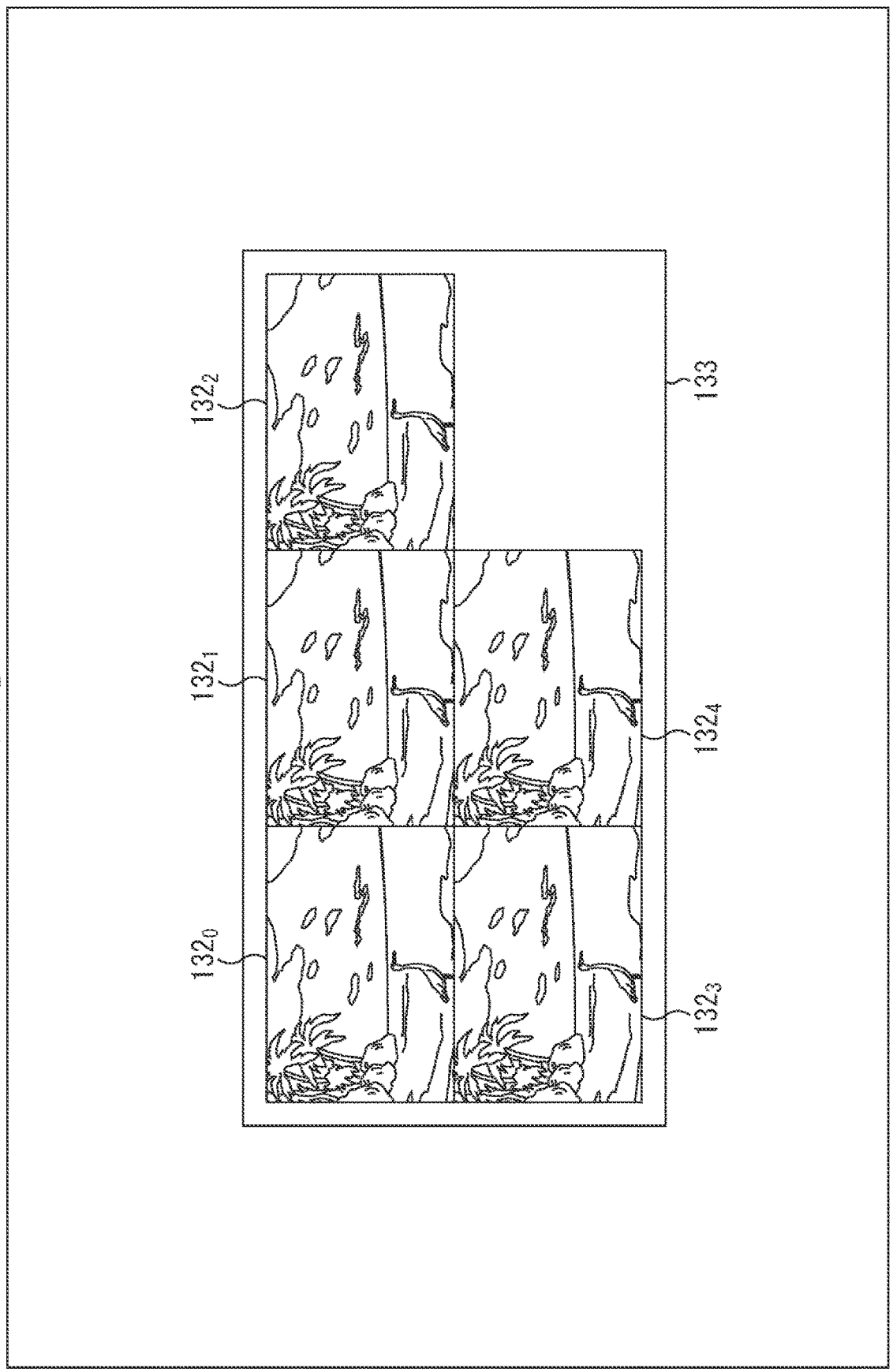
FIG. 7 is a diagram showing an example of a composite image.

Next, a case where a composite image is to be output is described. FIG. 7 is a diagram showing an example of a composite image obtained by combining the respective viewpoint images. In the example case shown in FIG. 7, one composite image 133 is generated by combining the viewpoint images 132$_0$ to 132$_4$ extracted in the example shown in FIG. 6 so as to be displayed side by side in one image. That is, the composite image 133 is obtained by combining the respective viewpoint images 132 into one set of data (one frame) or one file.

Note that, in FIG. 7, a margin region is shown around the viewpoint images 132$_0$ to 132$_4$ of the composite image 133. However, the composite image 133 may or may not have this margin region. Further, the shape of the composite image 133 is only required to be rectangular, and the method for arranging (laying out) the respective viewpoint images 132 may be any appropriate method. As in the example shown in FIG. 7, a blank region (the region corresponding to the sixth viewpoint image 132) generated in a case where the five viewpoint images 132 are arranged in two rows and three columns may be expressed by null data or a fixed value.

For example, the region extraction unit 53 cuts out the viewpoint images from the captured image (whole image) in accordance with the viewpoint association information supplied from the region specifying unit 56. The region extraction unit 53 generates a composite image by combining the respective cutout viewpoint images so as to be displayed side by side in one image. At that time, by determining the alignment sequence (positions) of the respective viewpoint images beforehand, it is possible to easily grasp which viewpoint each of the viewpoint images included in the composite image has.

Alternatively, the combining may be performed after viewpoint identification information (an identification numbers, for example) is assigned to each viewpoint image. In this case, it is also possible to easily grasp which viewpoint each viewpoint image included in the composite image has. In the description below, the alignment sequence of the respective viewpoint images in the composite image is determined in advance.

The region extraction unit 53 supplies the camera signal processing unit 54 with the composite image to which the viewpoint identification information is assigned. The camera signal processing unit 54 performs camera signal processing on the composite image in the RAW format, to generate a composite image in the YC format. The camera signal processing unit 54 supplies the association unit 70 with the composite image in the YC format. Further, the region specifying unit 56 supplies the association unit 70 with the viewpoint association information supplied to the region extraction unit 53.

The association unit 70 associates the composite image with the viewpoint association information. The viewpoint of each viewpoint image included in the composite image is more apparent from the position of the viewpoint image in the composite image. That is, it is possible to easily grasp to which viewpoint region information in the viewpoint association information each viewpoint image corresponds.

The association unit 70 then outputs the composite image and the viewpoint association information associated with each other. For example, the storage unit 62 may store the composite image and the viewpoint association information associated with each other into the storage medium 63. Also, the communication unit 64 may transmit the composite image and the viewpoint association information associated with each other. Further, the file generation unit 65 may turn the image and the viewpoint association information associated with each other into a file.

Note that the association between the composite image and the viewpoint association information may be performed by the region extraction unit 53. That is, the region extraction unit 53 may associate the composite image to be output with the viewpoint association information supplied from the region specifying unit 56, and supply the composite image and the viewpoint association information associated with each other to the bus 60, the RAW signal processing unit 52, or the camera signal processing unit 54.

<Adjustment of Depth of Field>

In the case of the camera array disclosed in Non-Patent Document 1, if there is a difference in the depth of field of each camera (variation in the depth of field), the range in which refocusing can be performed is limited by the cameras having the smallest depth of field on the front side and the back side with respect to the focal point of the lens, and therefore, there is a possibility that it will become difficult to obtain a sufficiently wide range in which focusing can be performed. Also, in a case where a depth estimation process is performed on each obtained viewpoint image, it might be difficult to obtain accurate depth information due to a difference in the depth of field of each camera (variation in the depth of field).

Therefore, to widen the focusing range and widen the range in which refocusing can be performed, it is necessary to adjust the depth of field of each camera and reduce the difference (reduce the variation). Likewise, to obtain more accurate depth information, it is necessary to adjust the depth of field of each camera and reduce the difference (reduce the variation). In the camera array, disclosed in Non-Patent Document 1, however, the depth of field of each camera cannot be adjusted. Therefore, the camera 10 is designed to be able to adjust the depth of field of each monocular optical system. For example, the camera 10 includes a depth-of-field adjustment function for adjusting the depth of field of at least one monocular optical system among a plurality of monocular optical systems having optical paths independent of one another. With this arrangement, depth-of-field adjustment can be performed.

Figure 8:
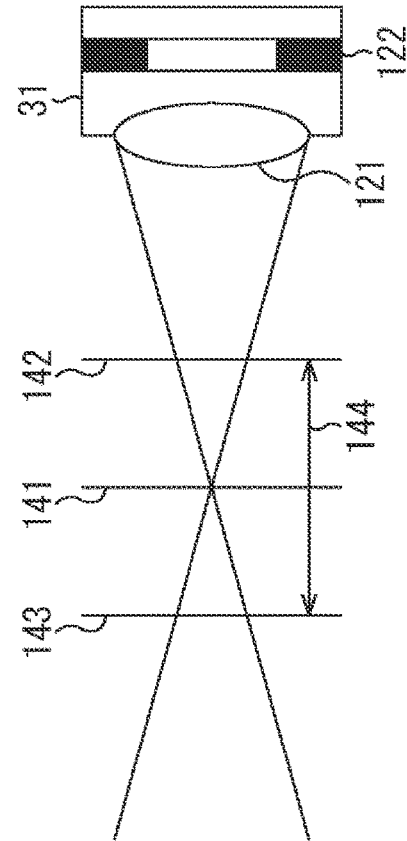
FIG. 8 is a diagram for explaining depth of field.

Next, how such depth-of-field adjustment is performed is described. An in-focus position 141 shown in FIG. 8 is the position of the focal point of a lens group 121. The distance from the principal point of the lens group 121 to this in-focus position 141 is also referred to as the focal length. A depth of field 144 is the range of the distance of the object regarded to be in focus, and is a predetermined range (the range indicated by a double-headed arrow in the drawing) in the optical axis direction of the monocular optical system 31, with the in-focus position 141 being the center (gravity center). That is, the image captured in this state is focused on the object located within the range of the depth of field 144.

A front depth of field 142 is the limit on the front side as viewed from the monocular optical system 31 having the depth of field 144. That is, the focus is not put on any object located on the front side of the front depth of field 142. Meanwhile, a back depth of field 143 is the limit on the back side as viewed from the monocular optical system 31 having the depth of field 144. That is, the focus is not put on any object located on the back side of the back depth of field 143.

Figure 9:
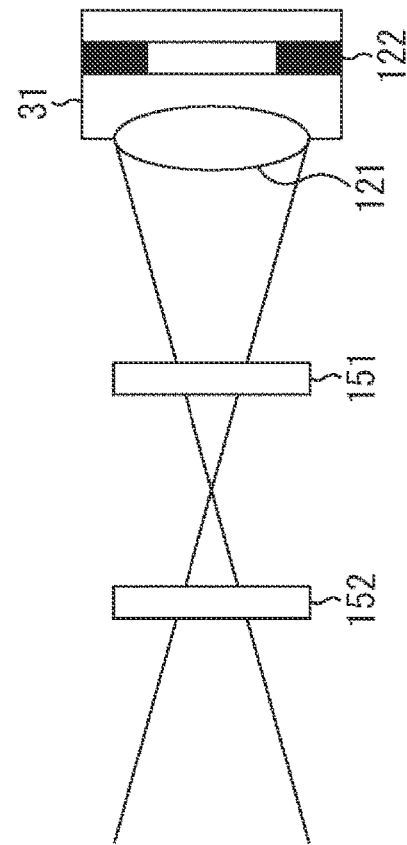
FIG. 9 is a diagram for explaining correction of depth of field.

As shown in FIG. 9, for example, an adjustment object 151 is placed at a predetermined position in front of the in-focus position 141 as viewed from the monocular optical system 31, and imaging is then performed, so that the front depth of field 142 is measured. For example, the adjustment object 151 is placed at the front depth of field 142 corresponding to the set value of the lens group 121, and imaging is then performed. Also, as shown in FIG. 9, for example, an adjustment object 152 is placed at a predetermined position behind the in-focus position 141 as viewed from the monocular optical system 31, and imaging is then performed, so that the back depth of field 143 is measured. For example, the adjustment object 151 is placed at the back depth of field 143 corresponding to the set value of the lens group 121, and imaging is then performed.

Figure 10:
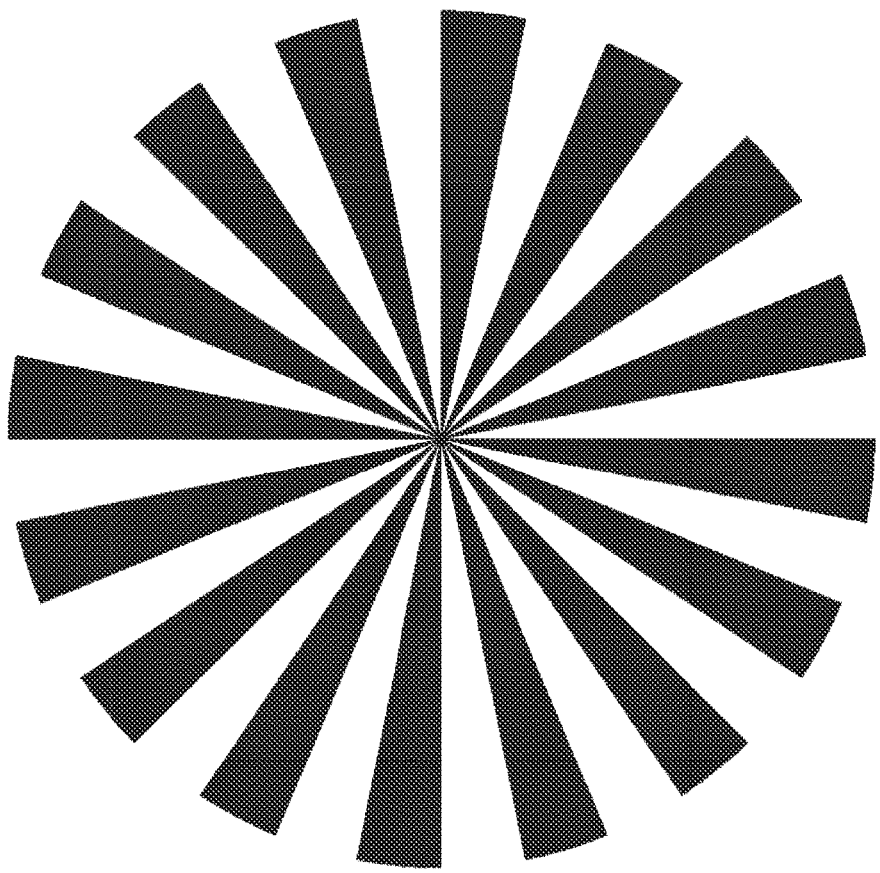
FIG. 10 is a diagram showing an example of a Siemens Star.

The adjustment object 151 and the adjustment object 152 may be any appropriate objects. For example, a resolution chart or a Siemens Star as shown in FIG. 10 may be used as each of the adjustment object 151 and the adjustment object 152.

The range between the front depth of field 142 and the back depth of field 143 obtained by the imaging as described above is the depth of field 144.

In a case where a plurality of monocular optical systems 31 as included as an the camera 10, it as conceivable that the depths of field 144 of the respective monocular optical systems 31 are different from each other (there is a difference in the depth of field 144 of each monocular optical system 31). The "state in which there is a difference in the depth of field 144" is a state in which the depths of field 144 do not match. The "state in which the depths of field 144 do not match" is a state other than the state in which the depths of field 144 match. At least a state in which the depths of field 144 (the ranges in the optical axis directions of the monocular optical systems 31) do not completely overlap each other, as in the state of the depth of field 144A of a monocular optical system 31A and the depth of field 144B of a monocular optical system 31B shown in FIG. 11, for example, is included in the state in which there is a difference in the depth of field 144.

As described above, in a case where the depths of field 144 do not match, the depth of field of each of the monocular optical systems 31 is corrected so that the depths of field match (or are put into a matching state). The "state in which the depths of field 144 match" is ideally the state in which the depths of field 144 being compared (the ranges in the optical axis directions of the monocular optical systems 31) completely match (or the state in which the positions of the front depth of field 142 and the back depth of field 143 match). In this case, the "state in which the depths of field 144 do not match" indicates some other state, which is a state in which the position of at least either the front depth of field 142 or the back depth of field 143 does not match.

However, the present invention is not limited to this example. For example, a state in which at least the in-focus positions are the same may be referred to as the "state in which the depths of field 144 match". That is, a state in which the in-focus positions are the same, and one depth of field 144 includes the other depth of field 144 may also be included in the "state in which the depths of field 144 match". In this case, the "state in which the depths of field 144 do not match" indicates some other state, which is a state in which at least the in-focus positions do not match.

Also, a state in which the depths of field 144 being compared (the ranges in the optical axis directions of the monocular optical systems 31) completely match, or one depth of field 144 includes the other depth of field 144, for example, may be referred to as the "state in which the depths of field 144 match". That is, even if the in-focus positions do not match, a state in which one depth of field 144 includes the other depth of field 144 may be included in the "state in which the depths of field 144 match". In this case, the "state in which the depths of field 144 do not match" indicates some other state, which is a state in which any depth of field 144 is not included. That is, it indicates a state in which a range not included in other depth of field exists in each of the depths of field being compared.

Further, a state in which the depths of field 144 being compared (the ranges in the optical axis direct ions of the monocular optical systems 31) at least partially overlap, for example, may be referred to as the "state in which the depths of field 144 match". That is, even if one depth of field 144 does not include the other depth of field 144, a state in which both depths of field 144 partially overlap may be included in the "state in which the depths of field 144 match". In this case, the "state in which the depths of field 144 do not match" indicates some other state, which is a state in which the depths of field 144 do not overlap at all.

In the description below, a state in which the depths of field 144 being compared (the ranges is the optical axis directions of the monocular optical systems 31) completely match, or one depth of field 144 includes the other depth of field 144 will be referred to as the "state in which the depths of field 144 match".

Meanwhile, the front depth of field 142 is defined as in Expression (1) shown below.

[Mathematical Expression 1]

front depth of field:

$$\frac{\text{diameter of permissible circle of confusion} \times \text{aperture value} \times (\text{object distance})^2}{(\text{focal length})^2 + \text{diameter of permissible circle confusion} \times \text{aperture value} \times \text{object distance}} \quad (1)$$

On the other hand, the back depth of field 143 is defined as in Expression (2) shown below.

[Mathematical Expression 2]

back depth of field:

$$\frac{\text{diameter of permissible circle of confusion} \times \text{aperture value} \times (\text{object distance})^2}{(\text{focal length})^2 - \text{diameter of permissible circle confusion} \times \text{aperture value} \times \text{object distance}} \quad (2)$$

The object distance is the distance from the monocular optical system 31 (the principal point of the lens group 121) to the object. That is, the object distance is determined by the positional relationship with the object. The diameter of the permissible circle of confusion indicates the minimum size at which a circular image when a point is imaged by a lens cannot be recognized as a "blur". This diameter of the permissible circle of confusion is determined by the set value of the lens group 121.

That is, the positions of the front depth of field 142 and the back depth of field 143 can be controlled with the focal length and the aperture value (f-number).

Figure 11:
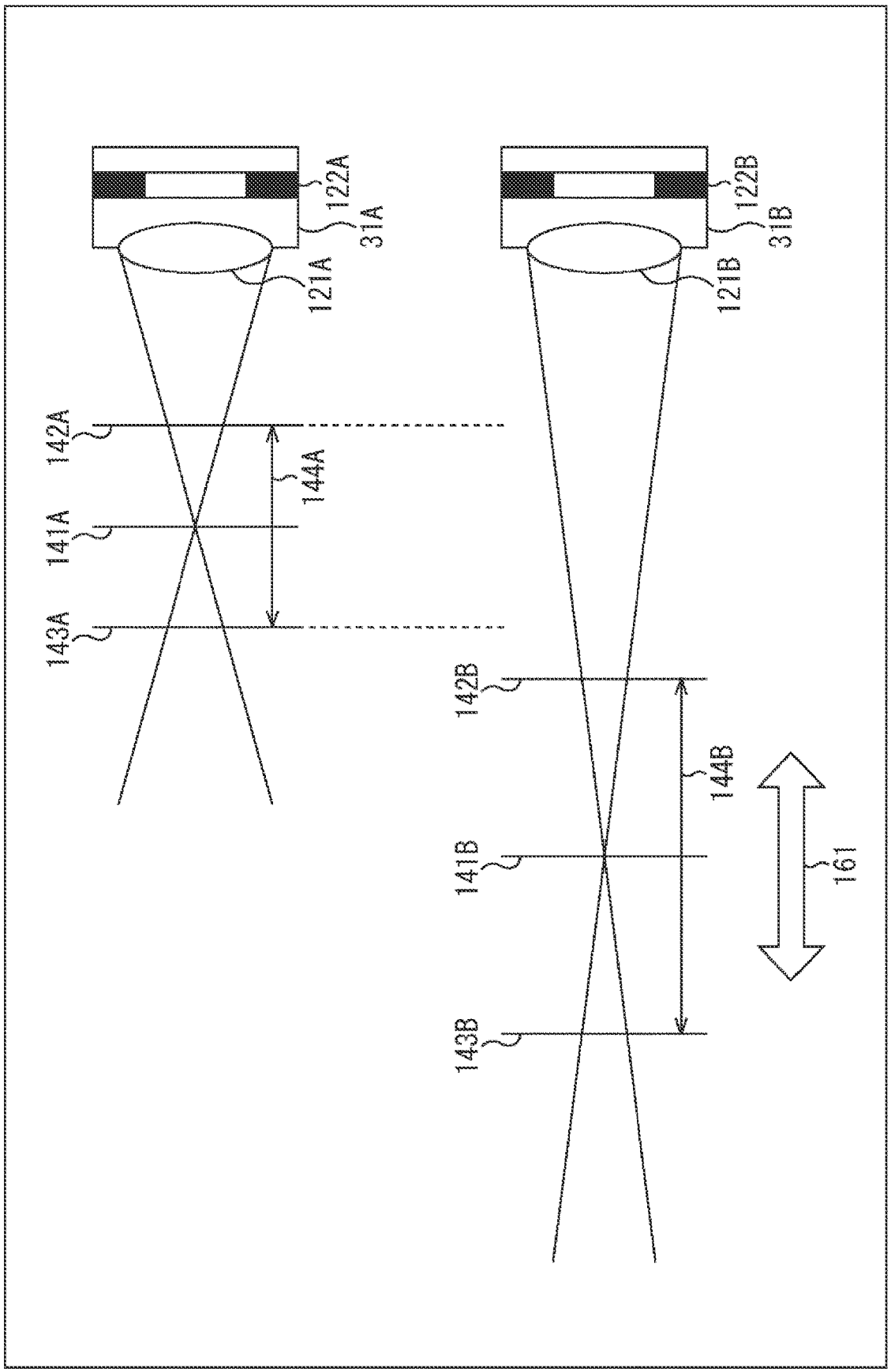
FIG. 11 is a diagram for explaining correction of depth of field through focal length correction.

For example, in FIG. 11, the focal length of the monocular optical system 31B is changed (or the in-focus position 141 is moved), so that the depth of field 144B moves in the optical axis direction of the monocular optical system 31B, as indicated by a double-headed arrow 161. For example, when the focal length is increased (the in-focus position 141 is moved toward the back side), the depth of field 144B also moves toward the back side (in a direction away from the monocular optical system 31B). Conversely, when the focal length is shortened (the in-focus position 141 is moved toward the front side), the depth of field 144B also moves toward the front side (in a direction toward the monocular optical system 31B).

Figure 12:
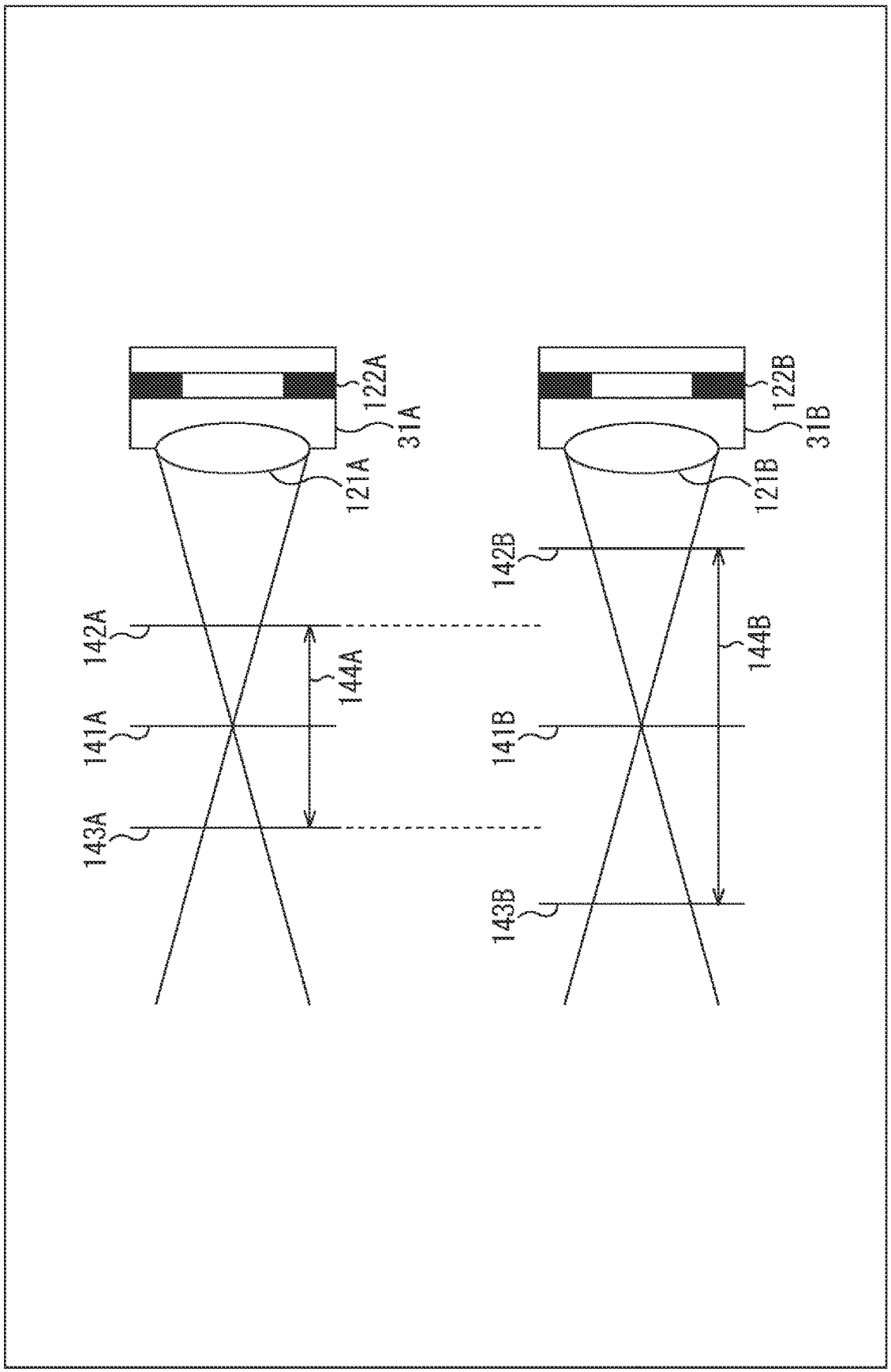
FIG. 12 is a diagram for explaining correction of depth of field through focal length correction.

In FIG. 11, the depth of field 144B of the monocular optical system 31B is located on a deeper side than the depth of field 144A of the monocular optical system 31A, which is the "state in which the depths of field 144 do not match". In FIG. 12, on the other hand, the depth of field 144B includes the depth of field 144A, which is the "state in which the depths of field 144 match".

By adjusting the focal length of the monocular optical system 31B, the camera 10 can bring the depth of field 144B of the monocular optical system 31B out of the state shown in FIG. 11, and put it into the state shown in FIG. 12 (which is the state in which the depths of field 144 match).

Figure 13:
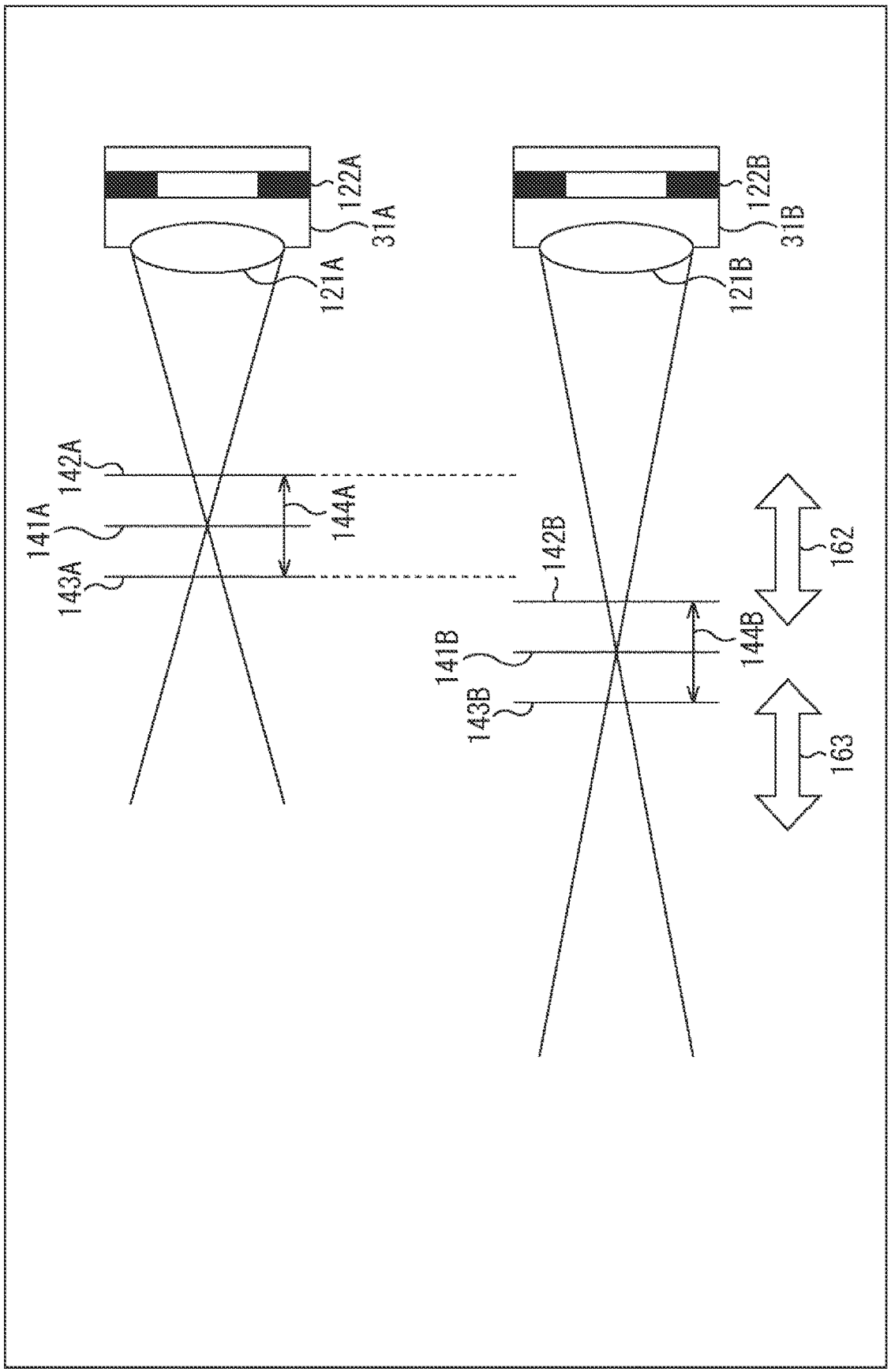
FIG. 13 is a diagram for explaining correction of depth of field through aperture correction.

Further, in FIG. 13, the aperture 122B (f-number) of the monocular optical system 31B is changed, for example, so that the front depth of field 142 moves in the optical axis direction of the monocular optical system 31B as indicated by a double-headed arrow 162, and the back depth of field 143 moves in the optical axis direction of the monocular optical system 31B as indicated by a double-headed arrow 163. As a result, the depth of field 144B becomes wider or narrower in the optical axis direction of the monocular optical system 31B.

For example, when the aperture 122B is further narrowed (the f-number is made greater), the front depth of field 142B moves toward the front side, and the back depth of field 143B moves toward the back side. That is, the depth of field 144B becomes wider (deeper). Conversely, when the aperture 122B is further opened (the f-number is made smaller), the front depth of field 142B moves toward the back side, and the back depth of field 143B moves toward the front side. That is, the depth of field 144B becomes narrower (shallower).

Figure 14:
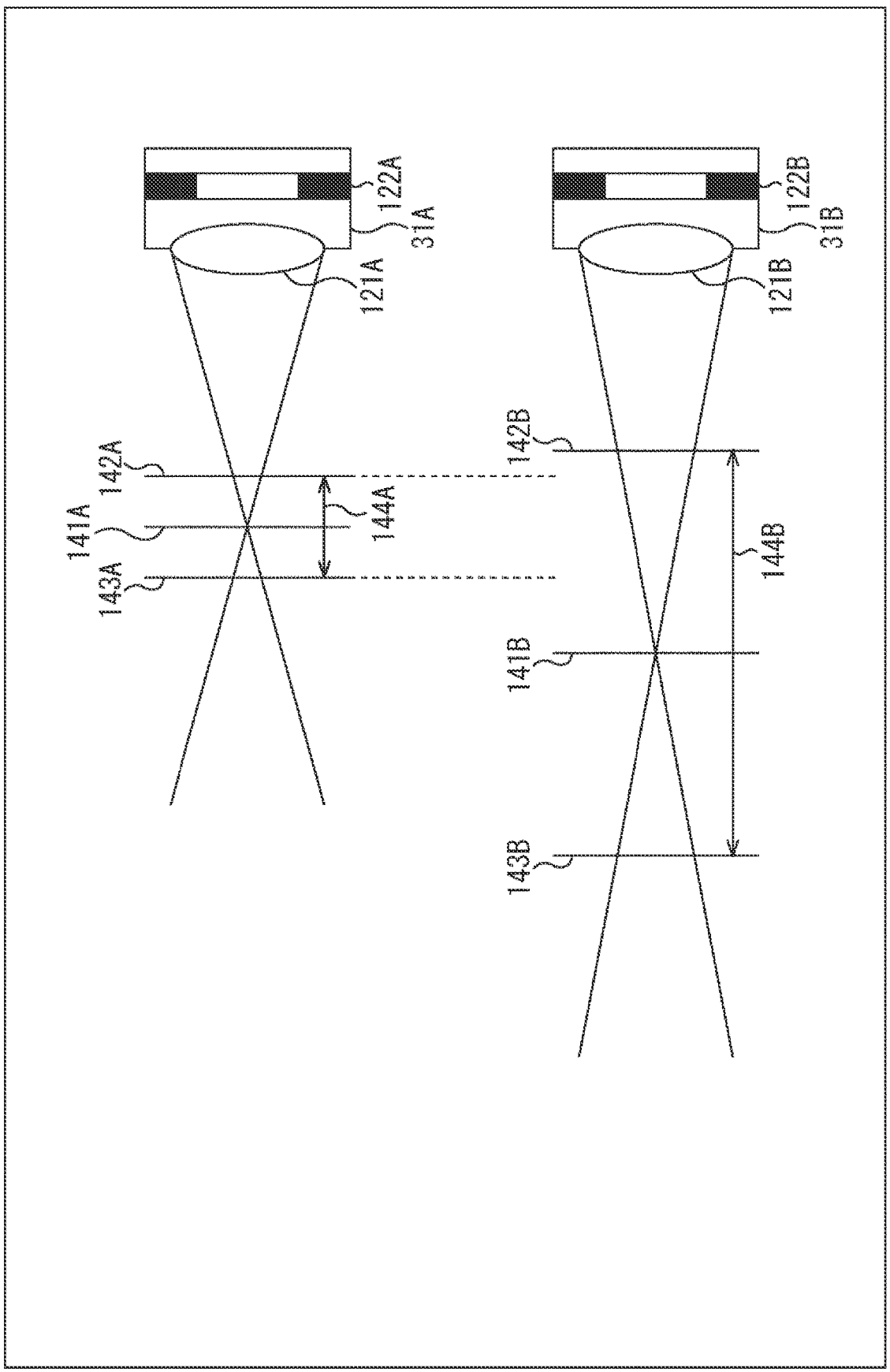
FIG. 14 is a diagram for explaining correction of depth of field through aperture correction.

In FIG. 13, the depth of field 144B of the monocular optical system 31B is located on a deeper side than the depth of field 144A of the monocular optical system 31A, which is the "state in which the depths of field 144 do not match". In FIG. 14, on the other hand, the depth of field 144B becomes wider (deeper) so as to include the depth of field 144A, which is the "state in which the depths of field 144 match".

By controlling the aperture of the monocular optical system 31B, the camera 10 can bring the depth of field 144B of the monocular optical system 31B out of the state shown in FIG. 13, and put it into the state shown in FIG. 14 (which is the state in which the depths of field 144 match).

<Depth-of-Field Adjustment Mechanism>

The function of adjusting the depth of field as described above may be realized in any appropriate manner. For example, the camera 10 may include a depth-of-field adjustment mechanism as the function of adjusting the depth of field, the depth-of-field adjustment mechanism being a mechanical component that adjusts the depths of field of the monocular optical systems 31.

Figure 15:
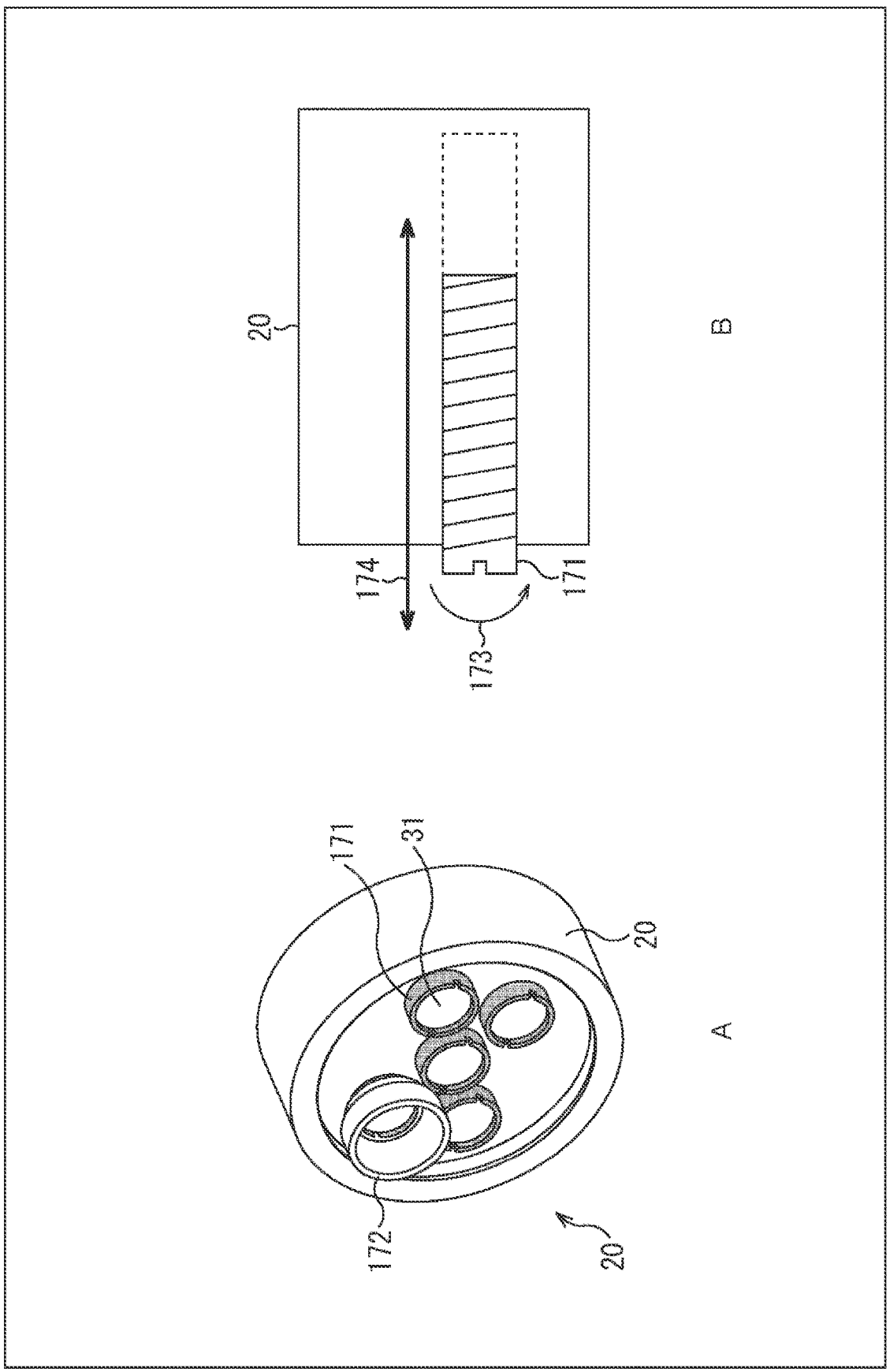
FIG. 15 is a diagram showing an example of a depth-of-field adjustment mechanism.

As shown in A of FIG. 15, each monocular optical system 31 is designed to be capable of adjusting the position in the optical axis direction, together with each corresponding depth-of-field adjustment mechanism 171. For example, the depth-of-field adjustment mechanism 171 is formed in a cylindrical shape, and includes the monocular optical system 31 therein. In other words, the depth-of-field adjustment mechanism 171 is formed on the outer peripheral portion of the monocular optical system 31. As shown in B of FIG. 15, the depth-of-field adjustment mechanism 171 has screw-like irregularities formed on its outer surface, and is screwed to the feeding unit (not shown) that is a predetermined component of the lens barrel 20.

In A of FIG. 15, only one monocular optical system 31 and one depth-of-field adjustment mechanism 171 are denoted by reference numerals, but the depth-of-field adjustment mechanism 171 can be provided for each monocular optical system 31. Depth-of-field adjustment mechanisms 171 may be provided for all the monocular optical systems 31. Alternatively, the depth-of-field adjustment mechanisms 171 may be provided for some of the monocular optical systems 31. For example, the depth-of-field adjustment mechanisms 171 may be provided only for the monocular optical systems $31_1$ to $31_4$, and depth-of-field adjustment may be performed so that the depths of field of these monocular optical systems 31 are adjusted to the depth of field of the monocular optical system $31_0$ for which any depth-of-field adjustment mechanism 171 is not provided.

The feeding unit is the component that secures the monocular optical systems $31_0$ to $31_4$. Also, this feeding unit is installed so as to be movable with respect to the lens barrel 20 (movable in the optical axis direction of the monocular optical systems). As the feeding unit moves, the position of each monocular optical system 31 changes in the optical axis direction, and the focal length of each monocular optical system 31 changes accordingly. That is, as the feeding unit moves, the focal lengths of all the monocular optical systems 31 (the monocular optical systems $31_0$ to $31_4$) change at once (by the same distance).

Note that the movement of the monocular optical systems 31 in the optical axis direction may be caused manually, or may be caused by the optical system control unit 42 driving an actuator in accordance with a control signal or the like.

For example, when the user manually rotates the focus ring (not shown) provided on the lens barrel 20, the component (the feeding unit, for example) mechanically coupled to the focus ring may move in the optical axis direction (or the monocular optical systems 31 may move in the optical axis direction) (manual focus adjustment). Also, when the user manually presses a button or rotates the focus ring provided on the lens barrel 20, for example, the optical system control unit 42 may detect the action, and drive an electric (motor) or the like to move the monocular optical systems 31 (manual electric focus adjustment.). Further, the camera 10 may adjust focus, on the basis of a captured image or the like, for example (autofocus adjustment).

The depth-of-field adjustment mechanism 171 is designed to be rotatable about the optical axis of the monocular optical system 31, and can rotate to change the focal length of the corresponding monocular optical system 31 (the monocular optical system 31 provided on the inner side of the depth-of-field adjustment mechanism 171). That is, the depth-of-field adjustment mechanism 171 is a mechanism that adjusts the depth of field of the corresponding monocular optical system 31 by adjusting the focal length of the monocular optical system 31, as in the example described above with reference to FIGS. 11 and 12.

The depth-of-field adjustment mechanism 171 is designed to be rotatable about the optical axis of the monocular optical system 31. For example, this depth-of-field adjustment mechanism 171 can rotate, using a dedicated jig 172, as shown in A of FIG. 15. For example, as shown in B of FIG. 15, when this depth-of-field adjustment mechanism 171 rotates about the optical axis direction serving as the rotation axis (an arrow 173), the position of the depth-of-field adjustment mechanism 171 with respect to the lens barrel 20 (the feeding unit) changes in the optical axis direction (a double-headed arrow 174) due to a screw groove/thread formed in a helical shape. That is, the focal length of the monocular optical system 31 changes.

That is, the depth-of-field adjustment mechanism 171 is the mechanism that screws the corresponding monocular optical system 31 to the feeding unit (not shown), which is the predetermined component, and is the mechanism that adjusts the focal length of the monocular optical system, being made to rotate about the optical axis of the monocular optical system 31.

The depth-of-field adjustment mechanisms 171 of the respective monocular optical systems 31 can be operated (made to rotate) independently of one another. That is, the depths of field of the respective monocular optical systems 31 can be adjusted independently of one another. In addition to that, as the depth-of-field adjustment mechanisms 171 of the respective monocular optical systems 31 are operated, it is possible to align the depths of field of the respective monocular optical systems 31.

Note that, in the above description, the depth-of-field adjustment mechanisms 171 (the monocular optical systems 31) are screwed to the feeding unit. However, the present technology is not limited to this, and the depth-of-field adjustment mechanisms 171 (the monocular optical systems 31) may be screwed to the lens barrel 20, for example. That is, the camera 10 may not have the feeding function.

Note that, in the example shown in A of FIG. 15 and B of FIG. 15, the depth-of-field adjustment mechanism 171 adjusts the depth of field by adjusting the focal length of the monocular optical system 31. However, the camera 10 may adjust the depth of field by reflecting the adjustment amount for adjusting the aperture of the monocular optical system 31 during imaging. That is, the optical system control unit 84 may adjust the depth of field of each monocular optical system 31 by adjusting the aperture of the monocular optical system 31, as in the example described above with reference to FIGS. 13 and 14. Furthermore, the camera 10 may include depth-of-field adjustment mechanisms that adjust the depths of field by adjusting the apertures of the monocular optical systems 31.

The camera 10 may of course include both the depth-of-field adjustment mechanisms (the depth-of-field adjustment mechanisms 171) that adjust the depths of field by adjusting the focal lengths of the monocular optical systems 31, and the depth-of-field adjustment mechanisms that adjust the depths of field by adjusting the apertures of the monocular optical systems 31.

Including the depth-of-field adjustment mechanisms as described above, the camera 10 can adjust the depth of field of at least one monocular optical system 31 in the plurality of monocular optical systems 31 that have optical paths independent of one another.

<Flow in a Depth-of-Field Adjustment Process>

The depth-of-field adjustment described above is manually performed before the factory shipment or the like, for example. Referring now to a flowchart shown in FIG. 16, an example of this process is described.

First, the front depths of field are adjusted. In step S101, the operator places the object (a resolution chart or a Siemens Star (FIG. 10), for example) for adjustment on the near side of the in-focus position (set value) of the camera 10.

In step S102, when the operator operates the camera 10, the camera 10 captures an image of the object.

In step S103, the operator operates each depth-of-field adjustment mechanism 171 while viewing each monocular image in the captured image, and adjusts the focal length of each monocular optical system 31. For example, the operator adjusts the focal length of each monocular optical system 31 so that the degrees of blurring of the respective monocular images become more uniform. The operator then captures an image the object again, and adjusts the focal length of each monocular optical system 31 again so that the degrees of blurring of the respective monocular images become more similar to one another, while checking the adjustment result (the degrees of blurring) in the respective obtained monocular images. By repeating the process in steps S102 and the process in step S103 in this manner, the operator adjusts the focal lengths of the respective monocular optical systems 31 so that the degrees of blurring of the respective monocular images become more similar to one another, or typically, the degrees of blurring of the respective monocular images become the same. Note that, at that time, the amounts of blurring by the respective monocular optical systems 31 may be intentionally increased during the imaging so that the degrees of blurring become easier to see. With this arrangement, the front depths of field of all the monocular optical systems 31 are adjusted to the position of the object for adjustment.

Next, the back depths of field are adjusted. In step S109, the operator places the object (a resolution chart or a Siemens Star (FIG. 10), for example) for adjustment on the far side of the in-focus position (set value) of the camera 10.

In step S105, when the operator operates the camera 10, the camera 10 captures an image of the object.

In step S106, the operator operates each depth-of-field adjustment mechanism 171 while viewing each monocular image in the captured image, and adjusts the focal length of each monocular optical system 31. By repeating the process in steps S105 and the process in step S106 as in the case of the front depths of field, the operator adjusts the focal lengths of the respective monocular optical systems 31 so that the degrees of blurring of the respective monocular images become more similar to one another, or typically, the degrees of blurring of the respective monocular images become the same. Note that, at that time, the amounts of blurring by the respective monocular optical systems 31 may be intentionally increased during the imaging so that the degrees of blurring become easier to see. With this arrangement, the back depths of field of all the monocular optical systems 31 are adjusted to the position of the object for adjustment.

As the depth of field of each of the monocular optical systems 31 constituting the multiple optical system 30 is adjusted (calibrated) as described above, the depth of field (the front depth of field and the back depth of field) can be adjusted. As a result, the depth of field of each of the monocular optical systems 31 adjusted so that more accurate depth information can be acquired, and a wider refocusing range can be obtained.

None that, in a case where the back depth of field is set at infinity, for example, the respective processes in steps S104 to S106 can be skipped. Further, after the depth-of-field adjustment is completed as described above, each of the monocular optical systems 31 may be fixed to the feeding unit. By doing so, it is possible to reduce shifts of the adjusted depths of field of the respective monocular optical systems 31 (or to more stably maintain the set amounts of depth-of-field adjustment).

Note that, in this specification, the term "fixing" of each monocular optical system 31 refers to a state in which a change in the relative position of the monocular optical system 31 with respect to the component to which the monocular optical system 31 is fixed (or the member to which the monocular optical system 31 is fixed, such as the feeding unit, for example) becomes more difficult than that during depth-of-field adjustment. For example, the state may be a state in which a change in the relative position of the monocular optical system 31 with respect to the component to which the monocular optical system 31 is fixed without any breakage becomes extremely difficult, as in a case of bonding, welding, or the like. Also, the state may be a state in which a change in the relative position of the monocular optical system 31 with respect to the component to which the monocular optical system 31 is fixed becomes difficult due to a predetermined mechanism such as a lock pin, for example (a state in which a lock is used). Further, in a case where the depth of field of the monocular optical system 31 is adjusted with a jig or the like, for example, the state may be a state in which a change in the relative position of the monocular optical system 31 with respect to the component to which the monocular optical system 31 is fixed becomes difficult due to removal of the jig or the like.

Furthermore, at a time of depth-of-field adjustment, only either the front depth of field or the back depth of field may be adjusted.

<Focus Control by Driving of the Entire Multiple Optical System>

As described above, the camera 10 may have a manual focus function to adjust the focal length in accordance with the user's manual operation of the mechanism, may have an electric manual focus function to control the driving of the motor in accordance with the user's manual operation such as a button operation, and adjust the focal length by the driving of the motor, or may have an autofocus function to automatically adjust the focal length while the user's operation is only to issue an instruction to start the focal length adjustment by pressing the shutter button halfway or the like. A case where the autofocus function is provided is now described.

As described above, the camera 10 includes the feeding unit (not shown) provided on the lens barrel 20, and the focal lengths of the plurality of monocular optical systems 31 are simultaneously (collectively) controlled by the feeding unit.

In this case, the depth of field of each monocular optical system 31 of the multiple optical system 30 has already been adjusted, as described above. For example, each of the monocular optical systems 31 is fixed to the feeding unit, with its depth of field having been adjusted (the state in which the depths of field of the monocular optical systems 31 match).

As the optical system control unit 84 moves the feeding unit (or the entire multiple optical system 30), it is possible to control the focal lengths of all the monocular optical systems 31 while maintaining the result of the depth-of-field adjustment. That is, all of the monocular optical systems 31 can be focused.

<Flow in a Focusing Process>

Figure 17:
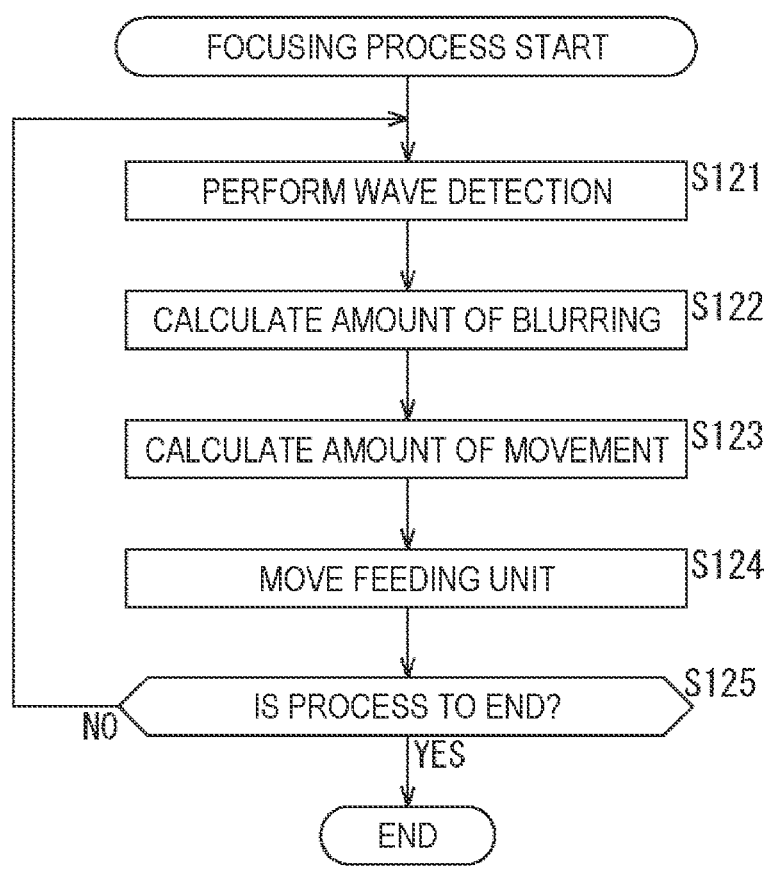
FIG. 17 is a flowchart for explaining an example flow of a focusing process.

Referring now to a flowchart shown in FIG. 17, an example flow in the focusing process for controlling the focal lengths in this case is described.

For example, when a predetermined operation for focal length adjustment, such as setting the operation mode of the camera 10 to an imaging mode for performing imaging or pressing the shutter button halfway, is performed, the focusing process is started. When the focusing process is started, the control unit 81 of the camera 10 in step S121 controls the image sensor 51 to capture an image of the object, acquires the captured image, and performs wave detection using the captured image. Alternatively, the image sensor 51 acquires an image of the object, and the control unit 81 performs wave detection using the acquired image. Note that this wave detection may be performed with the use of a monocular image of one or a plurality of predetermined monocular optical systems 31 (a reference monocular optical system, for example) included in the captured image (or the acquired image). Alternatively, this wave detection may be performed with the use of all the monocular images included in the captured image (or the acquired image).

In step S122, the control unit 81 calculates the amount of blurring, on the basis of the wave detection result.

In step S123, the control unit 81 generates control information indicating the calculated amount of blurring.

In step S123, the optical system control unit 84 calculates the amount of movement of the feeding unit in accordance with the amount of blurring indicated by the supplied control information.

In step S124, the optical system control unit 84 moves the feeding unit by the calculated amount of movement.

In step S125, the optical system control unit 84 determines whether or not to end the focusing process. If it is determined not to end the focusing process yet, the process returns to step S121, and the processes that follow are repeated.

If it is determined in step S125 that the focusing process is to end, on the other hand, the focusing process comes to an end.

By performing the focusing process as described above, the camera 10 can control the focus position while maintaining the result of the depth-of-field adjustment.

<Focus Control by Driving of Each Monocular Optical System>

Note that, in performing focus control, the optical system control unit 84 may control the focal lengths of the respective monocular optical systems 31 independently of one another.

In this case, the feeding unit described above can be omitted (may not be omitted). The optical system control unit 84 then performs depth-of-field adjustment (reflects the adjustment amounts). That is, in this case, the camera 10 includes a depth-of-field adjustment function that is the optical system control unit 84 that drives the monocular optical systems 31 on the basis of control information to adjust the depths of field of the monocular optical systems 31.

Note that, as described above in <Flow in a Depth-of-Field Adjustment Process> and the like, for example, the amounts of depth-of-field adjustment and the like (such as the adjustment amounts for focal length and aperture, for example) are calculated by processes that are basically similar to those described above with reference to the flowchart in FIG. 16, before factory shipment or the like. The amounts of depth-of-field adjustment for the respective monocular optical systems 31 are then stored into the storage unit 44.

For example, in a case where the lens groups 121 or the like of the monocular optical systems 31 are driven with a voice coil motor, the storage unit 82 stores, into the storage medium 83 beforehand, the amount of shift from the drive current value for each distance. Also, the storage unit 82 may store, into the storage medium 83 beforehand, a positional shift amount detected by a position sensor (such as a Hall sensor, for example). Further, in a case where the lens groups 121 or the like of the monocular optical systems 31 are driven with a stepping motor or an ultrasonic motor, the storage unit 82 may also store, into the storage medium 83 beforehand, information from which the focus position can be grasped.

At the time of focus control, the adjustment amounts are read from the storage medium 83 by the storage unit 82, and are provided to the optical system control unit 84. The optical system control unit 84 uses the adjustment amounts as offset values (offset amounts) or the like to perform focus control.

That is, the optical system control unit 84 calculates the amounts of movement for the respective monocular optical systems 31 for focus control while maintaining the state in which the offset values are given to the positions of the respective monocular optical systems 31, and moves the respective monocular optical systems 31 by the amounts of movement.

By doing so, the camera 10 can control the focus position while maintaining the result of depth-of-field adjustment more easily, as in the case where the focal lengths of all the monocular optical systems 31 are collectively controlled with the feeding unit.

Note that the optical system control unit 84 adjusts the depth of field of each monocular optical system 31 as in the example described above with reference to FIGS. 11 and 12, by adjusting the focal length of each monocular optical system 31 on the basis of the control information. At that time, the optical system control unit 84 can adjust the focal lengths (depths of field) of the respective monocular optical systems 31 independently of one another. Thus, the optical system control unit 84 can align the depths of field of the respective monocular optical systems 31 through such an adjustment process.

Alternatively, the optical system control unit 84 may adjust the depth of field of each monocular optical system 31 as in the example described above with reference to FIGS. 13 and 14, by adjusting the aperture of the monocular optical system 31 on the basis of the control information. At that time, the optical system control unit 84 can adjust the apertures (depths of field) of the respective monocular optical systems 31 independently of one another. Thus, the optical system control unit 84 can align the depths of field of the respective monocular optical systems 31 through such an adjustment process.

<Flow in a Focusing Process>

Figure 18:
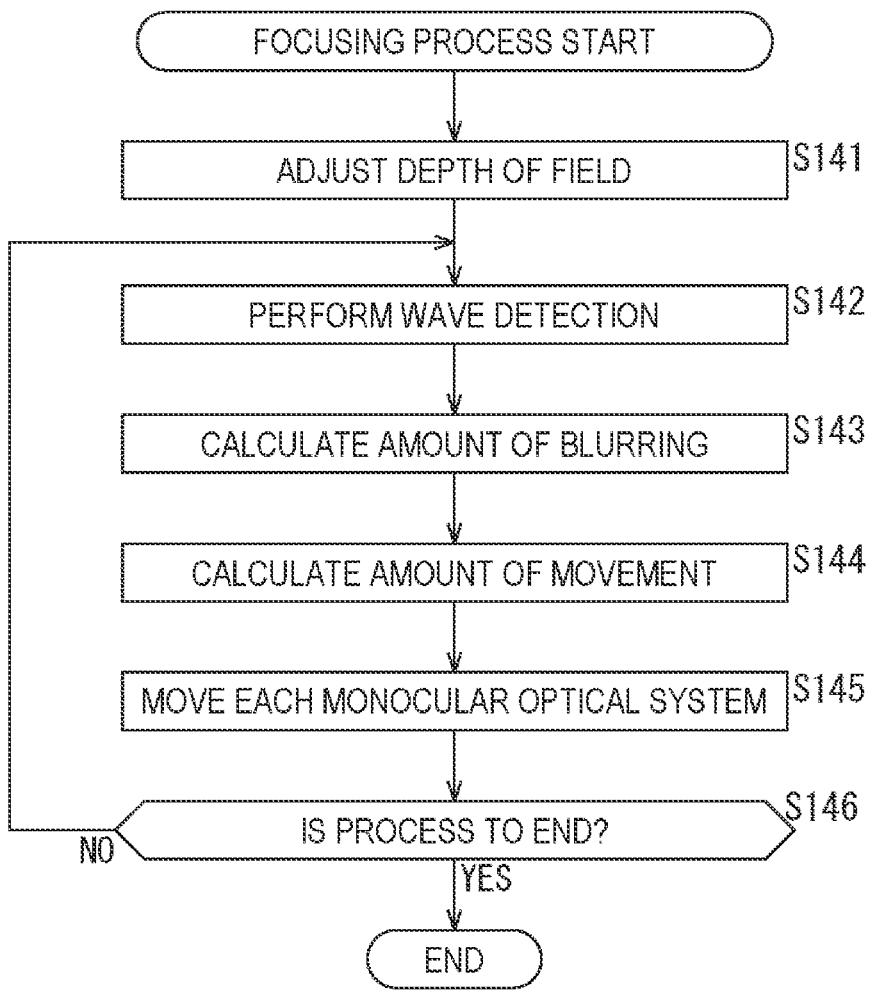
FIG. 18 as a flowchart for explaining an example flow of a focusing process.

Referring now to a flowchart shown in FIG. 18, an example flow in the focusing process in this case is described. For example, when a predetermined operation for focal length adjustment, such as setting the operation mode of the camera 10 to an imaging mode for performing imaging or pressing the shutter button halfway, is performed, the focusing process is started.

When the focusing process is started, the optical system control unit 84 of the camera 10 in step S141 acquires, via the storage unit 82, the control information that is stored in the storage medium 83 and indicates the adjustment amounts (the adjustment amounts calculated through the depth-of-field adjustment process or the like described above with reference to the flowchart in FIG. 16, for example) for the depths of field of the respective monocular optical systems 31, and adjusts the depths of field of the respective monocular optical systems 31, using the adjustment amounts indicated by the control information. By this adjustment, the depths of field of the respective monocular optical systems 31 are aligned with one another.

In step S142, the control unit 81 controls the image sensor 51 to capture an image of the object, acquires the captured image, and performs wave detection using the captured image. Alternatively, the image sensor 51 acquires an image of the object, and the control unit 81 performs wave detection using the acquired image. Note that this wave detection may be performed with the use of a monocular image of one or a plurality of predetermined monocular optical systems 31 (a reference monocular optical system, for example) included in the captured image (or the acquired image). Alternatively, this wave detection may be performed with the use of all the monocular images included in the captured image (or the acquired image). Further, this wave detection may be performed for each monocular image (for each monocular optical system 31). Alternatively, this wave detection may be performed without any captured image (or any acquired image).

In step S143, the control unit 81 calculates the amount of blurring, on the basis of the wave detection result. This amount of blurring may be calculated on the basis of a wave detection result obtained with the use of a monocular image of one or a plurality of predetermined monocular optical systems 31 (a reference monocular optical system, for example). Also, the amount of blurring may be calculated on the basis of a wave detection result obtained with the use of all the monocular images. Further, this amount of blurring may be calculated for each monocular image (for each monocular optical system 31).

In step S144, the optical system control unit 84 acquires the control information indicating the amount of blurring calculated by the control unit 81, and calculates the amount of movement corresponding to the amount of blurring indicated by the control information for the monocular optical systems 31. At that time, the optical system control unit 84 may calculate an amount of movement common to all the monocular optical systems 31. Alternatively, the optical system control unit 84 may calculate an amount of movement for each monocular optical system 31.

In step S145, the optical system control unit 84 moves each monocular optical system 31 by the calculated amount of movement. At that time, the optical system control unit 84 may move all the monocular optical systems 31 by an amount of movement common to all the monocular optical systems 31. Alternatively, the optical system control unit 84 may move each of the monocular optical systems 31 by each corresponding amount of movement.

In step S146, the optical system control unit 84 determines whether or not to end the focusing process. If it is determined not to end the focusing process yet, the process returns to step S142, and the processes that follow are repeated. That is, each process is performed while the result of the depth-of-field adjustment in step S141 is maintained.

If it is determined in step S146 that the focusing process is to end, on the other hand, the focusing process comes to an end.

In the above manner, the camera 10 can control the focus position while maintaining the result of the depth-of-field adjustment.

<Flow in a Focusing Process>

Note that the amounts of movement for the monocular optical systems 31 may be calculated, with the amounts of depth-of-field adjustment being taken into account. That is, the optical system control unit 42 may adjust the depths of field of the monocular optical systems 31 and focus the monocular optical system 31 on the object, on the basis of control information including the control amounts (the amounts of movement for the monocular optical systems 31) for focusing the monocular optical systems 31 on the object, the control amount having been calculated on the basis of the amounts of depth-of-field adjustment and the wave detection result.

Figure 19:
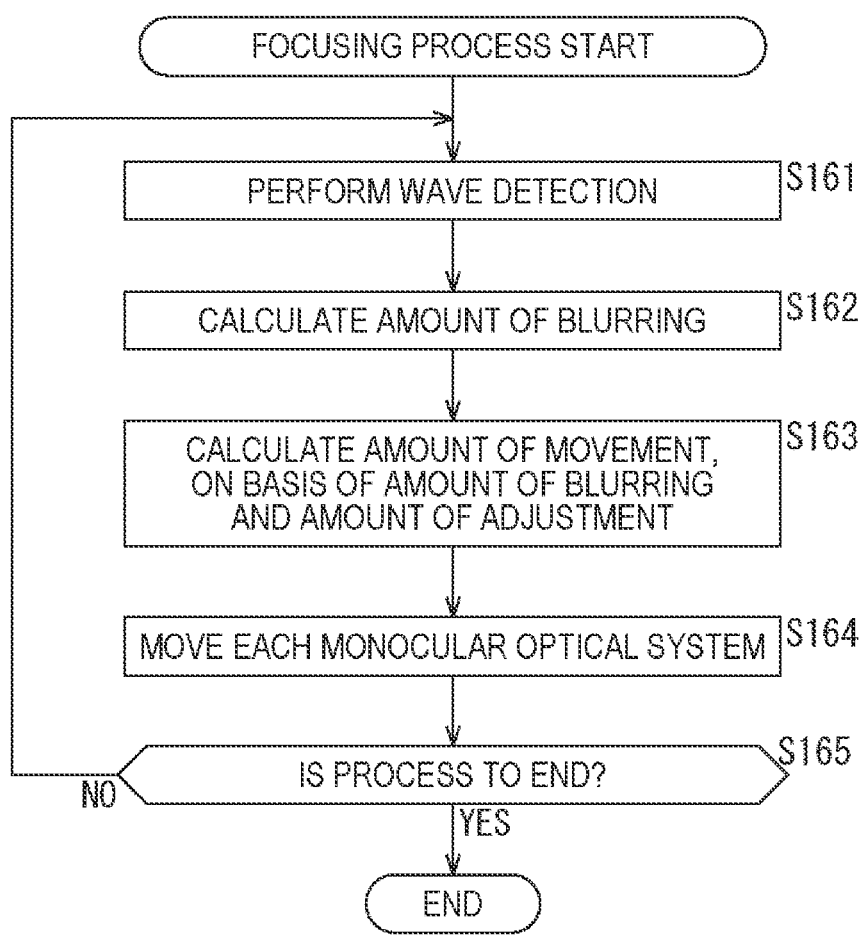
FIG. 19 is a flowchart for explaining an example flow of a focusing process.

Referring now to a flowchart shown in FIG. 19, an example flow in the focusing process in that case is described. For example, when a predetermined operation for focal length adjustment, such as getting the operation mode of the camera 10 to an imaging mode for performing imaging or pressing the shutter button halfway, is performed, the focusing process is started.

When the focusing process is started, the optical system control unit 84 of the camera 10 in step S161 acquires, via the storage unit 82, the control information that is stored in the storage medium 83 and indicates the adjustment amounts (the adjustment amounts calculated through the depth-of-field adjustment process or the like described above with reference to the flowchart in FIG. 16, for example) for the depths of field of the respective monocular optical systems 31.

The control unit 81 then controls the image sensor 51 to capture an image of the object, acquires the captured image, and performs wave detection using the captured image. Alternatively, the image sensor 51 acquires an image of the object, and the control unit 81 performs wave detection using the acquired image. Note that this wave detection may be performed with the use of a monocular image of one or a plurality of predetermined monocular optical systems 31 (a reference monocular optical system, for example) included in the captured image (or the acquired image). Alternatively, this wave detection may be performed with the use of all the monocular images included in the captured image (or the acquired image).

In step S162, the control unit 81 calculates the amount of blurring, on the basis of the wave detection result.

In step S163, the control unit 81 calculates the amount of movement for each monocular optical system 31, on the basis of the amount of blurring calculated in step S162 and the amounts of depth-of-field adjustment for the respective monocular optical systems 31 indicated by the control information acquired in step S161. That is, the control unit 81 calculates an amount of movement for each of the monocular optical systems 31.

In step S164, the optical system control unit 84 moves each of the monocular optical systems 31 on the basis of the supplied control information. That is, the optical system control unit 84 moves the respective monocular optical systems 31 by the amounts of movement calculated in step S163.

In step S165, the optical system control unit 84 determines whether or not to end the focusing process. If it is determined not to end the focusing process yet, the process returns to step S161, and the processes that follow are repeated. When the processes are repeated in this manner, the amounts of depth-of-field adjustment read from the storage medium 83 in step S161 are reflected in the movement amounts calculated in step S163.

If it is determined in step S165 that the focusing process is to end, on the other hand, the focusing process comes to an end.

In the above manner, the camera 10 can control the focus position while causing the amounts of movement to reflect the result of the depth-of-field adjustment.

<Automatic Adjustment of Depth of Field>

An example in which depth-of-field adjustment is manually performed before factory shipment or the like (FIG. 16) has been described above. In this example case, operations are manually performed to place the object for adjustment, capture an image of the object, adjust the focal length and the aperture of each of the monocular optical systems 31 on the basis of the amount of blurring (the degree of blurring) in the captured image, and the like. However, the present technology is not limited this example, and the camera 10 may calculate the amount of depth-of-field adjustment. For example, in a case where the camera 10 includes a depth-of-field adjustment function that is the optical system control unit 84 that drives the monocular optical systems 31 on the basis of control information to adjust the depths of field of the monocular optical systems 31, the camera 10 (the control unit 81) may calculate the amount of the depth-of-field adjustment.

For example, the control unit 81 may set one monocular optical system 31 of the plurality of monocular optical systems 31 as the reference monocular optical system, and calculate the adjustment amount so as to adjust the depths of field of the other monocular optical systems (the monocular optical systems 31 other than the reference monocular optical system) to the depth of field of the reference monocular optical system. In other words, the optical system control unit 84 may use the adjustment amount to adjust the depths of field of the other monocular optical systems 31 to the depth of field of the reference monocular optical system, which is one monocular optical system of the plurality of monocular optical systems 31. In this manner, the optical system control unit 84 can more easily adjust the depths of field of the plurality of monocular optical systems 31.

Also, the control unit 81 may calculate the correction amount so that the ranges of the depths of field of the other monocular optical systems overlap at least part of the range of the depth of field of the reference monocular optical system. That is, a state in which the depths of field of the other monocular optical systems overlap at least part of the depth of field of the reference monocular optical system may be referred to as the "state in which the depths of field match". In other words, the optical system control unit 84 may use the adjustment amount to adjust the depths of field of the other monocular optical systems 31 so that the ranges of the depths of field of the other monocular optical systems 31 overlap at least part of the range of the depth of field of the reference monocular optical system.

Also, the control unit 81 may select any of the monocular optical systems 31 as the reference monocular optical system. For example, the control unit 81 may set the monocular optical system 31 having the smallest depth of field in the plurality of monocular optical systems 31, as the reference monocular optical system. In other words, the optical system control unit 84 may select the monocular optical system 31 having the smallest depth of field in the plurality of monocular optical systems 31 as the reference monocular optical system, and adjust the depths of field of the other monocular optical systems 31 to the depth of field of the reference monocular optical system.

Further, at that time, the control unit 81 may calculate the adjustment amount so that the ranges of the depths of field of the other monocular optical systems include the range of the depth of field of the reference monocular optical system having the smallest depth of field. That is, a state in which the depths, of field of the other monocular optical systems 31 include the depth of field of the reference monocular optical system may be referred to as the "state in which the depths of field match". In other words, the optical system control unit 84 may use the adjustment amount to adjust the depths of field of the other monocular optical systems 31 so that the ranges of the depths of field of the other monocular optical systems 31 include the range of the depth of field of the reference monocular optical system.

Also, at that time, the control unit 81 may calculate the adjustment amount so that the focal lengths of the other monocular optical systems 31 match the focal length of the reference monocular optical system. That is, a state in which the depths of field of the other monocular optical systems 31 include the depth of field of the reference monocular optical system, and the focal lengths of the other monocular optical systems 31 match the focal length of the reference monocular optical system may be referred to as the "state in which the depths of field match". In other words, the optical system control unit 84 may use the adjustment amount to further adjust the depths of field of the other monocular optical systems 31 so that the focal lengths of the other monocular optical systems 31 match the focal length of the reference monocular optical system.

Note that, at the time of adjustment amount calculation, the control unit 81 may prioritize the calculation of the amount of focal length adjustment over the calculation of the amount of aperture adjustment. In a case where the aperture is adjusted, not only the depth of field but also the luminance of the captured image may be affected. Therefore, the control unit 81 may preferentially calculate the amount of focal length adjustment, to align the depths of field through focal length adjustment as much as possible. For example, in some cases, such as a case where the movable limit of the focal length is reached, or a case where the depths of field are also aligned, aperture adjustment is necessary as well. The control unit 81 may calculate an amount of aperture adjustment only in such a case. In this manner, the influence of depth-of-field adjustment on the luminance of the captured image can be reduced.

Further, the plurality of monocular optical systems 31 of the multiple optical system 30 may include monocular optical systems 31 having different set values from the others, such as a monocular optical system 31 for wide-angle photography and a monocular optical system 31 for telephotography, for example. For example, the monocular optical system 31 designed for wide-angle photography and the monocular optical system 31 designed for telephotography normally differ greatly from each other in the expected object distance, and therefore, the depths of field of them greatly differ from each other in design. Therefore, there is no need to align the depths of field between the monocular optical systems 31 having such a relationship.

In view of this, in a case where the plurality of monocular optical systems 31 of the multiple optical system 30 includes a monocular optical system 31 having a different set value from the others, the depth-of-field adjustment may be performed for each monocular optical systems 31 having the same or similar set values (or specifications). For example, the control unit 81 may calculate the adjustment amount so that the depths of field are aligned with each other between monocular optical systems 31 that, are the same (or similar) in the set values of the lens groups 121 and the aperture 122. With this arrangement, depth-of-field adjustment suitable for the set values can be performed.

<Flow in a Depth-of-Field Adjustment Process>

An example flow in the depth-of-field adjustment process to be performed by the control unit 81 in this case, which is a case where the camera 10 performs the depth-of-field adjustment as described above in <Automatic Adjustment of Depth of Field>, is now described with reference to a flowchart shown in FIG. 20.

When the depth-of-field adjustment process is started, the front depths of field are first adjusted. In step S181, the control unit 81 prompts the operator to place the object (a resolution chart or a Siemens Star (FIG. 10), for example) for adjustment on the near side of the in-focus position (set value) of the camera 10. For example, the control unit 81 performs such notification by controlling the display unit 61 or the like to display an image, a message, or the like.

In step S182, the control unit 81 controls the image sensor 51 to capture an image of the object, performs wave detection on each of the monocular optical systems 31 using the captured image, and calculates and evaluates the amount of blurring.

In step S183, the control unit 81 calculates an adjustment amount for aligning the front depths of field of the respective monocular optical systems 31.

Next, the back depths of field are adjusted. In step S184, the control unit 81 prompts the operator to place the object (a resolution chart or a Siemens Star (FIG. 10), for example) for adjustment on the far side of the in-focus position (set value) of the camera 10. For example, the control unit 81 performs such notification by controlling the display unit 61 or The like to display an image, a message, or the like.

In step S185, the control unit 81 controls the image sensor 51 to capture an image of the object, performs wave detection on each of the monocular optical systems 31 using the captured image, and calculates and evaluates the amount of blurring.

In step S186, the control unit 81 calculates an adjustment amount for aligning the back depths of field of the respective monocular optical systems 31.

In step S187, the control unit 81 supplies the amounts of depth-of-field adjustment calculated in steps S183 and S186 to the storage unit 82, and stores them into the storage medium 83.

When the process in step S187 is completed, the depth-of-field adjustment process comes to an end. The amounts of depth-of-field adjustment that are calculated as described above and are stored in the storage medium 83 are used in the above-described focusing process and the like.

As the depth of field of each of the monocular optical systems 31 constituting the multiple optical system 30 is adjusted (calibrated) as described above, the depth of field (the front depth of field and the back depth of field) can be more easily adjusted. As a result, more accurate depth information can be acquired, and a wider refocusing range can be obtained.

Note that, in a case where the back depth of field is set at infinity, for example, the respective processes in steps S184 to S186 can be skipped.

<Strain Correction>

Further, a calibration chart for lens distortion correction may be recorded at the in-focus position of each of the monocular optical systems 31, and the focus position of the multiple optical system 43 may be associated with the calibration chart. With this arrangement, appropriate distortion correction can be performed at any in-focus position of the multiple optical system 43. Thus, accurate depth information can be acquired, and refocusing can be performed.

2. Second Embodiment

<Camera System>

In the first embodiment, the present technology has been described through an example of the camera 10 including the multiple optical system 30. However, the present technology can also be applied to other configurations. For example, an optical system including the multiple optical system 30 may be replaceable. That is, the multiple optical system 30 may be designed to be detachable from the camera 10.

<Exterior of a Camera System>

Figure 21:
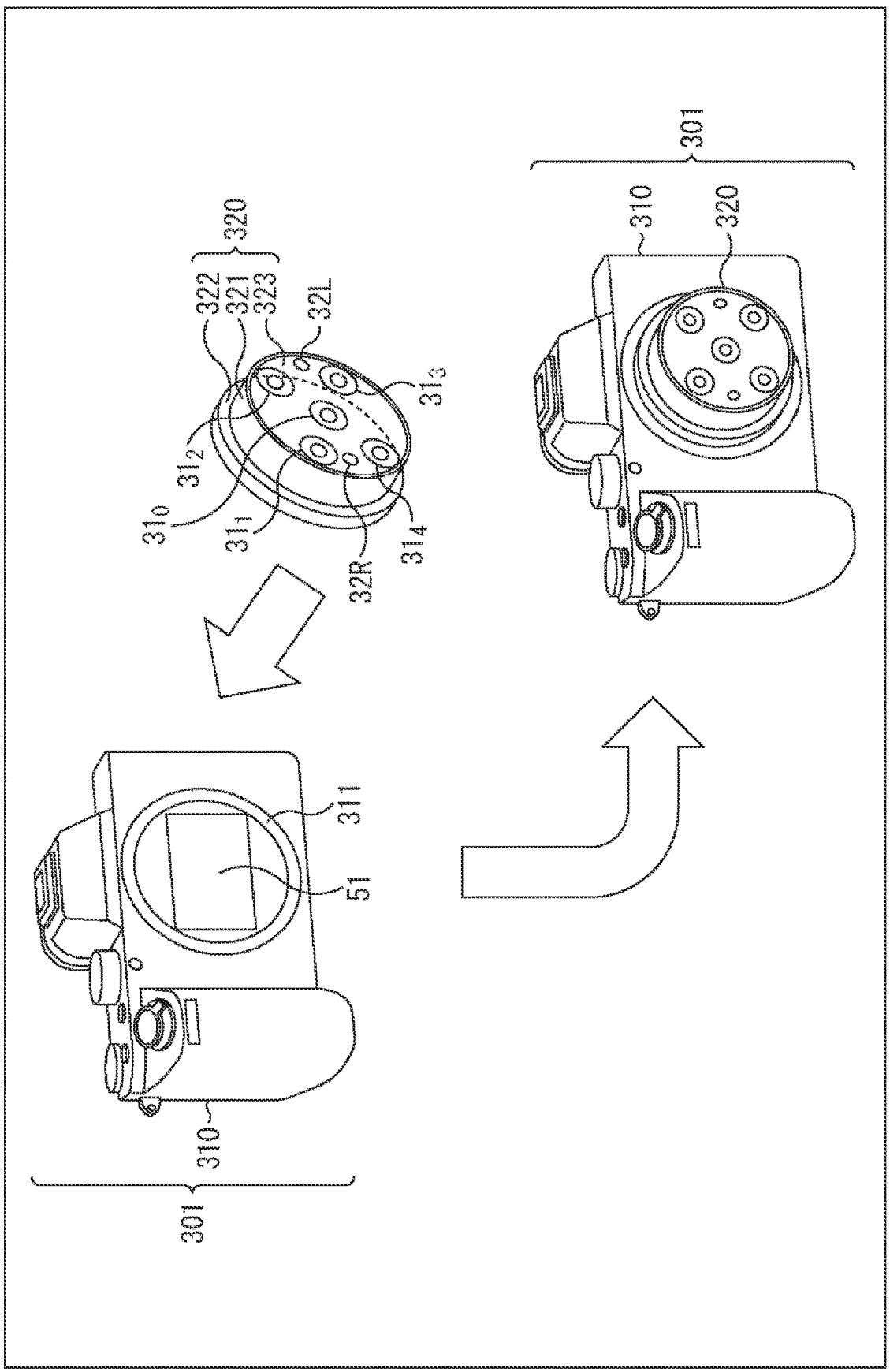
FIG. 21 is a perspective view showing an example configuration of an embodiment of a camera system to which the present technology is applied.

FIG. 21 is a perspective view showing an example configuration of an embodiment of a camera system to which the present technology is applied. A camera system 301 shown in FIG. 21 includes a camera body 310 and a multiple interchangeable lens 320 (the lens unit). In a state where the multiple interchangeable lens 320 is attached to the camera body 310, the camera system 301 has a configuration similar to that of the camera 10, and basically performs similar processes. That is, the camera system 301 functions as an imaging apparatus that captures an image of an object and generates image data of the captured image, like the camera 10.

The multiple interchangeable lens 320 is detachable from the camera body 310. Specifically, the camera body 310 includes a camera mount 311, and (the lens mount 322 of) the multiple interchangeable lens 320 is attached to the camera mount 311, so that the multiple interchangeable lens 320 is attached to the camera body 310. Note that a general interchangeable lens other than the multiple interchangeable lens 320 may be detachably attached to the camera body 310.

The camera body 310 includes an image sensor 51. The image sensor 51 receives light beams collected by the multiple interchangeable lens 320 or some other interchangeable lenses mounted on (the camera mount 311 of) the camera body 310, and performs photoelectric conversion to capture an image of the object.

The multiple interchangeable lens 320 includes a lens barrel 321 and the lens mount 322. The multiple interchangeable lens 320 also includes five monocular optical systems 310, 311, 312, 312, and 314 as a plurality of monocular optical systems.

The plurality of monocular optical systems 31 in this case is designed so that the optical paths of light passing through the respective systems are independent of one another, as in the case of the camera 10. That is, light having passed through each of the monocular optical systems 31 is emitted onto a different position on the light receiving surface (for example, the effective pixel region) of the image sensor 51, without entering the other monocular optical systems 31. At least the optical axes of the respective monocular optical systems 31 are located at different positions on the light receiving surface of the image sensor 51, and at least part of the light passing through the respective monocular optical systems 31 is emitted onto different positions on the light receiving surface of the image sensor 51.

Accordingly, in the captured image Generated by the image sensor 51 (the entire image output by the image sensor 51), the images of the object formed through the respective monocular optical systems 31 are formed at different positions, as in the case of the camera 10. In other words, from the captured image, captured images (also referred to as viewpoint images) with the respective monocular optical systems 31 being the viewpoints are obtained. That is, as the multiple interchangeable lens 320 is attached to the camera body 310 to capture an image of the object, a plurality of viewpoint images can be obtained.

The lens barrel 321 has a substantially cylindrical shape, and the lens mount 322 is formed on one bottom surface side of the cylindrical shape. The lens mount 322 is attached to the camera mount 311 of the camera body 310 when the multiple interchangeable lens 320 is attached to the camera body 310.

The five monocular optical systems 31 are provided in the multiple interchangeable lens 320 and are arranged so that, with the monocular optical system 310 being the center (gravity center), the other four monocular optical systems $31_1$ to $31_4$ form the vertices of a rectangle in a two-dimensional plane that is orthogonal to the optical axis of the lens barrel (or is parallel to the light receiving surface (imaging surface) of the image sensor 51). The arrangement shown in FIG. 21 is of course an example, and the respective monocular optical systems 31 can be in any positional relationship, as long as the optical paths are independent of one another.

<Example Electrical Configuration of the Camera System>

Figure 22:
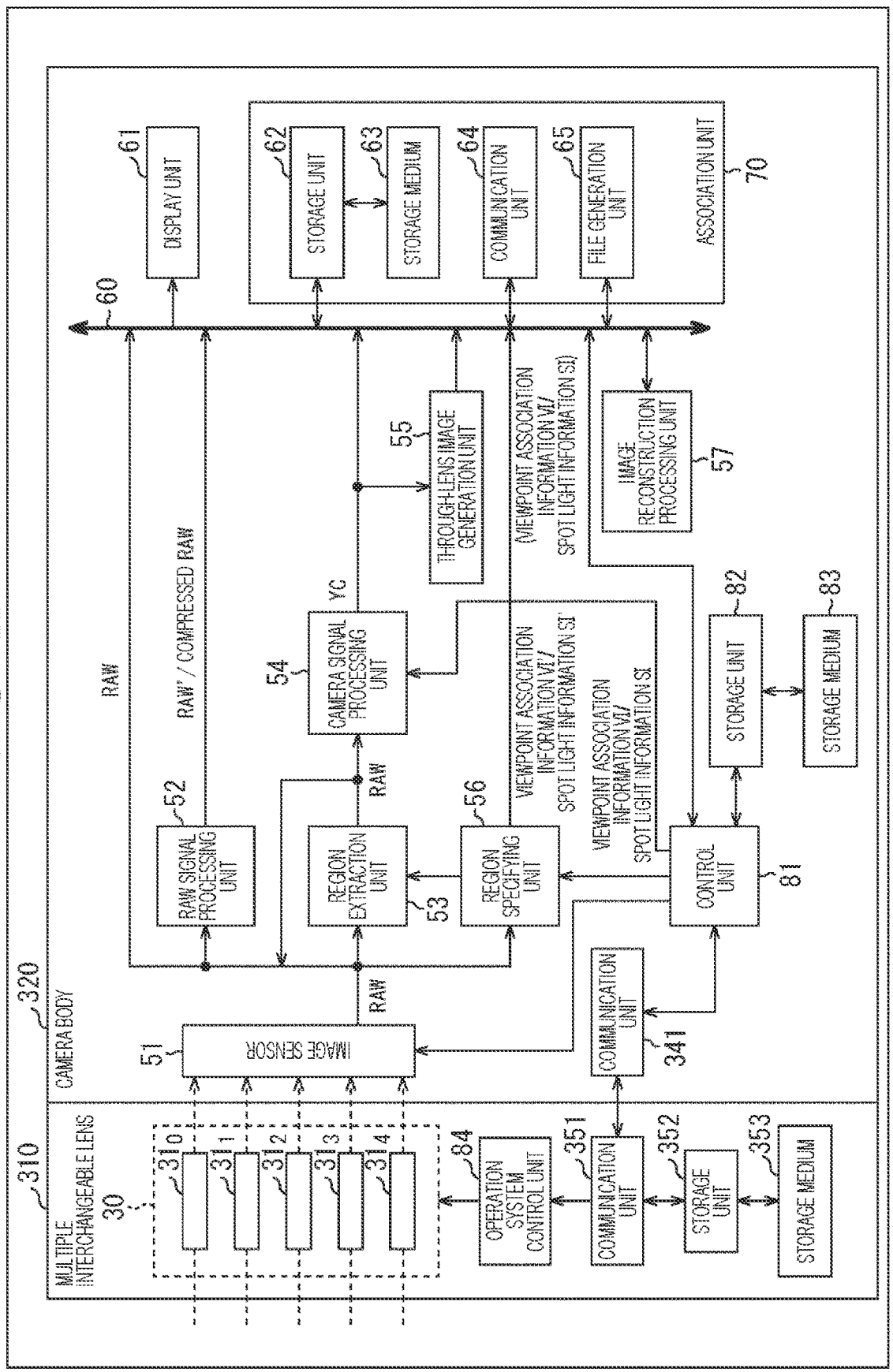
FIG. 22 is a block diagram showing an example electrical configuration of the camera system.

FIG. 22 is a block diagram showing an example electrical configuration of the camera system 301 shown in FIG. 21.

<Camera Body>

In the camera system 301, the camera body 310 includes the image sensor 51, a RAW signal processing unit 52, a region extraction unit 53, a camera signal processing unit 54, a through-lens image generation unit 55, a region specifying unit 56, an image reconstruction processing unit 57, a bus 60, a display unit 61, a storage unit 62, a communication unit 64, a file generation unit 65, a control unit 81, and a storage unit 82. That is, the camera body 310 has the components provided in the lens barrel 20 of the camera 10, except for the multiple optical system 30 and the optical system control unit 84.

Note that the camera body 310 includes a communication unit 341, in addition to the above-described components. This communication unit 341 is a processing unit that communicates with (a communication unit 351 of) the multiple interchangeable lens 320 properly attached to the camera body 310, to exchanges information and the like. The communication unit 341 can communicate with the multiple interchangeable lens 320 by any appropriate communication method. The communication may be cable communication or wireless communication.

For example, the communication unit 341 is controlled by the control unit 81, performs the communication, and acquires information supplied from the multiple interchangeable lens 320. Through the communication, the communication unit 341 also supplies the multiple interchangeable lens 320 with information supplied from the control unit 81, for example. The information to be exchanged with the multiple interchangeable lens 320 may be any appropriate information. For example, the information may be data, or may be control information such as a command or control parameters.

<Multiple Interchangeable Lens>

In the camera system 301, the multiple interchangeable lens 320 includes the communication unit 351 and a storage unit 352, in addition to a multiple optical system 30 and an optical system control unit 84. In the multiple interchangeable lens 320 properly attached to the camera body 310, the communication unit 351 communicates with the communication unit 341. Through this communication, information exchange between the camera body 310 and the multiple interchangeable lens 320 is performed. The communication method to be implemented by the communication unit 351 may be cable communication or wireless communication. Further, the information to be exchanged through this communication may be data, or may be control information such as a command or control parameters.

For example, the communication unit 351 acquires control information that is transmitted from the camera body 310 via the communication unit 341. The communication unit 351 supplies the information acquired in this manner to the optical system control unit 84 as necessary, so that the information can be used in controlling the multiple optical system 30.

Also, the communication unit 351 can supply the acquired information to the storage unit 352, and store the information into a storage medium 353. Further, the communication unit 351 can read information stored in the storage medium 353 via the storage unit 352, and transmit the read information to the camera body 310 (the communication unit 341).

Note that the storage medium 353 may be a ROM, or may be a rewritable memory such as a RAM or a flash memory. In the case of a rewritable memory, the storage medium 35 can store desired information.

<Fixing of the Monocular Optical Systems>

Figure 16:
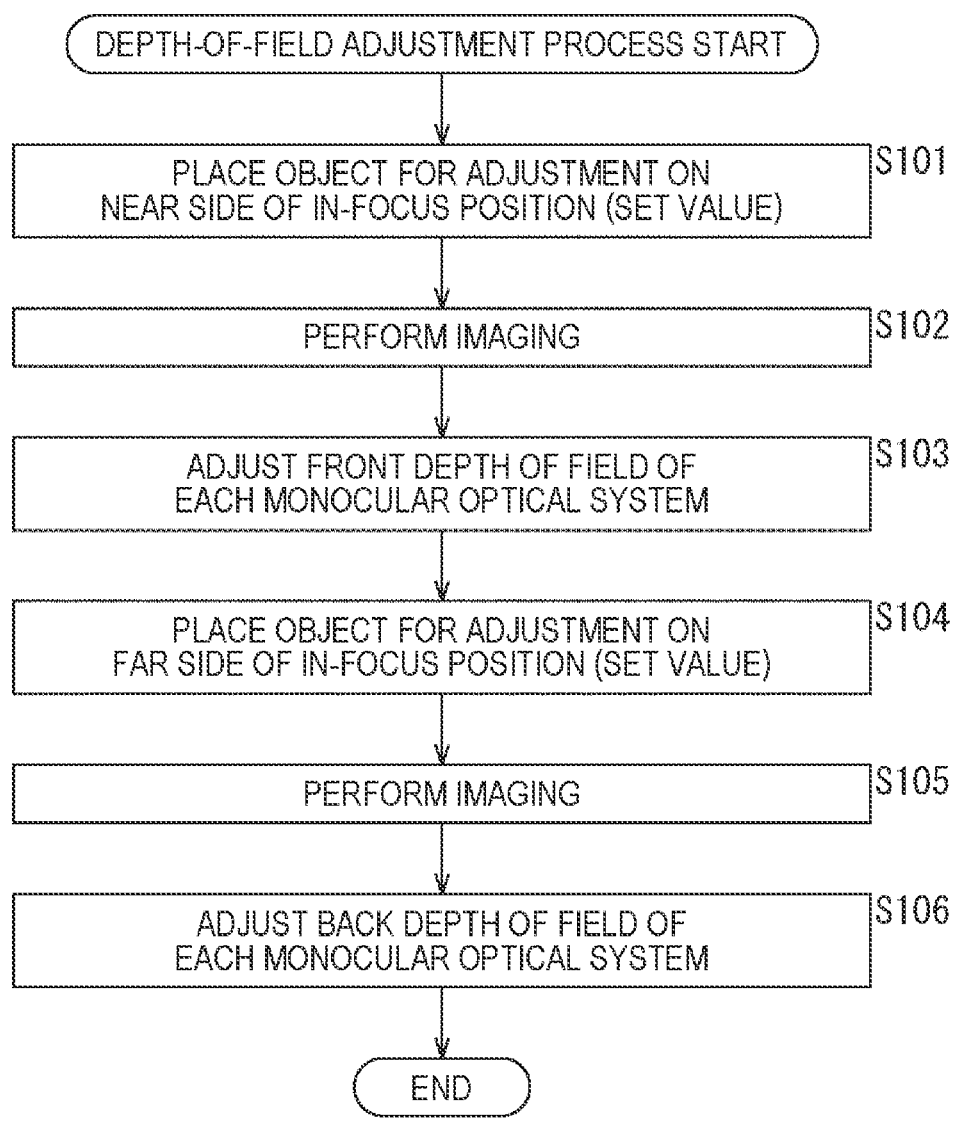
FIG. 16 is a flowchart for explaining an example flow of a depth-of-field adjustment process.
Figure 20:
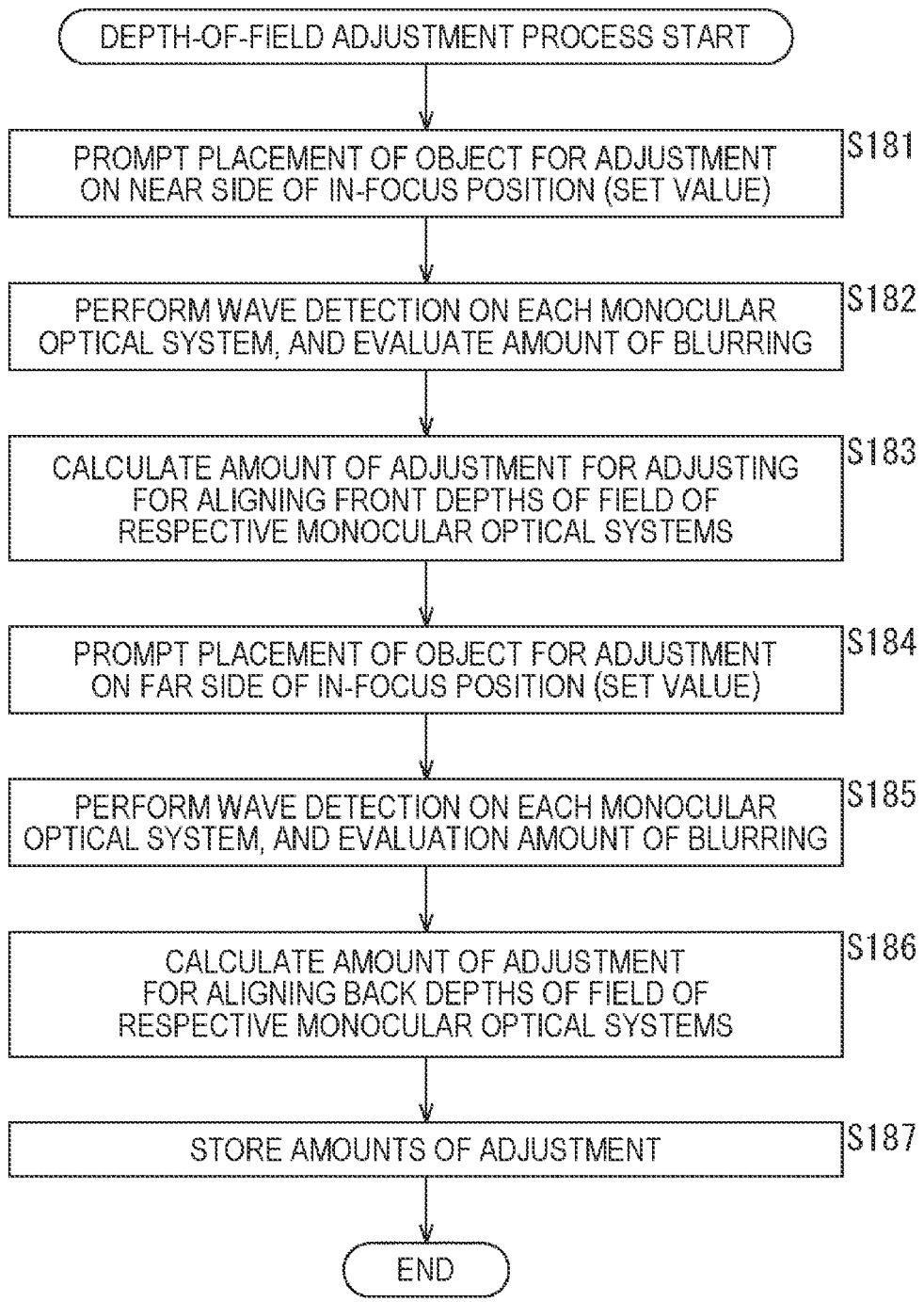
FIG. 20 is a flowchart for explaining an example flow of a depth-of-field adjustment process.

The adjustment of the depth of field of the multiple optical system 30 (each monocular optical system 31) in this case may be performed before factory shipment or the like, for example, as in the case of the camera 10 described above in the first embodiment (the depth-of-field adjustment process in FIG. 16 or 20).

In that case, each of the monocular optical systems 31 may be fixed to the multiple interchangeable lens 320 in the state after the depth-of-field adjustment. For example, as in the case described above in <Focus Control by Driving of the Entire Multiple Optical System>, the multiple interchangeable lens 320 may include a feeding unit that simultaneously (collectively) controls the focal lengths of the plurality of monocular optical systems 31, and each of the monocular optical systems 31 may be fixed to the feeding unit in the state after the depth-of-field adjustment.

In the case of such a configuration, when the camera body 310 is driven in an imaging mode for imaging the object, and the multiple interchangeable lens 320 attached to the camera body 310 controls the focal lengths, for example, the optical system control unit 84 moves the feeding unit (or the entire multiple optical system 30). Accordingly, the optical system control unit 84 can control the focal lengths of all the monocular optical systems 31 while maintaining the result of the depth-of-field adjustment. That is, the optical system control unit 84 can focus all of the monocular optical systems 31.

<Flow in a Focusing Process>

Figure 23:
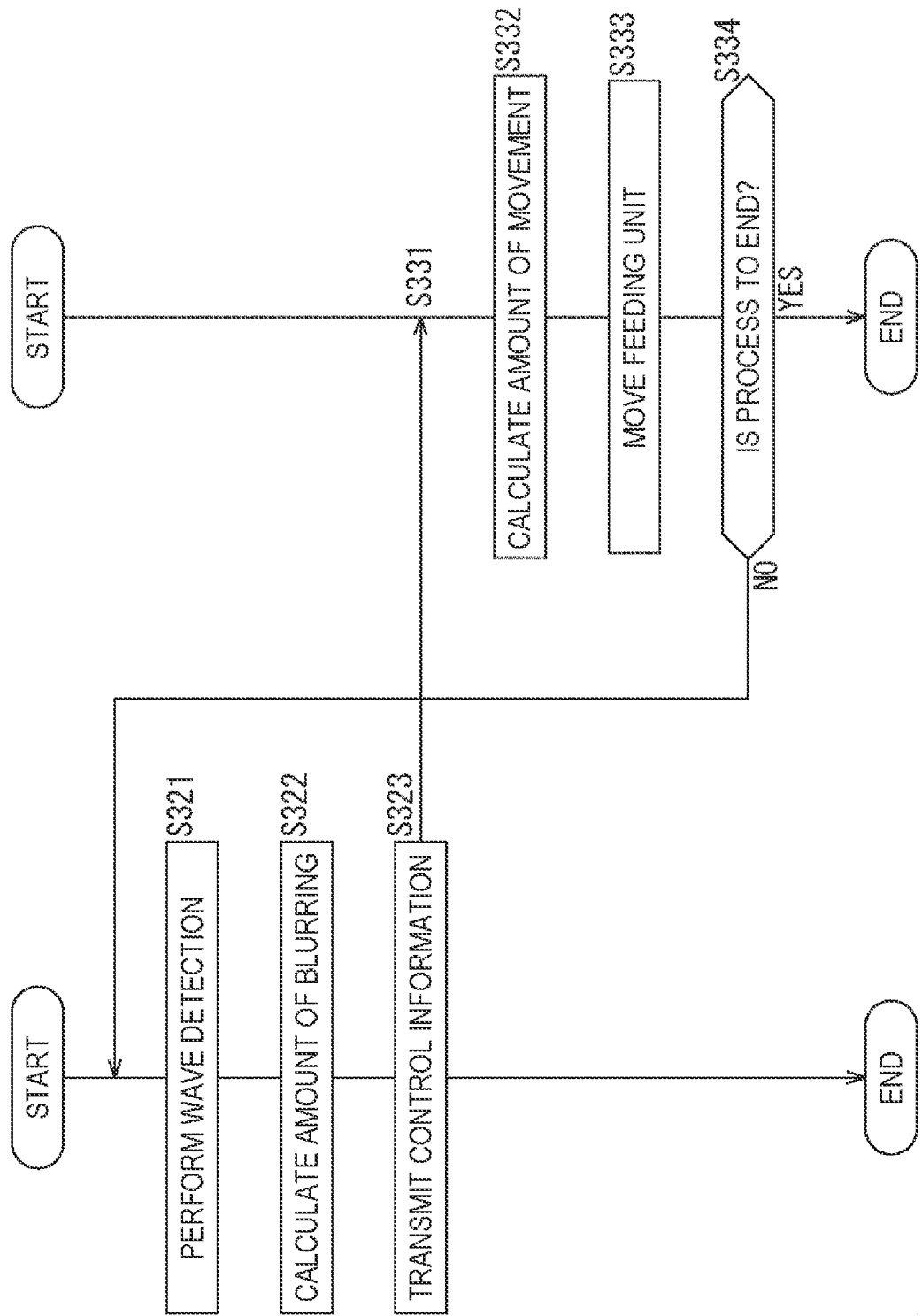
FIG. 23 is a flowchart for explaining an example flow of a focusing process.

Referring now to a flowchart shown in FIG. 23, an example flow in the focusing process for controlling the focal lengths in this case is described. Note that this flowchart corresponds to the flowchart shown in FIG. 17. For example, when a predetermined operation for focal length adjustment, such as setting the operation mode of the camera body 310 to an imaging mode for performing imaging or pressing the shutter button halfway, is performed, the focusing process is started.

When the focusing process is started, the control unit 81 of the camera body 310 in step S321 controls the image sensor 51 to capture an image of the object, acquires the captured image, and performs wave detection using the captured image. Alternatively, the image sensor 51 acquires an image of the object, and the control unit 81 performs wave detection using the acquired image. Note that this wave detection may be performed with the use of a monocular image of one or a plurality of predetermined monocular optical systems 31 (a reference monocular optical system, for example) included in the captured image (or the acquired image). Alternatively, this wave detection may be performed with the use of all the monocular images included in the captured image (or the acquired image).

In step S322, the control unit 81 calculates the amount of blurring, on the basis of the wave detection result.

In step S323, the control unit 81 generates control information indicating the calculated amount of blurring. The communication unit 341 acquires the control information from the control unit 81, and transmits the control information to the communication unit 351.

In step S331, the communication unit 351 of the multiple interchangeable lens 320 receives the control information transmitted in step S323, and supplies the control information to the optical system control unit 84.

In step S332, the optical system control unit 84 calculates the amount of movement of the feeding unit in accordance with the amount of blurring indicated by the supplied control information.

In step S333, the optical system control unit 84 moves the feeding unit by the calculated amount of movement.

In step S334, the optical system control unit 84 determines whether or not to end the focusing process. If it is determined not to end the focusing process yet, the process returns to step S321, and the processes that follow are repeated.

If it is determined in step S334 that the focusing process is to end, on the other hand, the focusing process comes to an end.

In the above manner, the camera system 301 (the multiple interchangeable lens 320 and the camera body 310) can control the focus position while maintaining the result of the depth-of-field adjustment.

<Adjustment Amount Storing by the Multiple Interchangeable tens>

In the focus control, the focal lengths of the respective monocular optical systems 31 can be controlled independently of one another. The adjustment of the depth of field of the multiple optical system 30 (each monocular optical system 31) in this case may also be performed before factory shipment or the like, for example, as in the case of the camera 10 described above in the first embodiment (the depth-of-field adjustment process in FIG. 16 or 20).

In that case, the amounts of depth-of-field adjustment may be stored in (the storage medium 353 of) the multiple interchangeable lens 320, and the amounts of depth-of-field adjustment read from the storage medium 353 may be used in the focus control.

<Flow in a Focusing Process>

Figure 24:
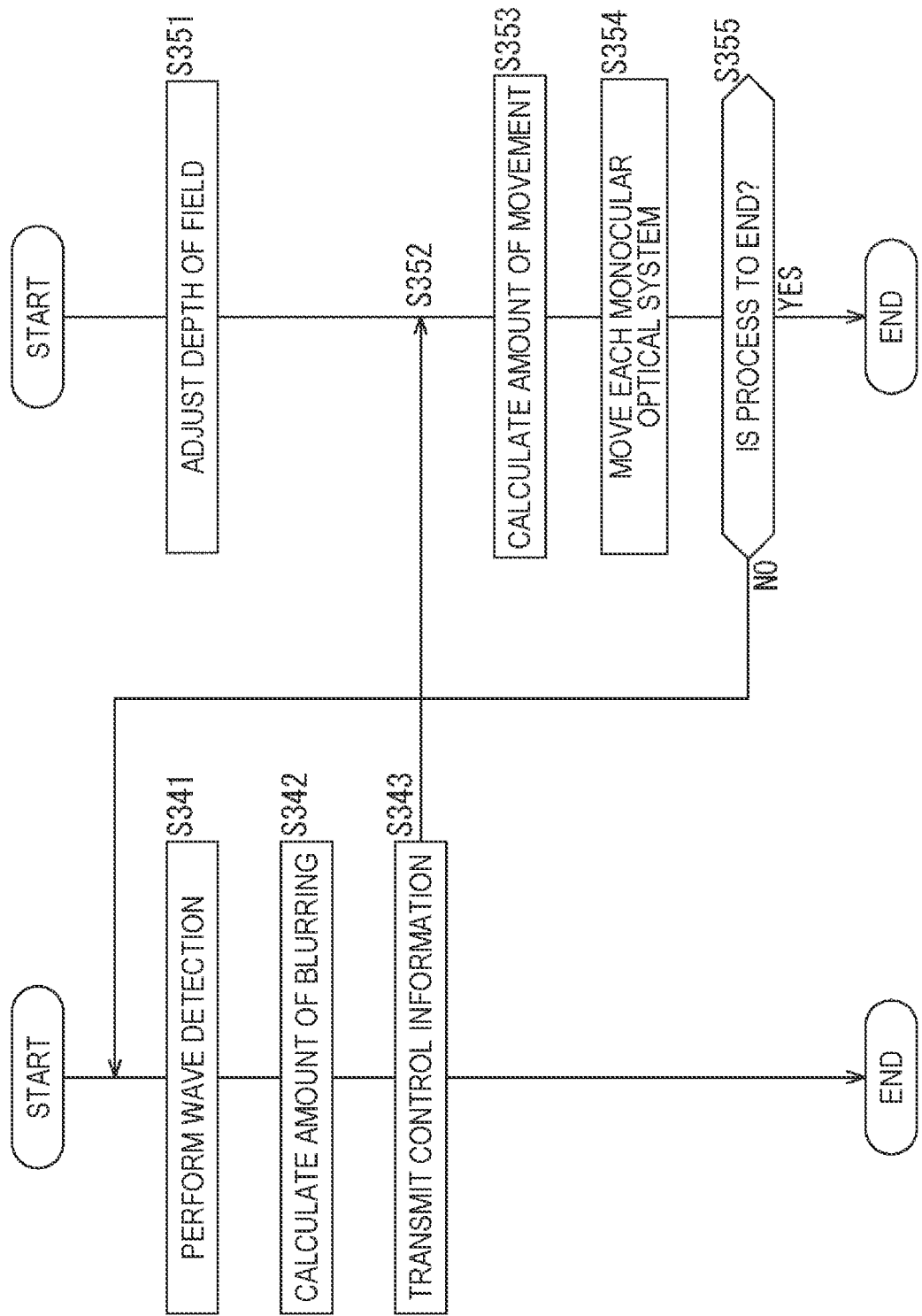
FIG. 24 is a flowchart for explaining an example flow of a focusing process.

Referring now to a flowchart shown in FIG. 24, an example flow in the focusing process for controlling the focal lengths in this case is described. Note that this flowchart corresponds to the flowchart shown in FIG. 18.

For example, when a predetermined operation for focal length adjustment, such as setting the operation mode of the camera body. 310 to an imaging mode for performing imaging or pressing the shutter button halfway, is performed, the focusing process is started.

When the focusing process is started, the optical system control unit 84 of the multiple interchangeable lens 320 in step S351 acquires, via the storage unit 352, the control information that is stored in the storage medium 353 and indicates the adjustment amounts (the adjustment amounts calculated through the depth-of-field adjustment process or the like described above with reference to the flowchart in FIG. 16, for example) for the depths of field of the respective monocular optical systems 31, and adjusts the depths of field of the respective monocular optical systems 31, using the adjustment amounts indicated by the control information. By this adjustment, the depths of field of the respective monocular optical systems 31 are aligned with one another.

In step S341, the control unit 81 of the camera body 310 controls the image sensor 51 to capture an image of the object, acquires the captured image, and performs wave detection using the captured image. Alternatively, the image sensor 51 acquires an image of the object, and the control unit 81 performs wave detection using the acquired image. Note that this wave detection may be performed with the use of a monocular image of one or a plurality of predetermined monocular optical systems 31 (a reference monocular optical system, for example) included in the captured image (or the acquired image). Alternatively, this wave detection may be performed with the use of all the monocular images included in the captured image (or the acquired image).

In step S342, the control unit 81 calculates the amount of blurring, on the basis of the wave detection result.

In step S343, the control unit 81 generates control information indicating the calculated amount of blurring. The communication unit 341 acquires the control information from the control unit 81, and transmits the control information to the communication unit 351.

In step S352, the communication unit 351 of the multiple interchangeable lens 320 receives the control information transmitted in step S343, and supplies the control information to the optical system control unit 84.

In step S353, the optical system control unit 84 calculates the amounts of movement of the respective monocular optical systems 31 in accordance with the amount of blurring indicated by the supplied control information. At that time, the optical system control unit 84 may calculate an amount of movement common to all the monocular optical systems 31. Alternatively, the optical system control unit 84 may calculate an amount of movement for each monocular optical system 31.

In step S354, the optical system control unit 84 moves each monocular optical system 31 by the calculated amount of movement. At that time, the optical system control unit 42 may move all the monocular optical systems 31 by an amount of movement common to all the monocular optical systems 31. Alternatively, the optical system control unit 42 may move each of the monocular optical systems 31 by each corresponding amount of movement.

In step S355, the optical system control unit 84 determines whether or not to end the focusing process. If it is determined not to end the focusing process yet, the process returns to step S341, and the processes that follow are repeated.

If it is determined in step S355 that the focusing process is to end, on the other hand, the focusing process comes to an end.

In the above manner, the camera system 301 (the multiple interchangeable lens 320 and the camera body 310) can control the focus position while maintaining the result of the depth-of-field adjustment.

<Movement Amount Calculation Taking Adjustment Amounts into Consideration>

Note that the amounts of movement for the monocular optical systems 31 may be calculated, with the amounts of depth-of-field adjustment being taken into account. That is, the optical system control unit 84 may adjust the depths of field of the monocular optical systems 31 and focus the monocular optical system 31 on the object, on the basis of control information including the control amounts (the amounts of movement for the monocular optical systems 31) for focusing the monocular optical systems 31 on the object, the control amount having been calculated on the basis of the amounts of depth-of-field adjustment and the wave detection result.

In this case, the amounts of depth-of-field adjustment may also be stored in (the storage medium 353 of) the multiple interchangeable lens 320, and the amounts of depth-of-field adjustment read from the storage medium 353 may be used in the focus control.

<Flow in a Focusing Process>

Figure 25:
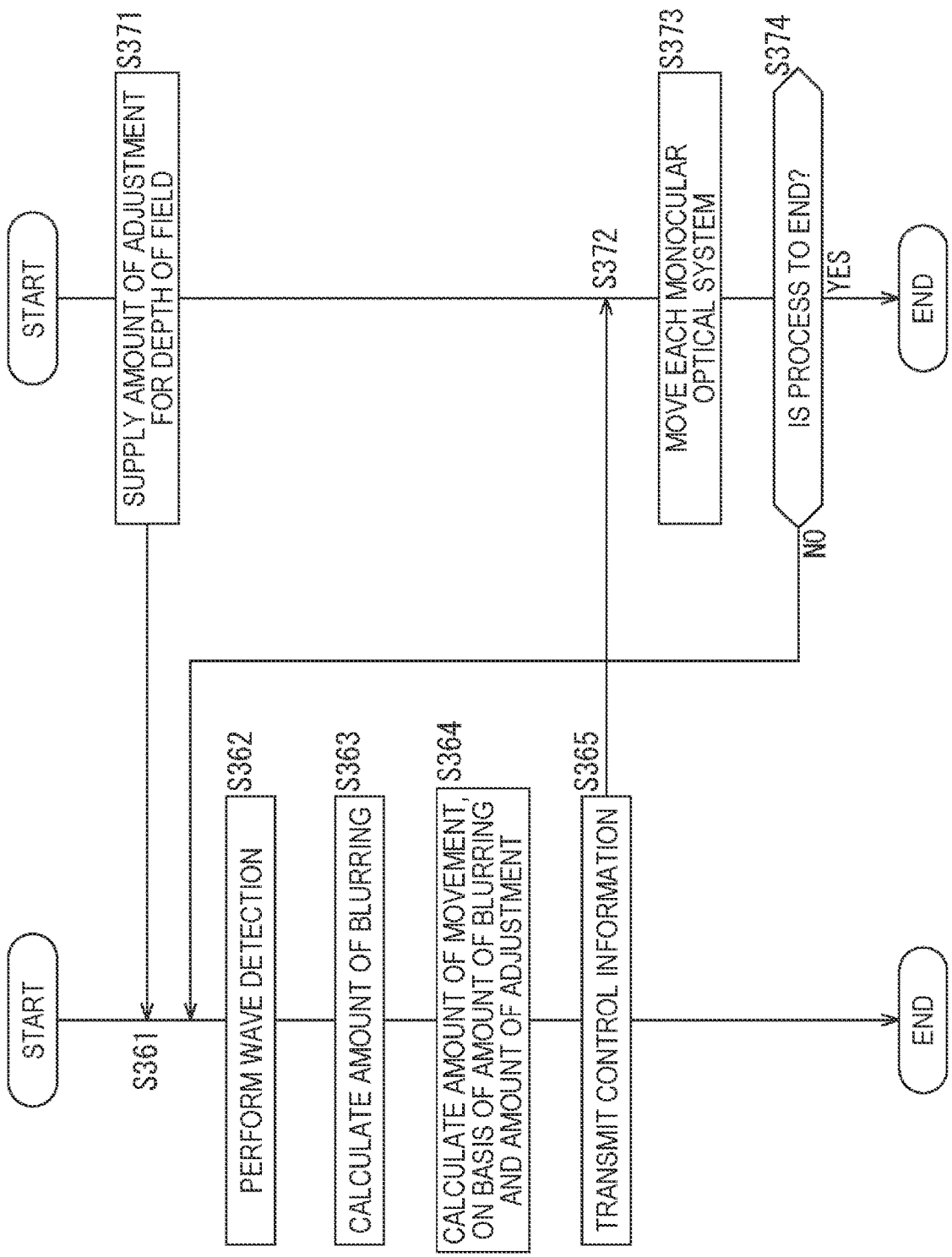
FIG. 25 is a flowchart for explaining an example flow of a focusing process.

Referring now to a flowchart shown in FIG. 25, an example flow in the focusing process for controlling the focal lengths in this case is described. Note that this flowchart corresponds to the flowchart shown in FIG. 19.

For example, when a predetermined operation for focal length adjustment, such as setting the operation mode of the camera body 310 to an imaging mode for performing imaging or pressing the shutter button halfway, is performed, the focusing process is started.

When the focusing process is started, the communication unit 351 in step S371 acquires, via the storage unit 352, the control information that is stored in the storage medium 353 and indicates the adjustment amounts (the adjustment amounts calculated through the depth-of-field adjustment process or the like described above with reference to the flowchart in FIG. 16, for example) for the depths of field of the respective monocular optical systems 31. The communication unit 351 then performs predetermined communication with the communication unit 341 of the camera body 310, and transmits the control information to the communication unit 341. In step S361, the communication unit 341 receives the control information, and supplies the control information to the control unit 81.

The respective processes in steps S362 and S363 are performed in a manner similar to that in the respective processes in steps S341 and S342.

In step S364, the control unit 81 calculates the amount of movement for each monocular optical system 31, on the basis of the calculated amount of blurring and the amounts of depth-of-field adjustment for the respective monocular optical systems 31 indicated by the control information acquired in step S361. That is, the control unit 81 calculates an amount of movement for each of the monocular optical systems 31.

In step S365, the control unit 81 generates control information indicating the calculated amounts of movement of the respective monocular optical systems 31. The communication unit 341 acquires the control information, and transmits the control information to the communication unit 351.

In step S372, the communication unit 351 of the multiple interchangeable lens 320 receives the control information transmitted in step S365, and supplies the control information to the optical system control unit 84.

In step S373, the optical system control unit 84 moves each of the monocular optical systems 31 on the basis of the supplied control information. That is, the optical system control unit 84 moves each monocular optical system 31 by each corresponding amount of movement indicated by the control information.

In step S374, the optical system control unit 84 determines whether or not to end the focusing process. If it is determined not to end the focusing process yet, the process returns to step S362, and the processes that follow are repeated. When the processes are repeated in this manner, the amounts of depth-of-field adjustment supplied in step S371 are reflected in the movement amounts calculated in step S364.

If it is determined in step S374 than the focusing process is to end, on the other hand, the focusing process comes to an end.

In the above manner, the camera system 301 (the multiple interchangeable lens 320 and the camera body 310) can control the focus position, with the result of the depth-of-field adjustment being reflected.

<Adjustment Amount Storing by the Camera Body>

Note that the amounts of depth-of-field adjustment may be stored in the camera body 310.

For example, the amounts of depth-of-field adjustment may be stored in the storage medium 83 of the camera body 310.

In this case, since the multiple interchangeable lens 320 is detachable from the camera body 310, the storage medium 83 needs to associate the amounts of depth-of-field adjustment with the multiple interchangeable lens 320. Therefore, the storage unit 82 stores the amounts of depth-of-field adjustment associated with the multiple interchangeable lens 320 into the storage medium 83, using identification information or the like about the multiple interchangeable lens 320. That is, the amounts of depth-of-field adjustment are stored while the multiple interchangeable lens 320 with which the adjustment amounts are associated can be identified. In other words, the storage medium 83 can store the amounts of depth-of-field adjustment for a plurality of multiple interchangeable lenses 320.

For example, when a multiple interchangeable lens 320 is attached to the camera body 310, the communication unit 351 reads the identification information about the multiple interchangeable lens 320 from the storage medium 353 via the storage unit 352, and supplies the identification information to the camera body 310. Acquiring the identification information via the communication unit 341, the control unit 81 reads the amounts of depth-of-field adjustment corresponding to the identification information from the storage medium 83 via the storage unit 82. The control unit 81 then supplies the adjustment amounts to the multiple interchangeable lens 320 via the communication unit 341. The optical system control unit 84 acquires the adjustment amounts via the communication unit 351, and performs focus control using the adjustment amounts.

Note that the amounts of depth-of-field adjustment may be stored into the storage medium 83 at the time of factory shipment, at a time of updating, or the like, or may, be read from the multiple interchangeable lens 320 attached to the camera body 310 and be stored into the storage medium 83.

With such a configuration, the amounts of depth-of-field adjustment are not stored in the storage medium 353, and accordingly, an increase in the storage capacity required for the storage medium 353 can be prevented. Thus, an increase in the costs of the multiple interchangeable lens 320 can be prevented.

Note that it is possible to prevent an increase in the storage capacity required for the storage medium 353 by storing the amounts of depth-of-held adjustment into the storage medium 353. Thus, an increase in the costs of the camera body 310 can be prevented.

<Flow in a Focusing Process>

In a case where depth-of-field adjustment is performed with the use of the adjustment amounts stored in the storage medium 83 in this manner, the focusing process is performed basically in a manner similar to that in the case described with reference to the flowchart shown in FIG. 24 or 25.

Figure 26:
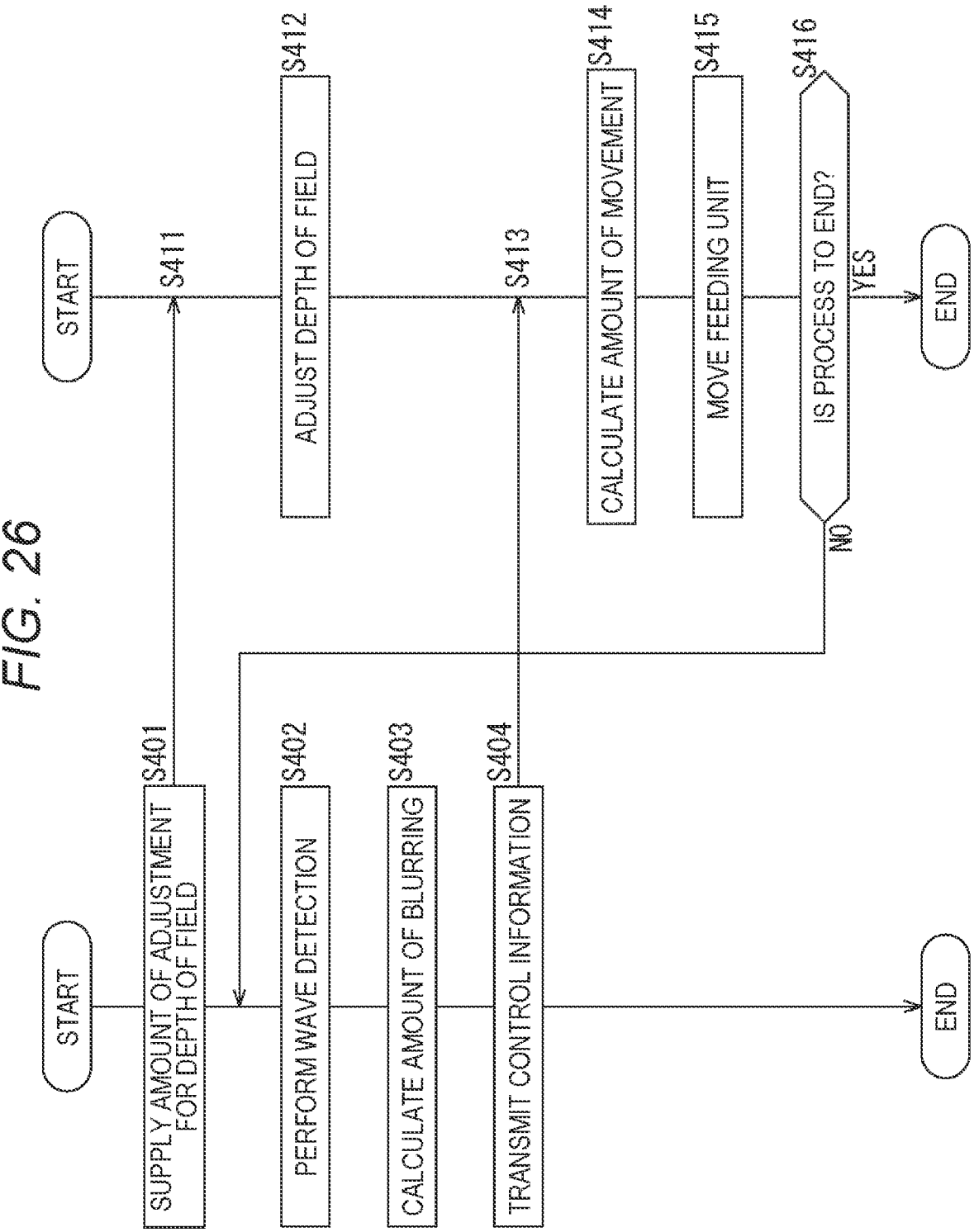
FIG. 26 is a flowchart for explaining an example flow of a focusing process.

An example flow in the focusing process to be performed in a case where the focus position is controlled while the result of depth-of-field adjustment is maintained as in the case shown in FIG. 24 is now described with reference to a flowchart shown in FIG. 26.

In this case, the amounts of depth-of-field adjustment are stored in the storage medium 83 of the camera body 310. Therefore, when the focusing process is started, the control unit 81 of the camera body 310 in step S401 acquires the amounts of depth-of-field adjustment stored in the storage medium 83 via the storage unit 82, and controls the communication unit 341 to transmit the adjustment amounts to the communication unit 351 of the multiple interchangeable lens 320.

In step S411, the communication unit 351 of the multiple interchangeable lens 320 acquires the adjustment amounts, and supplies them to the optical system control unit 84.

The processes that follow are performed in a flow similar to that shown in FIG. 24. For example, the respective processes in steps S402 to S404 on the side of the camera body 310 are performed in a manner similar to that in the respective processes in steps S341 to S343 (FIG. 24). Also, the respective processes in steps S412 to S416 on the side of the multiple interchangeable lens 320 are performed in a manner similar to that in the respective processes in steps S351 to S355 (FIG. 24).

If it is determined in step S416 that the focusing process is to end, the focusing process comes to an end.

In the above manner, the camera system 301 (the multiple interchangeable lens 320 and the camera body 310) can control the focus position while maintaining the result of the depth-of-field adjustment.

<Flow in a Focusing Process>

Figure 27:
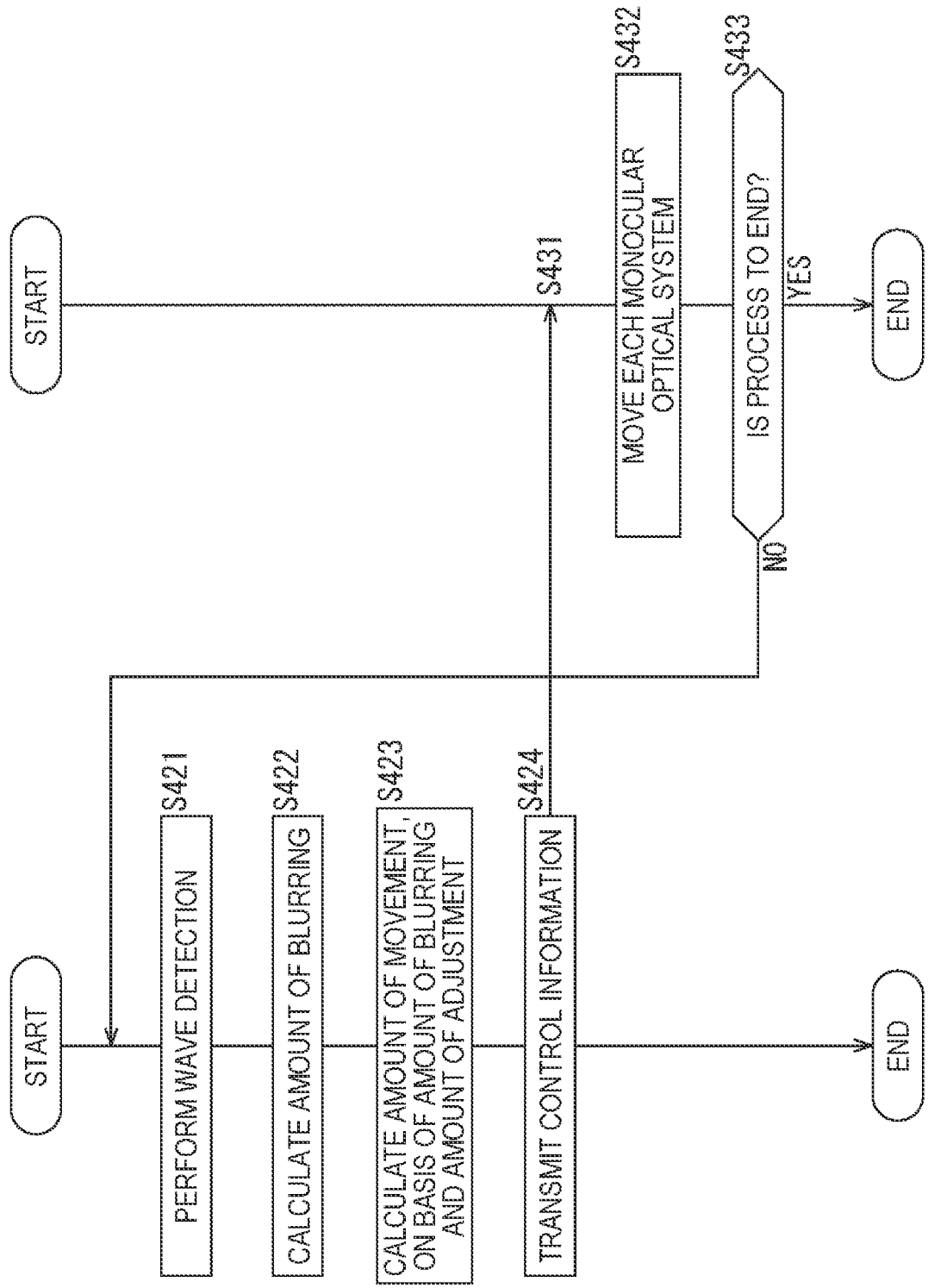
FIG. 27 is a flowchart for explaining an example flow of a focusing process.

Next, an example flow in the focusing process to be performed in a case where the amounts of movement of the monocular optical systems 31 are calculated with the amount of depth-of-field adjustment being taken into consideration as in the case shown in FIG. 25 is described with reference to a flowchart shown in FIG. 27.

In this case, since the amounts of depth-of-field adjustment are stored in the storage medium 83 of the camera body 310, the respective processes in steps S371 and S361 (FIG. 25) are skipped.

The processes that follow are performed in a flow similar to that shown in FIG. 25. For example, the respective processes in steps S421 to S424 on the side of the camera body 310 are performed in a manner similar to that in the respective processes in steps S362 to S365 (FIG. 25). Also, the respective processes in steps S431 to S433 on the side of the multiple interchangeable lens 320 are performed in a manner similar to that in the respective processes in steps S372 to S374 (FIG. 26).

If it is determined in step S433 that the focusing process is to end, the focusing process comes to an end.

In the above manner, the camera system 301 (the multiple interchangeable lens 320 and the camera body 310) can control the focus position, with the result of the depth-of-field adjustment being reflected.

3. Third Embodiment

<Other Example Configurations>
<Plurality of Image Sensors>

Note that, in the above description, one image sensor 51 receives light having passed through a plurality of monocular optical systems 31, and performs photoelectric conversion to generate a captured image. However, the present technology is not limited this example, and different image sensors may receive light having passed through the respective monocular optical systems 31. An example configuration in that case is shown in FIG. 28.

Figure 28:
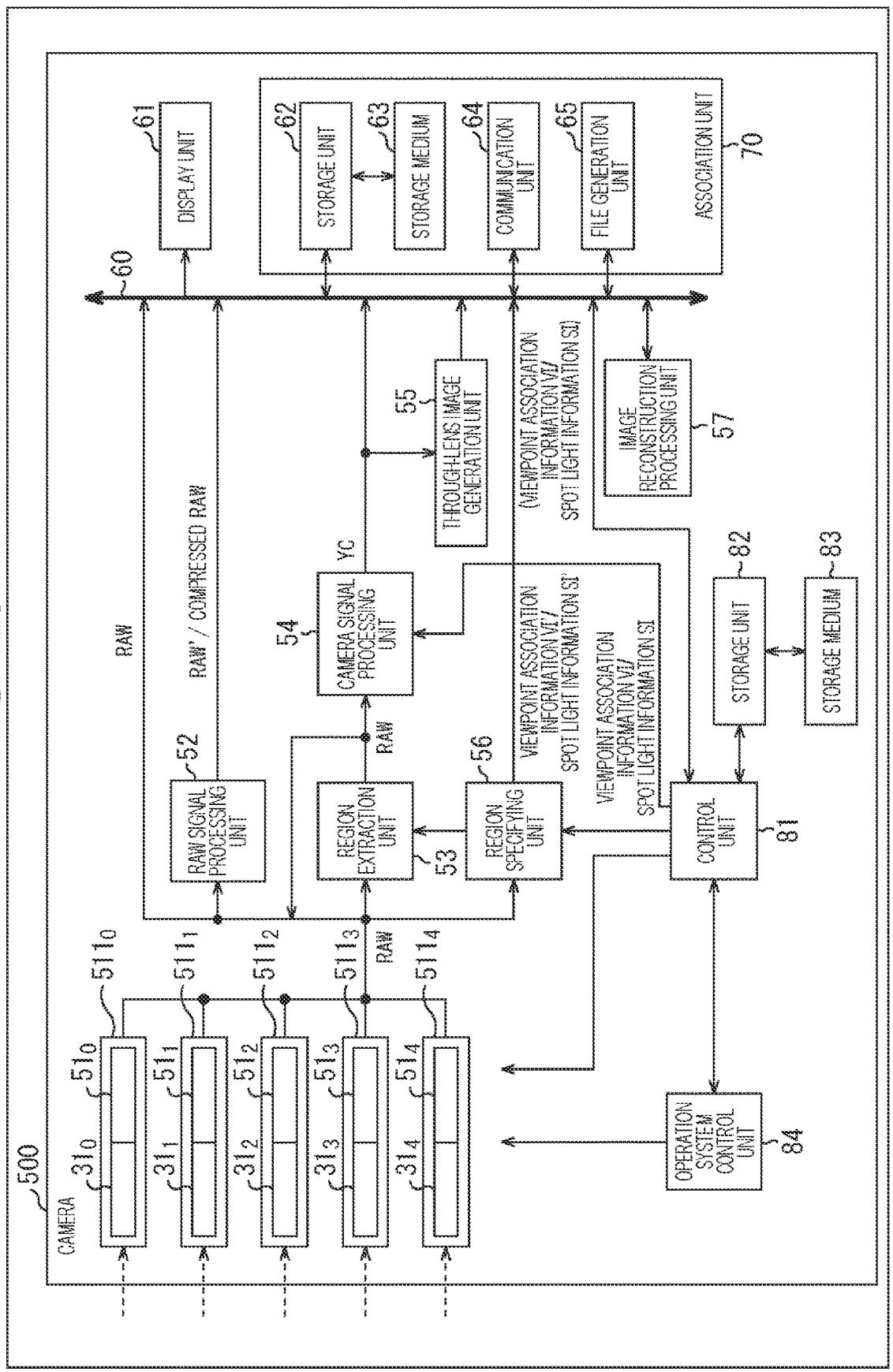
FIG. 28 is a block diagram showing an example electrical configuration of a camera.

In FIG. 28, a camera 500 is an embodiment of an imaging apparatus to which the present technology, is applied. The camera 500 is basically an apparatus similar to the camera 100, has a configuration similar to the camera 100, and performs similar processes. However, the camera 500 includes monocular imaging units $511_0$ to $511_4$, instead of the multiple optical system 30 and the image sensor 51 of the camera 100. The monocular imaging unit $511_0$ includes a monocular optical system $31_0$ and an image sensor $51_0$. The monocular imaging unit $511_1$ includes a monocular optical system $31_1$ and an image sensor $511_4$ The monocular imaging unit $511_2$ includes a monocular optical system $31_2$ and an image sensor $51_2$. The monocular imaging unit $511_3$ includes a monocular optical system $31_3$ and an image sensor $51_3$. The monocular imaging unit $511_4$ includes a monocular optical system $31_4$ and an image sensor $51_4$. Note that, in the description below, in a case where there is no need to distinguish the monocular imaging units $511_0$ to $511_4$ from one another, they will be referred to as monocular imaging units 511.

That is, the camera 500 includes a plurality of monocular imaging units 511. Light that has passed through the monocular optical systems 31 of the respective monocular imaging units 511 enters the image sensors 51 of the monocular imaging units 511, and is photoelectrically converted so that captured images are generated. That is, each of the monocular imaging units 511 generates a captured image that is a monocular image. The captured images (monocular images) generated by the image sensors 51 of the respective monocular imaging units 511 are supplied to the RAF signal processing unit 52, the region extraction unit 53, the region specifying unit 56, the bus 60, or the like, as in the case shown in FIG. 2.

Also, in this case, the optical system control unit 84 controls the lens groups 121, the aperture 122, and the like of the monocular optical system 31 of each monocular imaging unit 511, as in the case shown FIG. 2. Further, the control unit 81 controls (the image sensor 51 of) each monocular imaging unit 511, to capture an image of the object.

In the case of such a configuration, the control unit 81 can perform processes similar to those in the case of the camera 100 (FIG. 2). For example, the control unit 81 can adjust the depths of field of the plurality of monocular optical systems 31 having optical paths independent of one another in the respective monocular imaging units 511, using the captured images acquired from the image sensors 51 of the respective monocular imaging units 511. The control unit 81 can also calculate the amounts of depth-of-field adjustment for the monocular optical systems 31.

Alternatively, the amounts of depth-of-field adjustment may be calculated in an apparatus different from the above camera 10, the camera system 301, the camera 500, or the like including the monocular optical systems 31. For example, as shown in A of FIG. 29, a depth-of-field adjustment device 600 connected to the camera body 310 of the camera system 301 may be provided. In that case, the depth-of-field adjustment device 600 performs a depth-of-field adjustment process, calculates the amounts of depth-of-field adjustment, and sets the calculated adjustment amounts in the camera body 310.

In this case, the present technology described in the second embodiment can be applied to the depth-of-field adjustment device 600. That is, this depth-of-field adjustment device 600 performs the above-described depth-of-field adjustment process (FIG. 20), to calculate the amounts of depth-of-field adjustment for the monocular optical systems 31 of the multiple interchangeable lens 320 attached to the camera body 310. Thus, the depth-of-field adjustment device 600 can adjust the depths of field of the monocular optical systems 31 of the multiple interchangeable lens 320.

Figure 29:
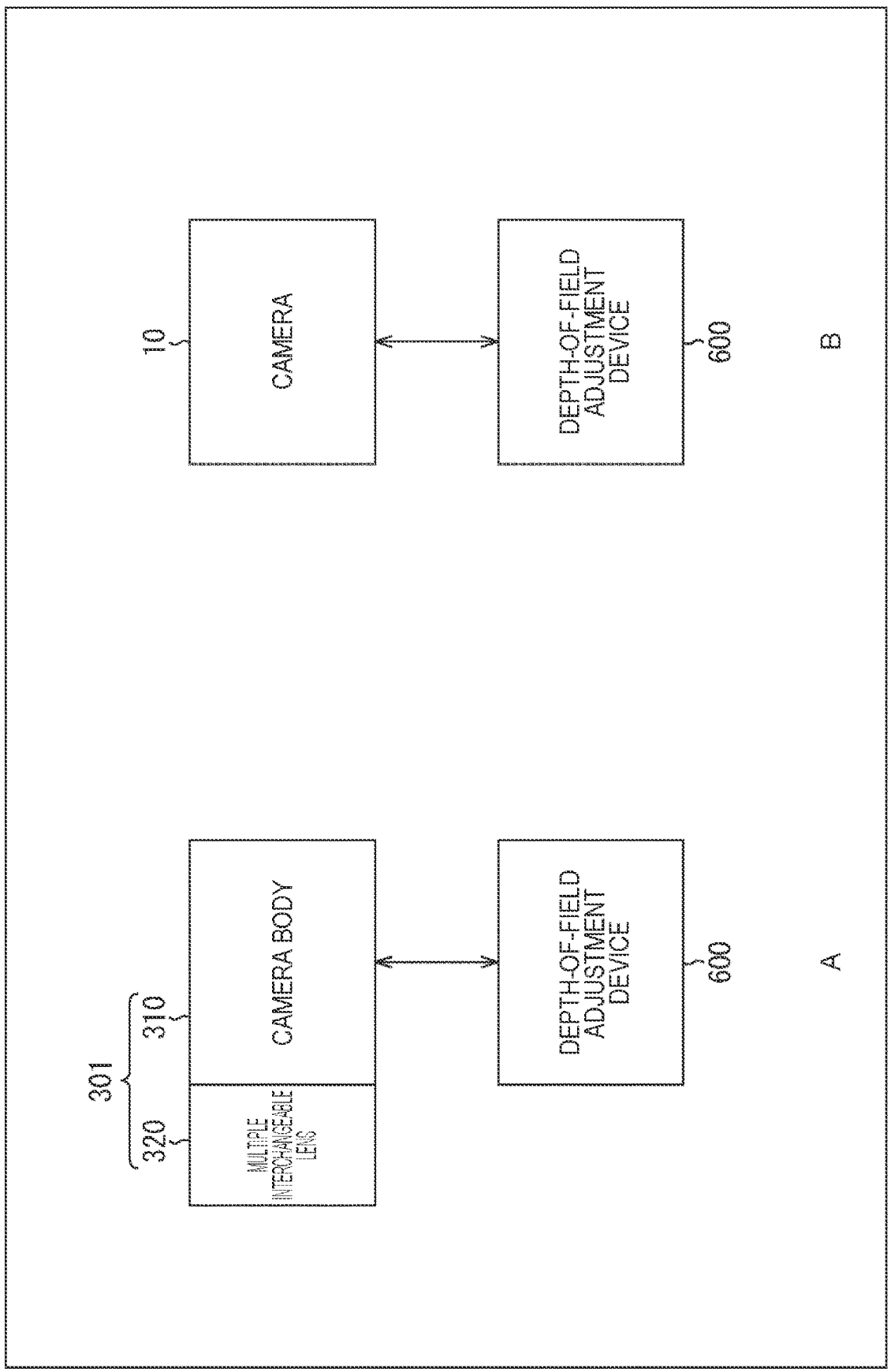
FIG. 29 is a block diagram showing an example configuration of a depth-of-field adjustment system.

Alternatively, as shown in 13 of FIG. 29, for example, the depth-of-field adjustment device 600 may be connected to the camera 10, and adjust the depths of field of the monocular optical systems 31 included in the camera 10. That is, the death-of-field adjustment device 600 performs the above-described depth-of-field adjustment process (FIG. 20), to calculate the amounts of depth-of-field adjustment for the monocular optical systems 31 included in the camera 10. Thus, the depth-of-field adjustment device 600 can adjust the depths of field of the monocular optical systems 31 of the camera 10. The depth-of-field adjustment device 600 may of course be connected to the camera 500, and adjust the depths of field of the monocular optical systems 31 included in the camera 500.

<Adjustment of Focal Length of a Multiple Optical System>

Although adjustment between the monocular optical systems 31 has been described above, it is possible to enable adjustment of the focal length of the multiple optical system 30 (or the entire group of the monocular optical systems 31).

Figure 30:
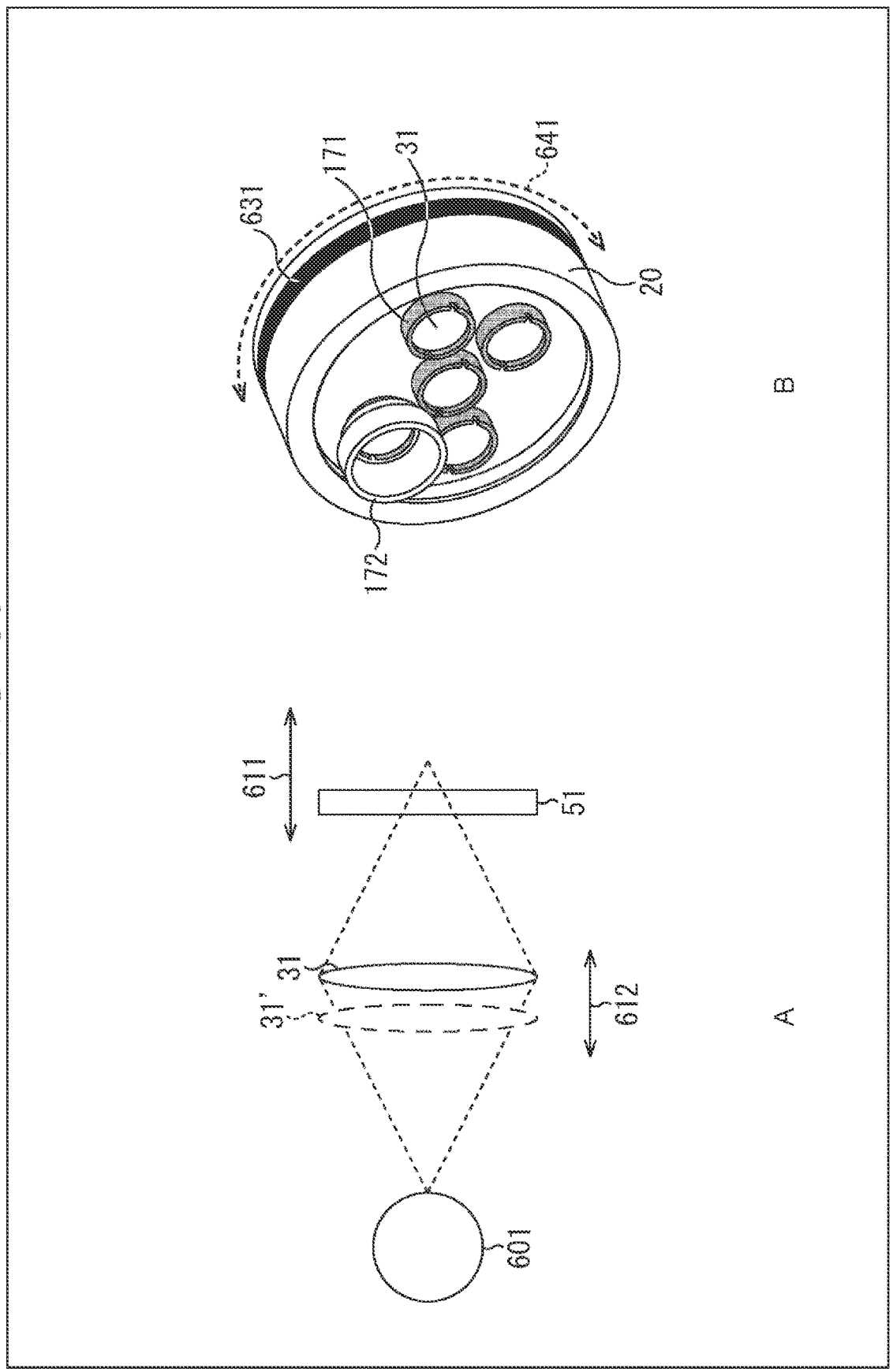
FIG. 30 is a diagram for explaining focus arrangement.

For example, with the camera 10 being used for explanation, there is a possibility that individual differences appear in the positions in the optical axis direction of the monocular optical systems 31 of the image sensors 51 in the housing of the camera 10, due to the accuracy of the manufacturing process or the like. When the positions of the image sensors 51 shift in this manner, the distances between the monocular optical systems 31 and the image sensors 51 also vary. For example, in a case shown in A of FIG. 30, light that travels from a predetermined point on an object 601 and enters a monocular optical system 31 located at a position designed to focus on the object 601 does not form a point image in the image sensor 51, and causes an aberration. This is because the actual position of the image sensor 51 in the optical axis direction of the monocular optical system 31 deviates from an ideal position, and the distance between the monocular optical system 31 and the image sensor 51 deviates from an ideal value.

As described above, when the position of the image sensor 51 shifts as indicated by a double-headed arrow 611, the position of the monocular optical system 31 to focus on the object shifts in the optical axis direct on of the monocular optical system 31 as indicated by a double-headed arrow 612 (a monocular optical system 31').

The movable range of a monocular optical system 31 is defined by the specifications of the focus ring, the actuator, and the like in a fixed manner. Therefore, when the position of the monocular optical system 31 to focus on the object moves as above, there is a possibility that the movable range of the monocular optical system 31 from the position to focus on the object will change. For example, the movable range on the near side of the position to focus on the object might extremely narrower or wider than the movable range on the far side, and focusing on the object might become difficult.

To counter this, an offset is given to the position of the monocular optical system 31 in the optical axis direction. That is, the focal length is adjusted. In this manner, the position of the monocular optical system 31 to focus on the object can be made to approximate the set value. That is, it is possible to prevent an increase in the individual difference of the position of the monocular optical system 31 focusing on the object.

Such focal length adjustment is performed before factory shipment, for example. The focal length may of course be adjusted after shipment. Furthermore, this adjustment may be performed by any appropriate method. For example, as shown in B of FIG. 30, a focal length adjustment ring may be provided on the lens barrel 20 of the camera 10. In this case, when the operator rotates this focal length adjustment ring 631 about the optical axis direction as the axis as indicated by a dashed double-headed arrow 641, the positions of the monocular optical systems 31 in the optical axis direction changes. The operator operates this ring 631 while viewing a captured image or the like, to focus on the object. Note that, after the focal length adjustment, the position of the ring 631 may be fixed.

4. Notes

<Computer>

The series of processes described above can be performed by hardware or can be performed by software. When the series of processes are to be performed by software, the program that forms the software is installed into a computer. Here, the computer may be a computer incorporated into special-purpose hardware, or may be a general-purpose personal computer or the like that can execute various kinds of functions when various kinds of programs are installed thereinto, for example.

Figure 31:
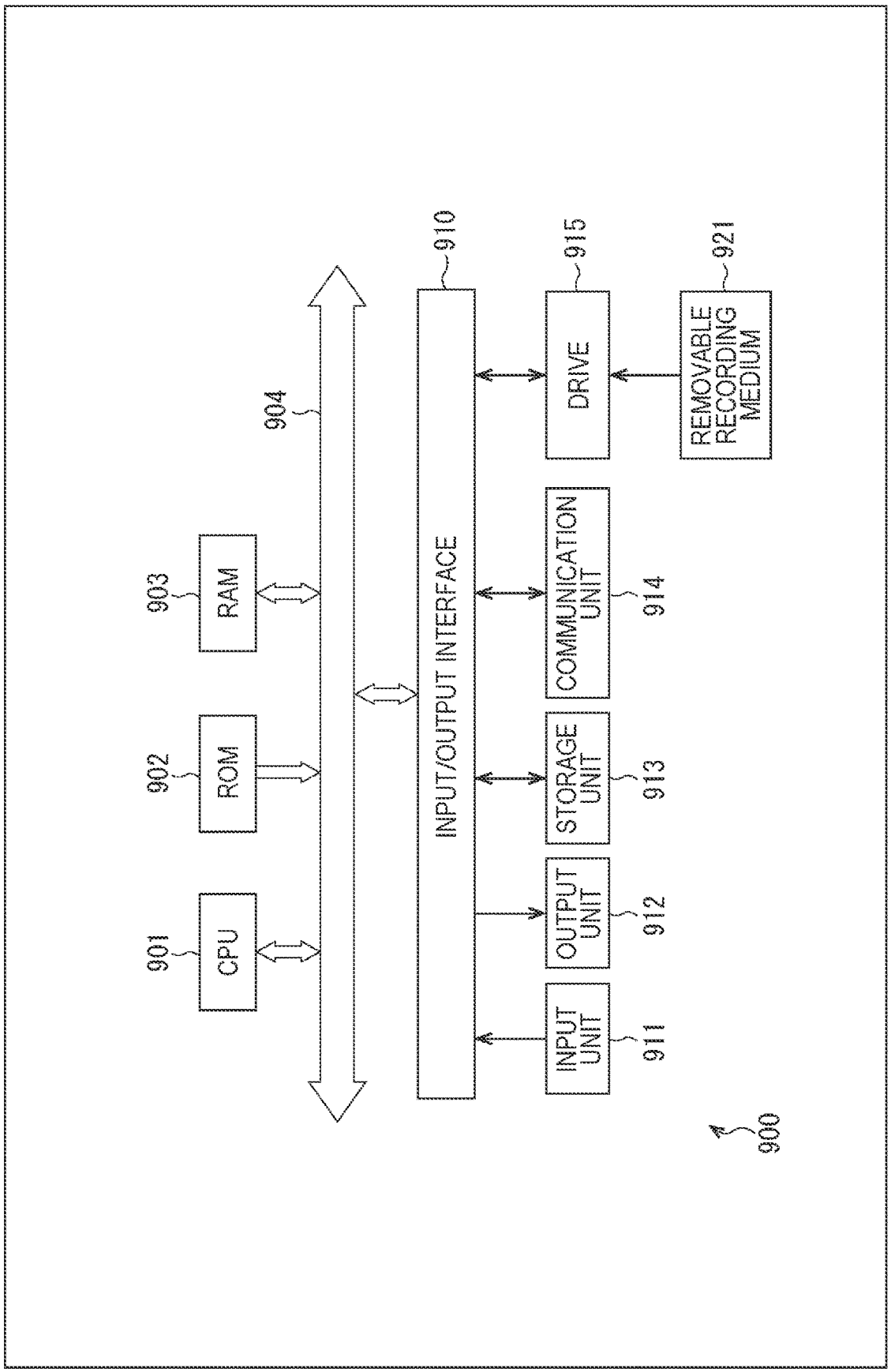
FIG. 31 is a block diagram showing a principal example configuration of a computer.

FIG. 31 is a block diagram showing an example configuration of the hardware of a computer that performs the above described series of processes in accordance with a program.

In a computer 900 shown in FIG. 31, a central processing unit (CPU) 901, a read only memory (ROM) 902, and a random access memory (RAM) 903 are connected to one another by a bus 904.

An input/output interface 910 is also connected to the bus 904. An input unit 911, an output unit 912, a storage unit 913, a communication unit 914, and a drive 915 are connected to the input/output interface 910.

The input unit 911 is formed with a keyboard, a mouse, a microphone, a touch panel, an input terminal, and the like, for example. The output unit 912 is formed with a display, a speaker, an output terminal, and the like, for example. The storage unit 913 is formed with a hard disk, a RAM disk, a nonvolatile memory, and the like, for example. The communication unit 914 is formed with a network interface, for example. The drive 915 drives a removable medium 921 such as a magnetic disk, an optical disk, a magnetooptical disk, or a semiconductor memory.

In the computer having the above described configuration, the CPU 901 loads a program stored in the storage unit 913 into the RAM 903 via the input/output interface 910 and the bus 904, for example, and executes the program, so that the above described series of processes is performed. The RAM 903 also stores data necessary for the CPU 901 to perform various processes and the like as necessary.

The program to be executed by the computer can be recorded on the removable medium 921 as a packaged medium or the like to be used, for example. In that case, the program can be installed into the storage unit 913 via the input/output interface 910 when the removable medium 921 is mounted on the drive 915.

Alternatively, this program can be provided via a wired or wireless transmission medium such as a local area network, the Internet, or digital satellite broadcasting. In that case, the program can be received by the communication unit 914, and be installed into the storage unit 913.

Also, this program can be installed beforehand into the RUM 902 or the storage unit 913.

<Targets to Which the Present Technology is Applied>

The present technology can be applied to any appropriate configuration. For example, the present technology can also be embodied as a component of an apparatus, such as a processor serving as a system large scale integration (LSI) or the like, a module using a plurality or processors or the like, a unit using a plurality of modules or the like, or a set having other functions added to the unit.

Further, for example, the present technology can also be applied to a network system formed with a plurality of devices. For example, the present technology may be embodied as cloud computing that is shared and jointly processed by a plurality of devices via a network. For example, the present technology may be embodied in a cloud service that provides services to any kinds of terminals such as computers, portable information processing terminals, and IoT (Internet of Things) devices.

Note that, in the present specification, a system means an assembly of a plurality of components (devices, modules (parts), and the like), and not all the components need to be provided in the same housing. In view of this, a plurality of deices that are housed in different housings and are connected to one another via a network form a system, and one device having a plurality of modules housed in one housing is also a system.

<Fields and Usage to Which the Present Technology Can Be Applied>

A system, an apparatus, a processing unit, and the like to which the present technology is applied can be used in any appropriate field such as transportation, medical care, crime prevention, agriculture, the livestock industry, mining, beauty care, factories, home electric appliances, meteorology, or nature observation, for example. The present technology can also be used for any appropriate purpose.

<Other Aspects>

Embodiments of the present technology are not limited to the embodiments described above, and various modifications may be made to them without departing from the scope of the present technology.

For example, any configuration described above as one device (or one processing unit) may be divided into a plurality of devices (or processing units). Conversely, any configuration described above as a plurality of devices (or processing units) may be combined into one device (or one processing unit). Furthermore, it is of course possible tn add a component other than those described above to the configuration of each device (or each processing unit). Further, some components of a device (or processing unit) may be incorporated into the configuration of another device (or processing unit) as long as the configuration and the functions of the entire system remain substantially the same.

Also, the program described above may be executed in any device, for example. In that case, the device is only required to have necessary functions (function blocks and the like) so that necessary information can be obtained.

Also, one device may carry out each step in one flowchart, or a plurality of devices may carry out each step, for example. Further, in a case where one step includes a plurality of processes, the plurality of processes may be performed by one device or may be performed by a plurality of devices. In other words, a plurality of processes included in one step can be performed as processes in a plurality of steps. Conversely, processes described as a plurality of steps can be collectively performed as one step.

Also, a program to be executed by a computer may be a program for performing the processes in the steps according to the program in chronological order in accordance with the sequence described in this specification, or may be a program for performing processes in parallel or performing a process when necessary, such as when there is a call, for example. That is, as long as there are no contradictions, the processes in the respective steps may be performed in a different order from the above described order. Further, the processes in the steps according to this program may be executed in parallel with the processes according to another program, or may be executed in combination with the processes according to another program.

Also, each of the plurality of techniques according to the present technology can be independently implemented, as long as there are no contradictions, for example. It is of course also possible to implement a combination of some of the plurality of techniques according to the present technology. For example, part or all of the present technology described in one of the embodiments can be implemented in combination with part or all of the present technology described in another one of the embodiments. Further, part or all of the present technology described above can be implemented in combination with some other technology not described above.

Note that the present technology can also be embodied in the configurations described below.

(1) An imaging apparatus including
a depth-of-field adjustment function that adjusts a depth of field of at least one monocular optical system among a plurality of monocular optical systems having optical paths independent of one another.

(2) The imaging apparatus according to (1), in which the depth-of-field adjustment function includes a depth-of-field adjustment mechanism that adjusts the depth of field of the monocular optical system.

(3) The imaging apparatus according to (2), in which the depth-of-field adjustment mechanism adjusts the depth of field of the at least one monocular optical system by adjusting a focal length of the monocular optical system.

(4) The imaging apparatus according to (3), in which the depth-of-field adjustment mechanism is a mechanism that screws the monocular optical system to a predetermined member, and adjusts the focal length of the monocular optical system by rotating about an optical axis of the monocular optical system.

(5) The imaging apparatus according to (2), in which the depth-of-field adjustment mechanism adjusts the depth of field of the monocular optical system by adjusting an aperture of the monocular optical system.

(6) The imaging apparatus according to (1), in which the depth-of-field adjustment function includes an optical system control unit that adjusts the depth of field of the monocular optical system by driving the monocular optical system on the basis of control information.

(7) The imaging apparatus according to (6), in which the optical system control unit adjusts the depth of field of the monocular optical system by adjusting a focal length of the monocular optical system on the basis of the control information.

(8) The imaging apparatus according to (6), in which the optical system control unit adjusts the depth of field of the monocular optical system by adjusting an aperture of the monocular optical system on the basis of the control information.

(9) The imaging apparatus according to (6), in which the optical system control unit adjusts a depth of field of another monocular optical system among the plurality of monocular optical systems co a depth of field of a reference monocular optical system that is a monocular optical system among the plurality of monocular optical systems.

(10) The imaging apparatus according to (9), in which: the optical system control unit adjusts the depth of field of the another monocular optical system so that a range of the depth of field of the another monocular optical system overlaps at least part of a range of the depth of field of the reference monocular optical system.

(11) The imaging apparatus according to (9), in which the optical system control unit adjusts the depth of field of the another monocular optical system to the depth of field of the reference monocular optical system, the reference monocular optical system being the monocular optical system having the smallest depth of field among the plurality of monocular optical systems.

(12) The imaging apparatus according to (11), in which the optical system control unit adjusts the depth of field of the another monocular optical system so that the range of the depth of field of the another monocular optical system includes the range of the depth of field of the reference monocular optical system.

(13) The imaging apparatus according to (12), in which the optical system control unit further adjusts the depth of field of the another monocular optical system so that a focal length of the another monocular optical system matches a focal length of the reference monocular optical system.

(14) The imaging apparatus according to (6), further including
a storage unit that stores an amount of adjustment of the depth of field,
in which the optical system control unit adjusts the depth of field of the monocular optical system on the basis of the control information including the amount of adjustment read from the storage unit.

(15) The imaging apparatus according to (14), in which the optical system control unit adjusts the depth of field of the monocular optical system and focuses the monocular optical system on an object, on the basis of the control information including an amount of control for focusing the monocular optical system on the object, the control amount being calculated on the basis of the amount of adjustment read from the storage unit and a wave detection result.

(16) The imaging apparatus according to (1), in which the plurality of monocular optical systems is installed so that the respective optical axes are located at different positions on a light receiving surface of an image sensor that photoelectrically converts incident light entering through the monocular optical systems.

(17) An information processing method including
adjusting a depth of field of at least one monocular optical system among a plurality of monocular optical systems having optical paths independent of one another.

(18) A program for causing a computer to function as
a depth-of-field adjustment function that adjusts a depth of field of at least one monocular optical system among a plurality of monocular optical systems having optical paths independent of one another.

(19) An interchangeable lens including:
a plurality of monocular optical systems having optical paths independent of one another; and
a depth-of-field adjustment function that adjusts a depth of field of at least one monocular optical system among the plurality of monocular optical systems.

(20) The interchangeable lens according to (19), further including
a storage unit that stores an amount of adjustment of the depth of field.

REFERENCE SIGNS LIST

10 Camera
30 Multiple optical system
31 Monocular optical system
51 Image sensor
52 RAW signal processing unit
53 Region extraction unit
54 Camera signal processing unit
55 Through-lens image generation unit
56 Region specifying unit
57 Image reconstruction processing unit
60 Bus
61 Display unit
62 Storage unit
63 Storage medium
64 Communication unit
65 File generation unit 70 Association unit
81 Control unit
82 Storage unit
83 Storage medium
84 Optical system control unit
301 Camera system
310 Camera body
320 Multiple interchangeable lens
341 Communication unit
351 Communication unit
352 Storage unit
353 Storage medium
500 Camera
600 Depth-of-field adjustment device
631 Ring

The invention claimed is:

1. An imaging apparatus comprising:
a depth-of-field adjustment function including a depth-of-field adjustment mechanism that adjusts a depth of field of at least one monocular optical system among a plurality of monocular optical systems having optical paths independent of one another, wherein
the depth-of-field adjustment mechanism is configured to adjust the depth of field of the at least one monocular optical system by adjusting a focal length of the monocular optical system, and
the depth-of-field adjustment mechanism is a mechanism that screws the monocular optical system to a predetermined member, and adjusts the focal length of the monocular optical system by rotating about an optical axis of the monocular optical system.

2. An imaging apparatus comprising:
a depth-of-field adjustment function including a depth-of-field adjustment mechanism that adjusts a depth of field of at least one monocular optical system among a plurality of monocular optical systems having optical paths independent of one another, wherein
the depth-of-field adjustment mechanism is configured to adjust the depth of field of the at least one monocular optical system by adjusting a focal length of the monocular optical system, and
the depth-of-field adjustment mechanism is configured to adjust the depth of field of the monocular optical system by adjusting an aperture of the monocular optical system.

3. The imaging apparatus according to claim 1, wherein the depth-of-field adjustment function further includes an optical system control unit that is configured to adjust the depth of field of the monocular optical system by driving the monocular optical system on a basis of control information.

4. The imaging apparatus according to claim 3, wherein the optical system control unit is configured to adjust the depth of field of the monocular optical system by adjusting a focal length of the monocular optical system on a basis of the control information.

5. An imaging apparatus comprising:
a depth-of-field adjustment function including an optical system control unit that adjusts a depth of field of at least one monocular optical system among a plurality of monocular optical systems having optical paths independent of one another, wherein
the optical system control unit is configured to adjust the depth of field of the monocular optical system by driving the monocular optical system on a basis of control information, and
the optical system control unit is configured to adjust the depth of field of the monocular optical system by adjusting an aperture of the monocular optical system on a basis of the control information.

6. The imaging apparatus according to claim 3, wherein the optical system control unit is configured to adjust a depth of field of another monocular optical system among the plurality of monocular optical systems to a depth of field of a reference monocular optical system that is a monocular optical system among the plurality of monocular optical systems.

7. An imaging apparatus comprising:
a depth-of-field adjustment function including an optical system control unit that adjusts a depth of field of at least one monocular optical system among a plurality of monocular optical systems having optical paths independent of one another, wherein
the optical system control unit is configured to adjust the depth of field of the monocular optical system by driving the monocular optical system on a basis of control information,
the optical system control unit is configured to adjust a depth of field of another monocular optical system among the plurality of monocular optical systems to a depth of field of a reference monocular optical system that is a monocular optical system among the plurality of monocular optical systems, and
the optical system control unit is configured to adjust the depth of field of the another monocular optical system so that a range of the depth of field of the another monocular optical system overlaps at least part of a range of the depth of field of the reference monocular optical system.

8. The imaging apparatus according to claim 7, wherein the optical system control unit is configured to adjust the depth of field of the another monocular optical system to the depth of field of the reference monocular optical system, the reference monocular optical system being a monocular optical system having a smallest depth of field among the plurality of monocular optical systems.

9. The imaging apparatus according to claim 8, wherein the optical system control unit is configured to adjust the depth of field of the another monocular optical system so that the range of the depth of field of the another monocular optical system includes the range of the depth of field of the reference monocular optical system.

10. An imaging apparatus comprising:
a depth-of-field adjustment function including an optical system control unit that adjusts a depth of field of at least one monocular optical system among a plurality of monocular optical systems having optical paths independent of one another, wherein
the optical system control unit is configured to adjust the depth of field of the monocular optical system by driving the monocular optical system on a basis of control information,
the optical system control unit is configured to adjust a depth of field of another monocular optical system among the plurality of monocular optical systems to a depth of field of a reference monocular optical system that is a monocular optical system among the plurality of monocular optical systems,
the optical system control unit is configured to adjust the depth of field of the another monocular optical system to the depth of field of the reference monocular optical system, the reference monocular optical system being a monocular optical system having a smallest depth of field among the plurality of monocular optical systems, the optical system control unit is configured to adjust the depth of field of the another monocular optical system so that a range of the depth of field of the another monocular optical system includes a range of the depth of field of the reference monocular optical system, and the optical system control unit is further configured to adjust the depth of field of the another monocular optical system so that a focal length of the another monocular optical system matches a focal length of the reference monocular optical system.

11. The imaging apparatus according to claim 3, further comprising:

a memory that stores an amount of adjustment of the depth of field, wherein the optical system control unit is configured to adjust the depth of field of the monocular optical system on a basis of the control information including the amount of adjustment that is stored in the memory.

12. An imaging apparatus comprising:

a depth-of-field adjustment function including an optical system control unit that adjusts a depth of field of at least one monocular optical system among a plurality of monocular optical systems having optical paths independent of one another; and a memory that stores an amount of adjustment of the depth of field, wherein the optical system control unit is configured to adjust the depth of field of the monocular optical system on a basis of control information including the amount of adjustment that is stored in the memory, wherein the optical system control unit is configured to adjust the depth of field of the monocular optical system by driving the monocular optical system on a basis of the control information, and the optical system control unit is configured to adjust the depth of field of the monocular optical system and focuses the monocular optical system on an object, on a basis of the control information including an amount of control for focusing the monocular optical system on the object, the amount of control for focusing the monocular optical system on the object being calculated on a basis of the amount of adjustment that is stored in the memory and a wave detection result.

13. The imaging apparatus according to claim 1, wherein the plurality of monocular optical systems is installed so that optical axes of the plurality of monocular optical systems are located at different positions on a light receiving surface of an image sensor that photoelectrically converts incident light entering through the plurality of monocular optical systems.

14. An information processing method comprising:

retrieving, with an electronic processor, control information including an amount of adjustment of a depth of field from a memory;

calculating, with the electronic processor and on a basis of the control information including the amount of adjustment and a wave detection result, an amount of control for focusing the monocular optical system on an object; and controlling, with the electronic processor and on a basis of the amount of control for focusing the monocular optical system on the object, at least one monocular optical system among a plurality of monocular optical systems having optical paths independent of one another to focus on the object.

15. A non-transitory computer-readable medium comprising a program that, when executed by an electronic processor, causes the electronic processor to perform a set of operations comprising:

retrieving control information including an amount of adjustment of a depth of field from a memory;

calculating, on a basis of the control information including the amount of adjustment and a wave detection result, an amount of control for focusing the monocular optical system on an object; and controlling, on a basis of the amount of control for focusing the monocular optical system on the object, at least one monocular optical system among a plurality of monocular optical systems having optical paths independent of one another to focus on the object.

16. An interchangeable lens comprising:

a plurality of monocular optical systems having optical paths independent of one another; and a depth-of-field adjustment function including a depth-of-field adjustment mechanism that adjusts a depth of field of at least one monocular optical system among the plurality of monocular optical systems, wherein the depth-of-field adjustment mechanism is configured to adjust the depth of field of the at least one monocular optical system by adjusting a focal length of the monocular optical system, and the depth-of-field adjustment mechanism is a mechanism that screws the monocular optical system to a predetermined member, and adjusts the focal length of the monocular optical system by rotating about an optical axis of the monocular optical system.

17. The interchangeable lens according to claim 16, further comprising:

a memory that stores an amount of adjustment of the depth of field.

* * * * *